US007353236B2

(12) United States Patent
Stickler

(10) Patent No.: US 7,353,236 B2
(45) Date of Patent: Apr. 1, 2008

(54) ARCHIVE SYSTEM AND DATA MAINTENANCE METHOD

(75) Inventor: Patrick Stickler, Tampere (FI)

(73) Assignee: Nokia Corporation, Espoo (FI)

( * ) Notice: Subject to any disclaimer, the term of this patent is extended or adjusted under 35 U.S.C. 154(b) by 835 days.

(21) Appl. No.: 10/101,944

(22) Filed: Mar. 21, 2002

(65) Prior Publication Data

US 2003/0093434 A1 May 15, 2003

Related U.S. Application Data

(60) Provisional application No. 60/293,204, filed on May 25, 2001.

(30) Foreign Application Priority Data

Mar. 21, 2001 (GB) ................................ 0107130.7

(51) Int. Cl.
*G06F 17/30* (2006.01)

(52) U.S. Cl. ................................................ 707/103 Y

(58) Field of Classification Search ............ 707/103 R, 707/130 X, 103 Y, 103 Z, 100, 103 X
See application file for complete search history.

(56) References Cited

U.S. PATENT DOCUMENTS 5,313,630 A 5/1994 Namioka et al. ........... 395/600
5,557,793 A 9/1996 Koerber ...................... 395/600
5,659,723 A 8/1997 Dimitrios et al. ........... 395/614
5,761,664 A * 6/1998 Sayah et al. ................ 707/100
5,829,006 A 10/1998 Parvathaneny et al. ..... 707/101
5,864,862 A * 1/1999 Kriens et al. ........... 707/103 R
5,864,864 A * 1/1999 Lerner ........................ 707/102
5,920,869 A 7/1999 Wakayama et al. ......... 707/103
5,960,438 A 9/1999 Chang et al. ............... 707/103
6,016,495 A * 1/2000 McKeehan et al. ..... 707/103 R
6,047,284 A 4/2000 Owens et al. .................. 707/4
6,456,997 B1 * 9/2002 Shukla .......................... 707/1
6,523,046 B2 2/2003 Liu et al. ................. 707/104.1
6,662,188 B1 * 12/2003 Rasmussen et al. ........ 707/102
6,704,743 B1 * 3/2004 Martin ................... 707/103 R

FOREIGN PATENT DOCUMENTS

WO 9715018 4/1997
WO 9852131 11/1998
WO 0028467 5/2000
WO 0103002 1/2002

OTHER PUBLICATIONS

Alain Michard, et al. "The Aquarelle resource discoverysystem", Computer Networks and ISDN Systems, North Holland Publishing. Amsterdam, NL, vol. 30, No. 13, Aug. 3, 1998, pp. 1185-1200.

(Continued)

*Primary Examiner*—Greta Robinson
(74) *Attorney, Agent, or Firm*—Alston & Bird LLP

(57) ABSTRACT

An archive system and method to maintain data in an object oriented programming environment. The system and method utilise a scoping model to ascertain the hierarchical relationship between data entities within the object oriented programming environment.

7 Claims, 3 Drawing Sheets

OTHER PUBLICATIONS

Thuy-Linh Nguyen, et al., "Object-oriented modeling of multimedia documents" Computer Networks and ISDN Systems, North Holland Publishing, Amsterdam, NL, vol. 30, No. 1-7, Apr. 1, 1998, pp. 578-582.

Ashok Malhotra, et al. "RDF Query Specification", 'Online ! Dec. 3, 1998, W3C.

Patricia Francois, "Generallized SGML repositories: Requirements and modeling" Computer Standards and Interfaces, Elsevier Sequoia, Lausanne, CH vol. 18, No. 1, 1996, pp. 11-24.

Ora Lassila, "RDF Metadata and Agent Architectures" 'Online! Nov. 21, 1997.

* cited by examiner

ARCHIVE SYSTEM AND DATA MAINTENANCE METHOD

This application claims the benefit of the filing date of Provisional Application No. 60/293,204 filed on May 25, 2001.

FIELD OF THE INVENTION

The present invention relates to the management and distribution of electronic media particularly, although not exclusively, over a network.

BACKGROUND OF THE RELATED ART

With the advent of the computer and particularly the networking of computers, the ability of organizations and individuals to rapidly generate, store, access and process data has increased dramatically. In the case of many organizations, the ability to manage and leverage data has become a central aspect of their business.

Not surprisingly, considerable effort and development has occurred in those computational and software fields related to the generation, storage, accessibility and processing of data. Nevertheless, it has been the case that as organizations have moved to a distributed architecture paralleling the development of the Internet, the complexity involved in providing solutions across different platforms and operating systems has become ever more challenging. Consequently, developers have tended to concentrate on limited solutions for preferred platforms and operating systems. Similarly, organizations have sought to standardize the tools they use to leverage data.

Unfortunately, the pull exerted by those distributed computing models currently finding favour is in direct contradiction to the solutions adopted by the majority of developers and those responsible within organizations for the selection of tools. Consequently, the management and distribution of data, particular of high value media content remains problematic.

BRIEF SUMMARY

Thus, according to an aspect of the preferred embodiments described below, there is provided a method of maintaining data in an object oriented programming environment comprising defining a set of persistent data entities each having a predetermined level of abstraction and scope wherein a related set of data entities comprises a hierarchical plurality of levels such that the scope identified at a higher level of abstraction encompasses the scope of those entities at a lower level of abstraction.

Thus, by making the relationship between data entities explicit that is by preferably defining a plurality of related data entities at a common level of abstraction all said entities being encompassed by the scope of those related entities of a higher level of abstraction and employing a modular architecture allowing for partial specification of properties by defining the level of abstraction and scope using metadata properties, more efficient run-time resolution of abstract or partial references may be achieved. Conveniently, the architecture permits the utilization of property names and values which are mnemonic and meaningful for humans whilst remaining suitable for processing by computer.

Previously, each distinct data entity was assigned a single, monolithic identifier either a physical storage address or an abstract pointer resolvable to a physical storage address. Such approaches are well known to be fragile, non-portable and thus hamper interoperability in multi-system environments. Furthermore, where scoping/hierarchical relationships are defined in an external mapping solution, such a solution has no mnemonic qualities and imposes additional processing complexity at run-time. Whereas, the hierarchical relationship provided in present method obviates the need for the external mapping needed for resolving and/or deriving data entities thereby reducing the implementation burden on a system.

According to a further aspect of the preferred embodiments, there is provided an archival system comprising persistent storage for a plurality of data entities each having a predetermined level of abstraction and scope wherein a related set of data entities comprises a hierarchical plurality of levels such that the scope identified at a higher level of abstraction encompasses the scope of those entities at a lower level of abstraction wherein said storage is distributed within an object oriented programming environment.

Using such a system advantageously allows a hypertext link, for example, to refer to a data entity and then let the run-time environment determine the scope of the entity to retrieve based on user and environment configuration. Preferably, the sets of entities of lower scope which are all realizations of the same entity of higher scope share that entity's identity as part of their own.

BRIEF DESCRIPTION OF THE DRAWINGS

In order to understand the present invention more fully, a number of preferred embodiments thereof will now be described by way of example and with reference to the accompanying drawings, in which.

DETAILED DESCRIPTION OF THE PREFERRED EMBODIMENTS

Figure 1:
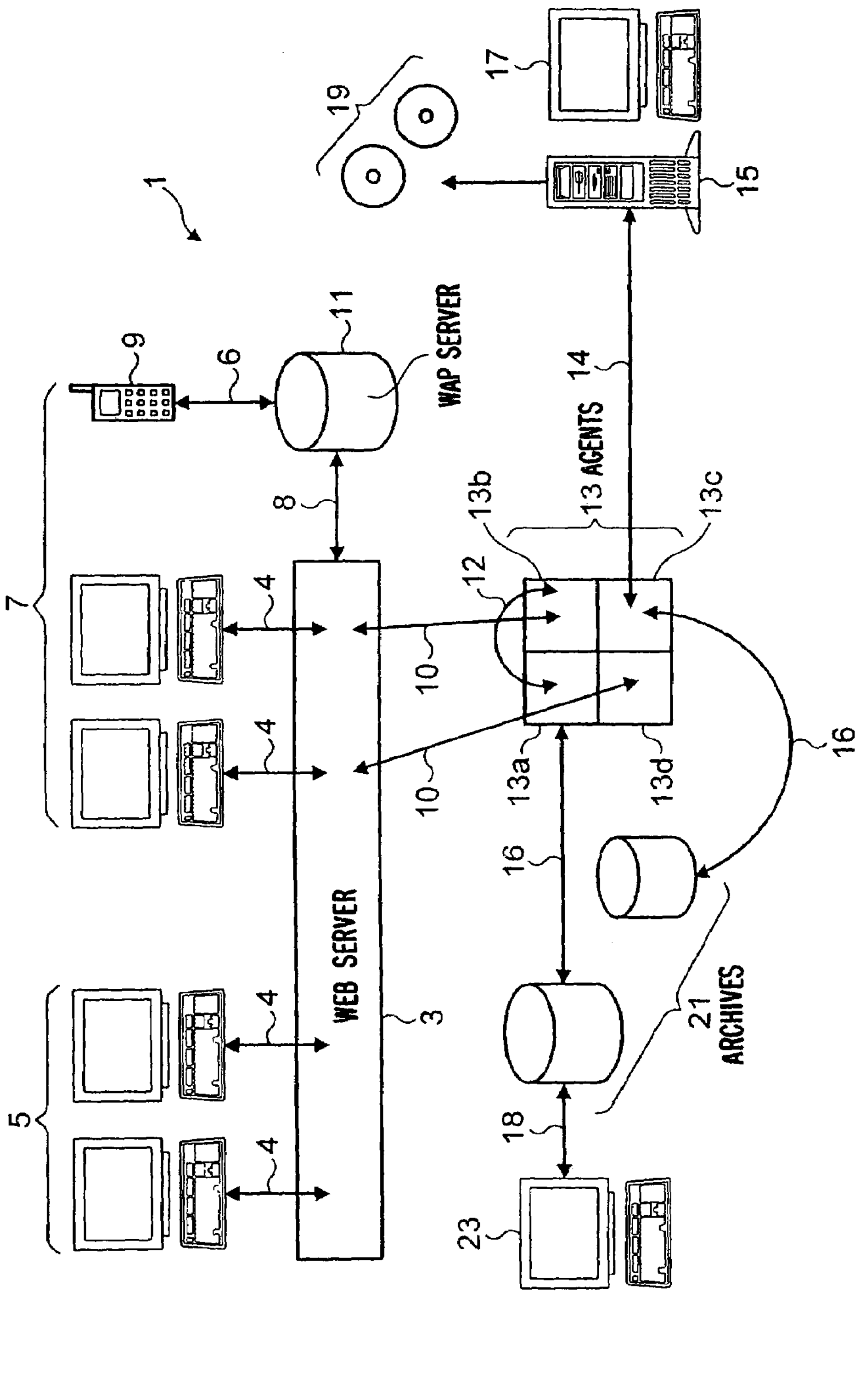
FIG. 1 is a block diagram of a network operating in accordance with a framework of the preferred embodiments.

The preferred embodiments relate to a Media Framework that defines a set of standard, open and portable models, interfaces, and protocols facilitating the construction of tools and environments optimized for the management, referencing, distribution, storage, and retrieval of electronic media; as well as a set of core software components (agents) providing functions and services relating to archival, versioning, access control, search, retrieval, conversion, navigation, and metadata management.

A Media Framework according to the preferred embodiments may serve as the foundation for the realization of corporate documentation strategy, upon which company wide tools and services operate. Preferably, it addresses the common requirements of all corporate business units, while also allowing custom extensibility by specific business units for special needs.

A Media Framework architecture according to the preferred embodiments may be based on a standard HTTP 2 web server and is media neutral, such that the particular encoding of any data is not relevant to storage by or interchange between agents. This does not mean that specific encoding or other media constraints may not exist for any given environment implementing the framework, depending on the operating system(s), tools, and processes used, only that the framework itself aims not to impose any such constraints itself. Non-agent systems, processes, tools, or services that are utilized by an agent can still be accessed via proprietary means if necessary or useful for any operations or processes outside of the scope of the framework. Thus, framework based tools and services can co-exist freely with other tools and services utilizing the same resources. A Media Framework according to the preferred embodiments brings together both existing, legacy systems as well as new solutions into a common, interoperable environment; maximizing the investment in current systems while reducing the cost and risk of evolving and/or new solutions.

A Media Framework according to the preferred embodiments may be comprised of a number of components, each defining a core area of functionality needed in the construction of a complete production and distribution environment. Each framework component is defined separately by its own specification, in addition to a top level framework specification. The top level specification will be referred to as Media Framework for Electronic Media. The other framework components include Media Attribution and Reference Semantics (MARS), Generalized Media Archive (GMA), Portable Media Archive (PMA), and Registry Service Architecture (REGS).

MARS is a metadata specification framework and core standard vocabulary and semantics facilitating the portable management, referencing, distribution, storage and retrieval of electronic media. MARS is designed specifically for the definition of metadata for use by automated systems and for the consistent, platform independent communication between software components storing, exchanging, modifying, accessing, searching, and/or displaying various types of information such as documentation, images, video, etc. It is designed with considerations for automated processing and storage by computer systems in mind, not particularly for direct consumption by humans; though mechanisms are provided for associating with any given metadata property one or more presentation labels for use in user interfaces, reports, forms, etc.

The GMA defines an abstract archival model for the storage and management of data based solely on Media Attribution and Reference Semantics (MARS) metadata; providing a uniform, consistent, and implementation independent model for information storage and retrieval, versioning, and access control. The GMA is a central component of the Media Framework and serves as the common archival model for all managed media objects controlled, accessed, transferred or otherwise manipulated by Media Framework agencies.

The PMA is a physical organization model of a file system based data repository conforming to and suitable for implementations of the Generalized Media Archive (GMA) abstract archival model. The PMA defines an explicit yet highly portable file system organization for the storage and retrieval of information based on Media Attribution and Reference Semantics (MARS) metadata. The PMA uses the MARS Identity metadata property values themselves as directory and/or file names, avoiding the need for a secondary referencing mechanism and thereby simplifying the implementation, maximizing efficiency, and producing a mnemonic organizational structure.

REGS is a generic architecture for dynamic query resolution agencies based on the Media Framework and Media Attribution and Reference Semantics (MARS), providing a unified interface model for a broad range of search and retrieval tools. REGS provides a generic means to interact with any number of specialized search and retrieval tools using a common set of protocols and interfaces based on the Media Framework; namely MARS metadata semantics and either a POSIX or CGI compliant interface. As with other Media Framework components, this allows for much greater flexibility in the implementation and evolution of particular solutions while minimizing the interdependencies between the tools and their users (human or otherwise).

Initially, it should be noted that in order to improve the readability of the specification, sections that describe in detail all aspects of a particular component and that relate to the description of the embodiments described below, have been included at the end of the specification. When appropriate, reference has been made in the description to these sections by a title, name, or function of the section. These sections include Media Framework for Electronic Media, Media Attribution and Reference Semantics (MARS), Portable Media Archive (PMA), Generalized Media Archive (GMA), and Registry Service Architecture (REGS).

FIG. 1 shows a diagram of a system for information delivery according to an exemplary preferred embodiment. A network 1 includes an Hypertext Transfer Protocol (HTTP) web server 3 that may be accessible 4 by production clients 5 operating a number of operating systems on various platforms, and a set of on-line distribution clients 7. The on-line distribution clients 7 may include a wireless terminal 9 utilizing Wireless Mark-up Language (WML). As such, the terminal 9 may accesses 6 the HTTP web server 3 indirectly via a WAP server 1, which provides the necessary translation 8 between HTTP and WML. The HTTP web server 3 may further provide a Common Gateway Interface (CGI).

In addition to these physical elements of the network 1, data exchanged with the HTTP web server 1 may also be exchangeable 10 with an Agent pool 13 made up of a number of core software components or agents 13*a*, 13*b*, 13*c*, 13*d* providing services which will be elaborated upon below. Data exchanged 10 with the HTTP web server 3 by the Agent pool 13 may be transferred 12 between agents 13*a*–13*d*. The Agent pool 13 may have additional connections. A connection 14 may exist to a customer documentation server 15 capable of providing both on-line 17 and hard media 19 access to users. Moreover, a connection 16 may exist to a set of one or more archives 21 which themselves may be monitored and managed through an on-line connection 18 to a remote terminal 23.

Figure 2:
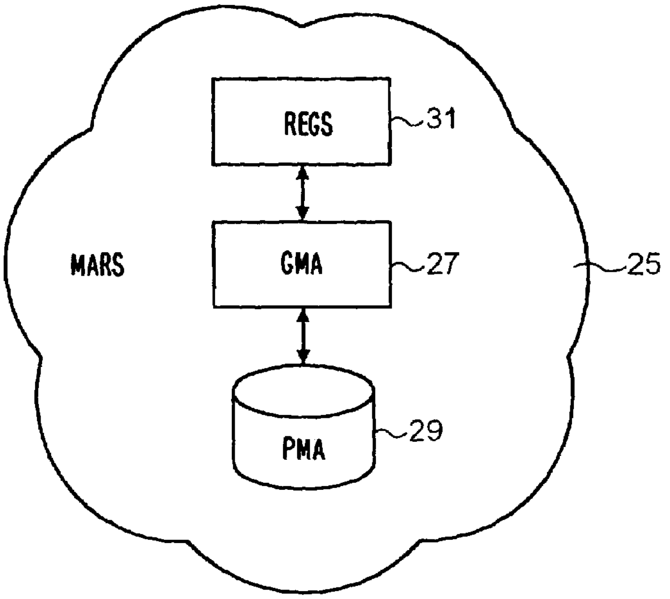
FIG. 2 is a schematic diagram illustrating the components of the framework of FIG. 1.

FIG. 2 shows a diagram of a conceptual level showing the relationships between framework elements according to an exemplary preferred embodiment. A Media Attributions and Reference Semantics (MARS) 25 provides a core standard vocabulary and semantics utilizing metadata for facilitating the portable management, referencing, distribution, storage and retrieval of electronic media. As will be further described below, MARS 25 is the common language by which different elements of the preferred embodiments communicate. A Generalized Media Archive (GMA) 27 provides an abstract archival model for the storage and management of data based on metadata defined by MARS 25. At a physical level, a Portable Media Archive (PMA) 29 provides an organizational model of a file system based data repository conforming to and suitable for implementations of the Generalized Media Archive (GMA) abstract archival model. A Registry Service Architecture (REGS) 31 may be provided which permits dynamic query resolution by agencies including users and software components or agents utilizing MARS 25, thereby providing a unified interface model for a broad range of search and retrieval tools.

As noted previously, a Framework according to the preferred embodiments may be based on a web server 3 running on a platform that provides basic command line and standard input/output stream functionality. An agent 13 may provide two interfaces, a combined Hypertext Transfer Protocol (HTTP) and Common Gateway Interface (CCL), HTTP+CGI, and a Portable Operating System Interface (POSIX) command line+standard input/output/error. In addition to these interfaces, the agent may provide further interfaces based on Java method invocation and/or Common Object Request Broker Architecture (CORBA) method invocation. An agent (or other user, client, or process) is free to choose among the available interfaces with which to communicate including communication with another such agent 13. In addition, a framework according to the preferred embodiments allows non-agent systems, processes, tools, or services that are utilized by an agent 13 to be accessed via proprietary means if necessary or useful for any operations or processes outside of the scope of the architecture. Thus, tools and services intended for the architecture can co-exist freely with other tools and services utilizing the same resources.

Specifically, the protocols on which a framework according to the preferred embodiments may be based include HTTP which is an application-level protocol for distributed, collaborative, hypermedia information systems. As a generic, stateless, protocol HTTP can be used for many tasks beyond hypertext. Thus, it may also be used with name servers and distributed object management systems, through extension of its request methods, error codes and headers. A particularly useful feature of HTTP is the typing and negotiation of data representation, allowing systems to be built independently of the data being transferred.

CGI is a standard for interfacing external applications with information servers, such as Web servers. CGI may serve as the primary communication mechanism between networked clients and software agents within a framework according to the preferred embodiments.

POSIX is a set of standard operating system interfaces based on the UNiX operating system. The POSIX interfaces were developed under the auspices of the 1EEE (Institute of Electrical and Electronics Engineers). A framework according to the preferred embodiments adopt the POSIX models for command line arguments, standard input streams, standard output streams, and standard error streams.

CORBA specifies a system that provides interoperability between objects in a heterogeneous, distributed environment that is transparent to a database programmer. Its design is based on the Object Management Group (OMG) Object Model. Framework agents may utilize CORBA as one of several means of agent intercommunication.

Java™ is both a programming language and a platform. Java is a high-level programming language intended to be architecture-neutral, object-oriented, portable, distributed, high-performance, interpreted, multithreaded, robust, dynamic, and secure. The Java platform is a "virtual machine" which is able to run any Java program on any machine for which an implementation of the Java virtual machine (JVM) exists. Most operating systems commonly in use today are able to support an implementation of the JVM. The core software components and agents provided by a framework according to the preferred embodiments may be implemented in Java.

Metadata is held within a framework according to the preferred embodiments using a naming scheme which is compatible across a broad range of encoding schemes including, but not limited to the following programming, scripting and command languages: C, C++, Objective C, Java, Visual BASIC, Ada, Smalltalk, LISP, Emacs Lisp, Scheme, Prolog, JavaScript/ECMASCriPt, Pen, Python, TCL, Bourne Shell, C Shell, Z Shell, Bash, Korn Shell, POSIX, Win32, REXX, and SQL.

The naming scheme according to the preferred embodiments may also be compatible with, but not limited to, the following mark-up and typesetting Languages: SGML, XML, HTML, XI-ITML, DSSSL, CSS, PostScript, and PDF. Equally, the naming scheme may be also compatible with but not limited to the following file systems: FAT (MS-DOS), VFAT (Windows 95/98), NTFS (Windows NT/2000), HFS (Macintosh), HPFS (OS/2), HP/UX, UFS (Solaris), ext2 (Linux), ODS-2 (VMS), NFS, ISO 9660 (CDROM), UDF (CDRIW, DVD).

In order to provide such compatibility, the naming scheme may utilize an explicit, bound, and typically ordinal set of values referred to hereinafter as a token. The token may comprise any sequence of characters beginning with a lowercase alphabetic character followed by zero or more lowercase alphanumeric characters with optional single intervening underscore characters. More specifically, any string matching the following POSIX regular expression:

```
/[a–z](_?[a–z0–9])*/
```

Some examples may include: Abcd, ab_cd, a123, x2345, and here_is_a_very_long_token_value.

By defining MARS metadata properties in a token format, an agent 13 or other tool is able to operate more efficiently as a result of its processes being based on controlled sets of explicitly defined values rather than those based on arbitrary values.

A token provides the structure through which a framework according to the preferred embodiments are able to define metadata in the form of a property. This property is representative of a quality or attribute assigned or related to an identifiable body of information. The property thus includes an ordered collection of one or more values sharing a common name. The name of the property represents the name of the collection and the value(s) represent the realization of that property. In accordance with the token structure adopted in the framework, constraints are placed on the values that may serve as the realization of a given property. A property set is thus any set of MARS 25 properties.

Further details of the property types allowed under MARS 25 are to be found in the MARS section following. Certain property values are also defined under MARS 25 and may also be found in the MARS section following. These include the property value of count that may be a single meaning that at most there may be one value for a given property or multiple meaning that there may be one or more values for a given property. Another property value is range which for any given property may be bounded or unbounded. In addition, the property value of ranking provides, for any given property, the set of allowed values for that property may be ordered by an implicit or explicit ordinal ranking, either presumed by all applications operating on or referencing those values or defined. Some property value types are ranked implicitly due to their type and subsequently the value ranges of all properties of such types are automatically ranked. Examples of such property types include Integer, Count, Date, Time and the like. Most properties with ranked value ranges are token types having a controlled set of allowed values which have a significant sequential ordering such as status, release, milestone and the like.

Ranking, if it is applied, may be either strict or partial. With strict ranking, no two values for a given property may share the same ranking. With partial ranking, multiple values may share the same rank, or may be unspecified for rank, having the implicit default rank of zero.

Ranked properties may only have single values. This is a special constraint which follows logically from the fact that ranking defines a relationship between objects having ranked values, and comparisons between ranked values becomes potentially ambiguous if multiple values are allowed. For example, if the values x, y, and z for property P have the ranking 1, 2, and 3 respectively, and object ‘foo’ has the property P(y) and object ‘bar’ has the property P(x,z), then a boolean query such as “foo.P<bar.P?” cannot be resolved to a single boolean result, as y is both less than z and greater than x. Thus the query is both true and false, depending on which value is chosen for bar.P (i.e. foo.P (y)<bar.P(x)=False, while foo.P(y)<bar.P(z)=True).

Ranking for all property types other than token are defined implicitly by the data type, usually conforming to fundamental mathematical or industry standard conventions. Ranking for token property values are specified using Ranking. In either case and as has already been stated, ranking may be strict in the sense that the set of allowed values for the given property corresponds to a strict ordering, and each value is associated with a unique ranking within that ordering. Alternatively, ranking may be partial in the sense that the set of allowed values for the given property corresponds to a partial ordering, and each value is associated with a ranking within that ordering, defaulting to zero if not otherwise specified. Finally, ranking may not be applied such that the set of allowed values for the given property corresponds to a free ordering, and any ranking specified for any value is disregarded.

Figure 3:
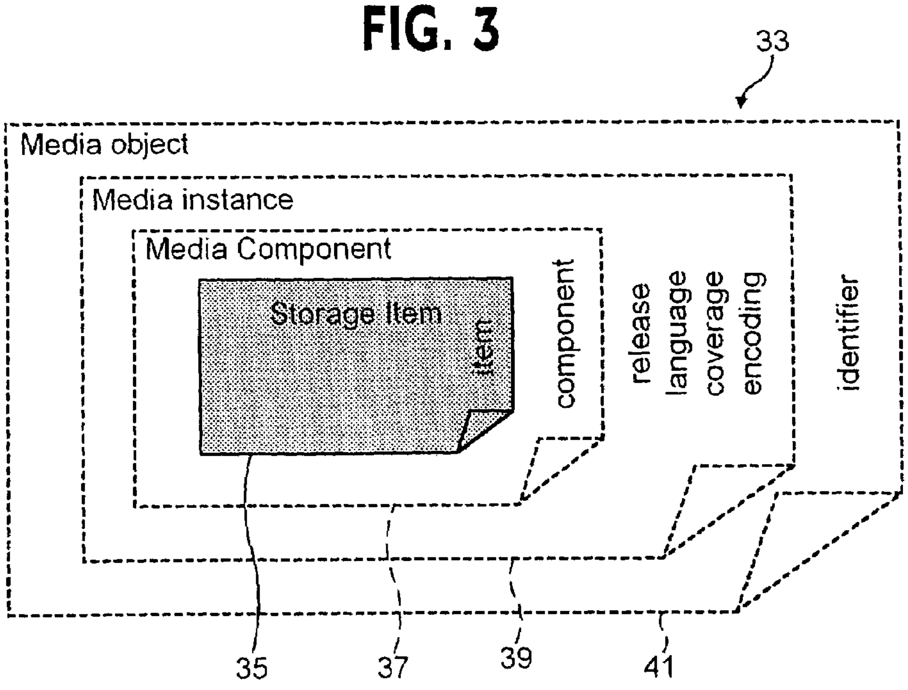
FIG. 3 is a block diagram of an identity architecture of the framework of FIG. 1

FIG. 3 shows a diagram of an identity architecture defined by a framework according to an exemplary preferred embodiment. The Identity architecture 33 may have a set of nested pre-determined definitions of specific scope each utilizing tokens to hold information. At the lowest level of scope, a Storage Item 35 corresponds to what would typically be stored in a single file or database record, and is the physical representation of the data that the framework is capable of manipulating. Thus, Items 35 are the discrete computational objects which are passed from process to process, and which form the building blocks from which the information space and the environment used to manage, navigate, and manipulate it are formed. Hence, an Item 35 may embody content, content fragments, metadata, revision deltas, or other information.

At the next highest level of scope, a Media Component 37 defines a particular realization of a defined token value. Thus, the Component 37 defines at an abstract level properties and characteristics of one of the following non-exhaustive content types, namely data, metadata, table of contents, index or glossary. A data content type might include a language, area of coverage, release or method of encoding. A component 37 is linked to one or more storage item 35 that relates to the content at a physical level.

Immediately, above the level of scope of the Media Component 37 is a Media Instance 39. The media instance 39 is made up of a number of media components 37 each of which relate to a particular property of an identifiable body of information. Thus, a particular Media Instance 39 may comprise a set of properties 37 namely a specific release, language, area of coverage and encoding method.

Finally, the highest level of scope is a Media Object 41 which represents an body of information corresponding to a common organizational concept such as a document, book, manual, chapter, section, sidebar, table, image, chart, diagram, graph, photograph, video segment, audio stream or the like.

However, the body of information is abstract to the extent that no specification is made of any particular language, coverage, encoding or indeed release. Thus, depending on the presence, or otherwise of information at the lower levels of scope, dictated ultimately by the existence or otherwise of a relevant Storage Item 35, it may be possible to realize some, if not all, particular media instances 39 corresponding to that media object 41.

In order to allow for referencing of specific content, namely a fragment within a given item, component, instance, or object, MARS 25 adopts the Worldwide Web Consortium (W3C) proposal for the XPointer standard for encoding such content specific references in SGML, HTML, or XML content. A fragment will be understood by those skilled in the art to be an identifiable linear sub-sequence of the data content of a component 37, either static or reproducible, which is normally provided where the full content is either too large in volume for a particular application or not specifically relevant. Those skilled in the art will also be aware of the W3C Xpointer proposal, however further details may be found from the W3C website which is presently located at www.w3c.org. XPointer is based on the XML Path Language (XPath). Through the selection of various properties, such as element types, attribute values, character content, and relative position, XPointer supports addressing within internal structures of XML documents and allows for traversals of a document tree. Thus, in place of structural references to data, the framework may provide that explicit element ID values are used for all pointer references thereby avoiding specific references to structural paths and data content. As a result, a framework according to the preferred embodiments ensures the maximal validity of pointer values to all realizations of a given media object, irrespective of language, coverage, encoding, or partitioning. In addition to the Xpointer standard proposal, other alternative/additional internal pointer mechanisms for other encodings may be utilized.

In addition to the above-described architecture, a framework according to the preferred embodiments provides rules that relate to the inheritance and versioning of the scoped definitions. Thus, the framework provides that metadata defined at higher scopes is inherited by lower scopes by ensuring that two rules are applied. Firstly, all metadata properties defined in higher scopes are fully visible, applicable, and meaningful in all lower scopes, without exception. Secondly, any property defined in a lower scope completely supplants any definition of the same property that might exist in a higher scope. Consequently, all metadata properties defined for a media object 41 may be inherited by all instances 39 of that object; and all metadata properties defined for a media instance 39 or media object 41 may be inherited by all of its components 37.

In relation to versioning, MARS 25 defines a versioning model using two levels of distinction. A first level is defined as a release, namely a published version of a media instance that is maintained and/or distributed in parallel to other releases. By way of example, a release could be viewed as a branch in a prior art tree based versioning model. A second level is defined as a revision corresponding to a milestone in the editorial lifecycle of a given release; or by way of example, a node on a branch of the prior art tree based model. MARS 25 defines and maintains versioning for 'data' storage item 35, only.

In addition to the Identity architecture described above, MARS 25 provides a management architecture that permits control of processes such as retrieval, storage, and version management. Details of the properties defined to provide such functionality might be found in the MARS section following. MARS 25 also provides affiliation properties that define an organizational environment or scope where data is corrected and maintained. Examples of such properties can also be found in the MARS section following.

MARS 25 further provides content properties that allow definition of data characteristics independent of the production, application or realization of that Data. Again, examples of such properties can be found in the MARS section following. MARS 25 also provides encoding properties defining special qualities relating to the format, structure or general serialization of data streams. These properties are, of course, of significance to tools and processes operating on that data. Yet again, examples of such properties can be found in the MARS section following. MARS 25 also provides association properties that define relationships relating to the origin, scope or focus of the content in relation to other data. Examples of such properties may be found in the MARS section following. Finally, MARS 25 provides role properties that specify one or more actors who have a relationship with the data. An actor may be a real user or a software application such as an agent. Examples of such properties may be found in the MARS section following.

As has been previously mentioned, a Generalized Media Archive (GMA) 27, based on Media Attribution and Reference Semantics (MARS) 25 metadata provides a uniform, consistent, and implementation independent model for the storage, retrieval, versioning, and access control of electronic media. Further details of the GMA may be found in the GMA section following. The GMA 27 and serves as the common archival model for all managed media objects controlled, accessed, transferred or otherwise manipulated by agencies operating with a framework according to the preferred embodiments. Hence, the GMA 27 may serve as a functional interface to wide range of archive implementations whilst remaining independent of operating system, file system, repository organization, versioning, mechanisms, or other implementation details. This abstraction facilitates the creation of tools, processes, and methodologies based on this generic model and interface which are insulated from the internals of the GMA 27 compliant repositories with which they interact.

The GMA 27 defines specific behavior for basic storage and retrieval, access control based on user identity, versioning, automated generation of variant instances, and event processing. The identity of individual storage items 35 is based on MARS metadata semantics and all interaction between a client and a GMA implementation must be expressed as MARS 25 metadata property sets.

The GMA manages media objects 41 via media components 37 and is made up of storage items 35. The GMA manages the operations of versioning, storage, retrieval, access control, generation and events as will be further described below. Examples of pseudo code corresponding to the above and other managed operations carried out by the GMA may be found in the GMA section following.

The GMA 27 operates on the basis of MARS 25 metadata and as a result of its operation the GMA 27 acts on that same metadata. The metadata operated on by the GMA 27 may be restricted to management metadata rather than content metadata. The former being metadata concerned with the history of the physical data, such as retrieval and modification history, creation history, modification and revision status, whereas the latter is concerned with the qualities and characteristics of the information content as a whole, independent of its management. Content metadata is stored as a separate 'meta' component 37, not a 'meta' item 35, such that the actual specification of the content metadata is managed by the GMA 27 just as any other media component 37. The metadata that is of primary concern to a GMA 27, and which a GMA accesses, updates, and stores persistently, is the metadata associated with each component 37.

A GMA 27 manages media components 37, and the management metadata for each media component 37 is stored persistently in the 'meta' storage item of the media component 37. A special case exists with regards to management metadata which might be defined at the media instance 39 or media object 41 scope, where that metadata is inherited by all sub-components 37 of the higher scope(s) in accordance with the inheritance rules set out above.

In order to provide the necessary functionality, the GMA 27 requires that the certain metadata properties are defined in an input query and/or in respect of any target data depending on the action being performed and which functional units are implemented. These properties are set out in the GMA section, Section 4.1.2-4, following. In accordance with inheritance rules defined in MARS 25, retrieval of metadata for a given media component scope includes all inherited metadata from media object and media instance scopes. In addition, the GMA 27 will assume the default values as defined by the MARS 25 specification for all properties which it requires but that are not specified explicitly. It is an error for a required property to have neither a default MARS 25 value nor an explicitly specified value. In addition to relying on existing metadata definitions, the GMA 27 is responsible for defining, updating, and maintaining the management metadata relevant for the 'data' item 35 of each media component 37, which is stored persistently as the 'meta' item 35 of the component 37.

The GMA 27 stores 'meta' item 35, containing management metadata, in any internal format; however the GMA must accept and return 'meta' storage items as XML (eXtensible Mark-up Language) instances. However, content metadata constituting the data content of a 'meta' component 37 and stored as the 'data' item 35 of the 'meta' component 37, must always be a valid XML instance.

These two constraints ensure that an agent interacting with the GMA 27 is able to retrieve from or store to the GMA 27 both content and management metadata as needed. The GMA 27 is also able, as a consequence of these constraints to resolve inherited management metadata from meta components at higher scopes in a generic fashion.

In order to store and retrieve items, the GMA 27 associates electronic media data streams to MARS 25 storage item identities and makes persistent, retrievable copies of those data streams indexed by their MARS 25 identity. The GMA 27 also manages the corresponding creation and modification of time stamps in relation to those items. The GMA 27 organizes both the repository 21 of storage items 35 as well as the mapping mechanisms relating MARS identity metadata to locations within that repository 21. The GMA 27 may be implemented in any particular technology including, but not limited to common relational or object oriented database technology, direct file system storage, or any number of custom and/or proprietary technologies.

In addition to the core storage and retrieval actions provided by the GMA 27, the GMA 27 is capable of providing the functionality necessary to permit operations by agents in relation to versioning, access control, generation, and/or events. The GMA 27 will exhibit a pre-defined behavior, to the extent that such functionality is provided by it.

Thus, if the GMA 27 implements access control, then access control of media 15 components 37 is based on several controlling criteria as defined for the environment in which the GMA resides and as stored in the metadata of individual components managed by the GMA. Access control is defined for entire components and not for individual items within a component. Access control may also be defined for media objects 41 and media instances 39, in which case subordinate media components 37 inherit the access configuration from the higher scope(s) in the case that it is not defined specifically for the component. The four controlling criteria for media access are User identity, Group membership(s) of user, Read permission for user or group and Write permission for user or group.

Accordingly, every user must have a unique identifier within the environment in which the GMA operates, and the permissions must be defined according to the set of all users and groups within that environment.

A user may be a human, but also can be a software application, process, or system typically referred to as an agent 13. This is especially important for both licensing as well as tracking operations performed on data by automated software agents 13 operating within the GMA 27 environment. Furthermore, any user may belong to one or more groups, and permissions may be defined for an entire group, and thus for every member of that group. Consequently, the maintenance overhead in environments with large numbers of users and/or high user turnover many users coming and going is reduced. In a manner similar to the inheritance rules applied by MARS 25, permissions defined for explicit user override permissions defined for a group of which the user is a member. For example, if a group is allowed write permission to a component 37, but a particular user is explicitly denied write permission for that component 37, then the user may not modify the component 37.

The GMA 27 may also provide read permission such that a user or group may retrieve a copy of the data. Where a lock marker is placed in relation to data, it does not prohibit retrieval of data, merely modification of that data. If access control is not implemented, and/or unless otherwise specified globally for the GMA 27 environment or for a particular archive, or explicitly defined in the metadata for any relevant scope, a GMA 27 must assume that all users have read permission to all content.

Similarly, the GMA 27 may also provide Write permission that means that the user or group may modify the data by storing a new version thereof. The GMA 27 provides that write permission equates to read permission such that every user or group which has write permission to particular content also has read permission. This overrides the situation where the user or group is otherwise explicitly denied read permission.

As in the case of read permission, the presence of a lock marker prohibits modification by any user other than the owner of the lock, including the owner of the component 32 if the lock owner and component owner are different. Optionally, the GMA 27 provides a means to defeat locking as a reserved action unavailable to general users. Should locking be defeated in this manner then the GMA 27 logs the event and notifies the lock owner accordingly.

Where access control is not implemented, then the GMA 27 applies the rule that all users have write permission to all content. If access control is implemented, and unless otherwise specified globally for the GMA 27 environment or for a particular archive or explicitly defined in the metadata for any relevant scope, the GMA 27 must assume that no users have write permission to any content. Regardless of any other metadata defined access specifications not including settings defined globally for the archive, the owner of a component 37 always has write access to that component 32.

In addition to blanket access control, the GMA 27 may, if access control is enabled provide a set of access levels which serve as convenience terms when defining, specifying, or discussing the "functional mode" of a particular GMA 27 with regard to read and write access control.

Access levels can be used as configuration values by GMA 27 implementations to specify global access behavior for a given GMA 27 where the implementation is capable of providing multiple access levels. At each level the read and write capability may be predefined subject to the overriding rule that a read right may never fall below the corresponding write right.

The GMA 27 may implement versioning. Through the implementation of versioning, the GMA 27 facilitates the identification, preservation, and retrieval of particular revisions in the editorial lifecycle of a particular discrete body of 30 data.

The versioning model used by the GMA 27 and further description in the GMA section, section 4.5 following, in particular defines a release as a series of separately managed and independently accessible sequences of revisions. Revisions are defined as 'snapshots' along a particular release. Where a release is derived from another release then the GMA 27 updates a MARS 25 source property to identify from what release and revision the new release stems. Within the above rules, the GMA 27 is responsible for linear sequence of revisions within a particular release. The GMA 27 is responsive to external agent 13 activities that are themselves responsible for the automated or semi-automated creation or specification of new instances 39 relating to distinct releases. The GMA is also responsive to agent 13 activities relating to the retrieval of revisions not unique to a particular release. Typically, a human editor manually performs the creation of new releases, including the specification of 'source' and any other relevant metadata values. Other tools, external to the GMA 27 may also exist to aid users in performing such operations.

A GMA 27 performs versioning for the 'data' item 35 of a media component 37 only and that sequence of revisions constitutes the editorial history of the data content of the media component 37. The GMA 27 is also responsible for general management and updating of creation, modification and other time stamp metadata. Storage or update of items other than the 'data' item 35 neither effect the status of management metadata stored in the 'meta' item 35 of the component 37 unless the item 35 in question is in fact the 'meta' 35 item of the component 37, nor are reflected in the revision history of the component 37. If a revision history or particular metadata must be maintained for any MARS 25 identifiable body of content, then that content must be identified and managed as a separate media component 37, possibly belonging to a separate media instance 39.

Revisions are identified by positive integer values utilizing MARS 25 property type Count values. The scope of each media component 37 is unique and revision values have significance only within the scope of each particular media component 32. Revision sequences should begin with the value '1' and proceed linearly and sequentially. The GMA 27 implementation is free to internally organize and store past revisions in any fashion it chooses.

The GMA 27 may implement one or both of the following described methods for storing past revisions of the content of a media component. However, regardless of its internal organization and operations, the GMA 27 must return any requested revision as a complete copy.

One method that the GMA 27 may employ to store past revisions is to generate snapshots. A snapshot is a complete copy of a given revision at a particular point in time. As such snapshotting is straightforward to implement, and possibly time consuming regeneration operations are not needed to retrieve past revisions. The latter can be very important in an environment where there is heavy usage and retrieval times are a concern.

Alternatively or in conjunction with snapshots, the GMA 27 may store past revisions through a reverse delta methodology. A delta is set of one or more editorial operations that can be applied to a body of data to consistently derive another body of data. A reverse delta is a delta that allows one to derive a previous revision from a former revision. Rather than store the complete and total content of each revision, the GMA 27 stores the modifications necessary to derive each past revision from the immediately succeeding later revision. To obtain a specific past revision, the GMA 27 begins at the current revision, and then applies the reverse deltas in sequence for each previous revision until the desired revision is reached.

In a variant of the above, the GMA 27 utilizes a forward delta methodology where each delta defines the operations needed to derive the more recent revision from the preceding revision.

The GMA 27 may also implement generation through the dynamically creating data streams from one or more existing storage items 35. By way of example, this includes conversions from one encoding or format to another, extraction of portions of a component's content, auto-generation of indices, tables of contents, bibliographies, glossaries, and the like as new components 37 of a media instance 39, generation of usage, history, and/or dependency reports based on metadata values, generation of metadata profiles for use by one or more registry services.

The GMA 27 also provides dynamic partitioning whereby a fragment of the data content is returned in place of the entire 'data' item, optionally including automatically generated hypertext links to preceding and succeeding content, and/or information about the structural/contextual qualities of the omitted content, depending on the media encoding. The GMA 27 may implement dynamic partitioning irrespective of whether static fragments exist. Dynamic partitioning is controlled by one or possibly two metadata properties, in addition to those defining the identity of the source data item. The required property is size that determines the maximum number of bytes which the fragment can contain starting at the beginning of the data item. Whereas the second and optional property is pointer that defines the point within the data item from which the fragment is extracted. Thus, the GMA 27 extracts the requested fragment, starting either at the beginning of the data item, where no pointer is defined or at the point specified by the pointer value that may be at the start of the data item if the pointer value is zero. The GMA 27 collects the largest coherent and meaningful sequence of content up to but not exceeding the specified number of content bytes. What constitutes a coherent and meaningful sequence will depend on the media encoding of the data and possibly interpretations inherent in the GMA 27 implementation itself.

A GMA 27 may implement event handling. Accordingly, for each storage item, media component 37, media instance 39, or media object 41, a set of one or more MARS 25 property sets defining some operation(s) can be associated with each MARS 25 action, such that when that action is successfully performed on that item 35, component 37, instance 41, or object, the associated operations are executed. Automated operations are thus defined for the source data and not for any target data that might be automatically generated as a result of an event triggered operation. Each operation property set must specify the necessary metadata properties to be executed correctly, such as the action(s) to perform and possibly including the CGI URL of the agency that is to perform the action. The GMA 27 determines how a given operation is to be performed, and by which software component or agent 13 if otherwise unspecified in the property set(s).

In the case of a remove action, which will result in the removal of any events defined at the same scope as the removed data, the GMA 27 will execute any operations associated with the remove action defined at that scope, after successful removal of the data, even though the operations themselves are part of the data removed and will never be executed again in that context.

The most common type of operation for events is a compound 'generate store' action which generates a new target item from an input item and stores it persistently in the GMA 27, taking into account all versioning and access controls in force. By this operation, it is possible to automatically update components such as the toc (Table of Contents) or index when a data component 37 is modified, or generate static fragments of an updated data component 37.

The GMA 27 may associate automated operations globally for any given action provided the automated operations are defined in terms of MARS 25 property sets. Automated operation may also be applied within the scope of the data being acted upon. The GMA 25 may also associate automated operations with triggers other than MARS 25 actions, such as reoccurring times or days of the week, for the purpose of removing expired data such as via a 'locate remove' compound action.

The GMA 27 must also apply the following rules relating to the serialization and encoding of certain storage items. Thus, the GMA 27 provides that every 'meta' storage item that is presented to a GMA 27 for storage or returned by a GMA 27 on retrieval must be a valid XML instance. Metadata property values "contained" within 'meta' storage items 35 need not be stored or managed internally in the GMA 27 using XML, but every GMA 27 implementation must accept and return 'meta' items as valid XML instances. In the case of 'data' Storage Items 35 within 'meta' Media Components 37, the serialization of 'meta' storage items 35 is also used to encode all 'data' storage items 35 for all 'meta' components 37. Although the GMA 27 persistently stores all 'data' storage items 35 literally, it may also choose to parse and extract a copy of the metadata property values defined within meta component data items to more efficiently determine inherited metadata properties at specific scopes within the archive 27.

Every 'idmap' storage item which is presented to a GMA 27 for storage or returned by a GMA 27 on retrieval should be encoded as a Comma Separated Value (CSV) data stream defining a table with two columns where each row is a single mapping and where the first column/field contains the value of the 'pointer' property defining the symbolic reference and the second column/field contains the value of the 'fragment' property specifying the data content fragment containing the target of the reference, for example:

#EID284828,228

#EID192,12

#EID9928,3281

#EID727,340

The mapping information "contained" within 'idmap' storage items need not be stored or managed internally in the GMA 27 in CSV format, but every GMA 27 implementation accepts and returns 'idmap' items as CSV formatted data streams.

Finally, the GMA 27 returns the complete and valid contents of a given 'data' storage item for a specified revision (if it exists), regardless how previous revisions are managed internally. Reverse deltas or other change summary information which must be applied in some fashion to regenerate or rebuild the desired revision must not be returned by a GMA 27, even if that is all that is stored for each revision data item internally. Only the complete data item is to be returned.

In order to implement the GMA 27 across a physical system 1, the concept of a Portable Media Archive (PMA) 29 has already been introduced. The PMA provides a physical organizational model of a file system based data repository 21 conforming to and suitable for implementations of the Generalized Media Archive (GMA) 27 abstract archival model. The PMA section following provides further details of the PMA 29.

The PMA 29 defines an explicit yet highly portable file system organization for the storage and retrieval of information based MARS 35 metadata. Accordingly, the PMA 29 uses the MARS Identity and Item Qualifier metadata property values themselves as directory and/or file names. Where the GMA 27 utilizes a physical organization, model other than the PMA 29. The PMA 29 may nevertheless be employed by such an implementation as a data interchange format between disparate GMA 27 implementations and/or as a format for storing portable backups of a given archive 21.

The PMA 29 is structured physically as a hierarchical directory tree that follows the MARS object/instance/component/item scoping model. Each media object 41 comprises a branch in the directory tree, each media instance 39 a sub-branch within the object branch 41, each media component 32 a sub-branch within the instance 39, and so forth. Only MARS Identity and Item Qualifier property values are used to reference the media objects 41 and instances 39. All other metadata properties as well as Identity and Qualifier properties are defined and stored persistently in 'meta' storage items 35; conforming to the serialization and interchange encodings used by the GMA 27 and referred to above. Because Identity and Item Qualifier properties must be either valid MARS tokens or integer values, it will be appreciated by one skilled in the art that any such property value is likely to be an acceptable directory or file name in all major file systems in use today.

More particularly, the media object scope is encoded as a directory path consisting of a sequence of nested directories, one for each character in the media object 'identifier' property value. For example:

Identifier="dn9982827172" gives d/n/9/9/8/2/8/2/7/1/2/

Identifier values are broken up in this fashion in order to support very large numbers of media objects, perhaps up to millions or even billions of such objects, residing in a given archive 21. By employing only one character per directory, the PMA 29 ensures that there will be at most 37 child sub-directories within any given directory level that is one possible sub-directory for each character in the set [a–z0–9_] allowed in MARS token values. Accordingly, the sub-directory structure satisfies the maximum directory children constraints of most modern file systems. The media object 41 scope may contain media instance 39 sub-scopes or media component 37 sub-scopes; the latter defining information, metadata or otherwise, which is shared by or relevant to all instances of the media object 41. The media instance 39 scope is encoded as a nested directory sub-path within the media object 41 scope and consisting of one directory for each of the property values for 'release', 'language', 'coverage', and 'encoding', in that order. For example:

release="1" language="en" coverage="global" encoding="xhtml" gives 1/en/global/xhtm/1/

The media component 37 scope is encoded as a sub-directory within either the media object 41 scope or media instance 39 scope and named the same as the component 37 property value. For example:

component="meta" gives meta/

The revision scope, grouping the storage items for a particular revision milestone, is encoded as a directory sub-path within the media component 37 scope beginning with the literal directory 'revision' followed by a sequence of nested directories corresponding to the digits in the non-zero padded revision property value. For example:

revision="27" gives revision/2/7/

The 'data' item 35 for a given revision must be a complete and whole snapshot of the revision, not a partial copy or set of deltas to be applied to some other revision or item. It must be fully independent of any other storage item insofar as its completeness is concerned.

The fragment scope, grouping the storage items for a particular static fragment of the data component content, is encoded as a directory sub-path within the media component 32 scope or revision scope and beginning with the literal directory 'fragment' followed by a sequence of nested directories corresponding to the digits in the non-zero padded fragment property value. For example:

fragment="5041" gives fragment/5/0/4/1/

The event scope, grouping action triggered operations for a particular component 37, instance 39, or object 41, is encoded as a directory sub-path within the media component 32 scope, media instance 39 scope, or media object 41 scope and beginning with the literal directory 'events' and containing one or more files named the same as the MARS action property values, each file containing a valid MARS XML instance defining the sequence of operations as ordered property sets. For example:

events/store
events/retrieve
events/unlock

The storage item 35 is encoded as a filename within the media component, revision, or fragment scope and named the same as the item property value. For example:

item="data" gives data

The PMA 29 does not have any minimum requirements on the capacities of host file systems, nor absolute limits on the volume or depth of conforming archives. However, it will be appreciated by those skilled in the art that an understanding of the variables that may affect portability from one file system to another is important if data integrity is to be maintained. Nevertheless, the PMA 29 does define the following recommended minimal constraints on a host file system, which should be met, regardless of the total capacity or other capabilities of the file system in question:

File and Directory Name Length: 30

Directory Depth: 64

Number of Directory Children: 100

The above specified constraints are compatible with the following commonly used file systems, which are therefore suitable for hosting a PMA 29 which also does not exceed real constraints of the given host file system: VFAT (Windows 95/98), NTFS (Windows NT/2000), HFS (Macintosh), HPFS (OS/2), HP/UX, UFS (Solaris), ext2 (Linux), ISO 9660 Levels 2 and 3 (CDROM), and UDF (CDRJW, DVD). These are but a representative sample of file systems that are suitable for hosting a PMA 29. The PMA section following provides an example of file system organization for a PMA 29.

Figure 4:
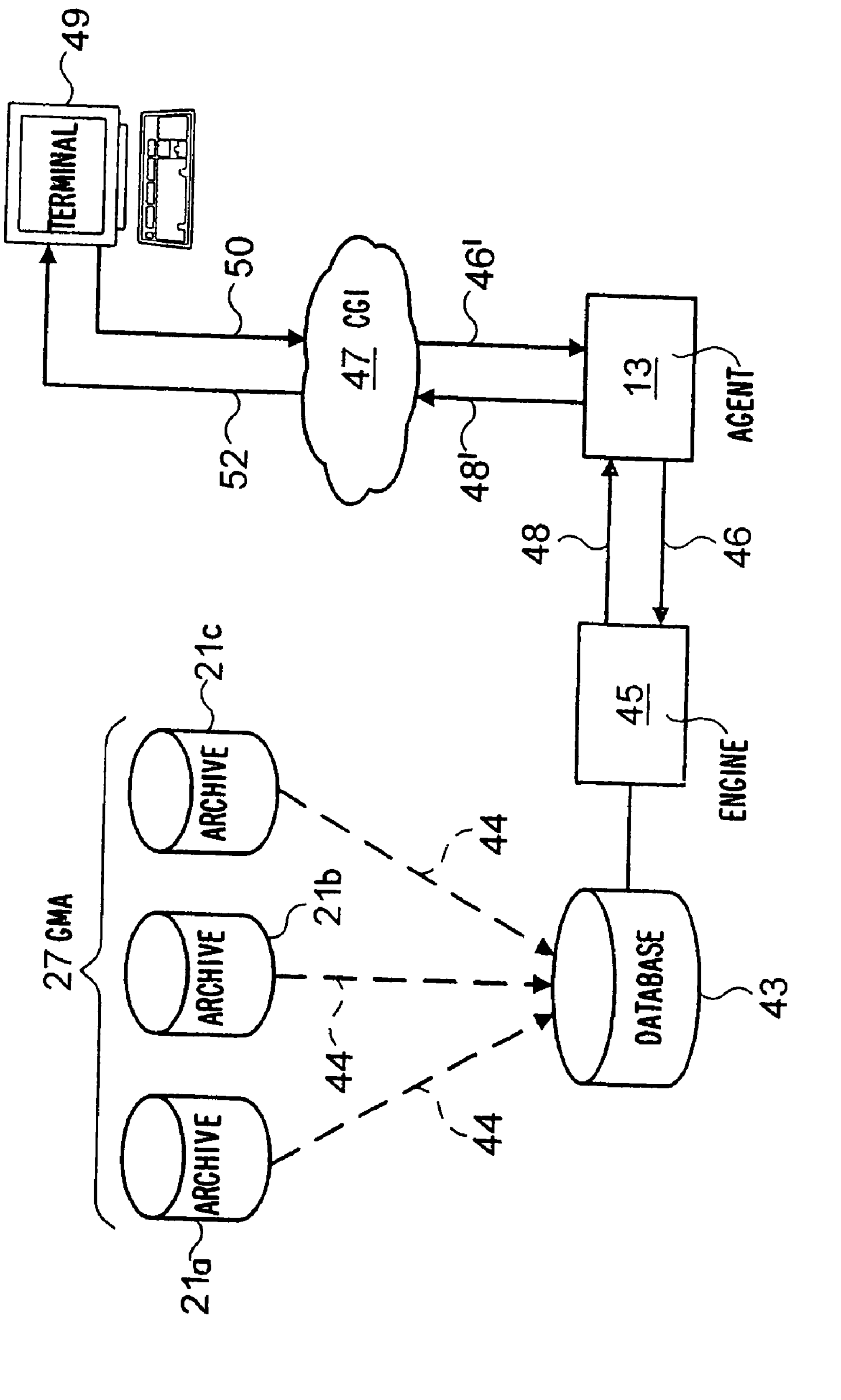
FIG. 4 is a block diagram of a registry service of the framework of FIG. 1.

FIG. 4 shows a diagram of a Registry Service architecture according to an exemplary preferred embodiment. In order to facilitate access by agents to the data 15 held within the framework, a Registry Service architecture (REGS) 31 is defined which provides for dynamic query resolution agencies based on MARS 25, thereby providing a unified interface model for a broad range of search and retrieval tools. The REGS section following provides further details of REGS.

REGS 31 provides a generic means to interact with any number of specialized search and retrieval tools using a common set of protocols and interfaces based on a Framework according to the preferred embodiments utilizing MARS metadata semantics and either a POSIX or CGI compliant interface. As with other Framework components, this allows for much greater flexibility in the implementation and evolution of particular solutions while minimizing the interdependencies between the tools and their users, be they human or software agents 13.

Being based on MARS 25 metadata allows for a high degree of automation and tight synchronization with the archival and management systems used in the same environment, with each registry service deriving its own registry database 43 directly from the metadata stored in and maintained by the various archives 21*a*, 21*b* or 21*c* themselves; while at the same time, each registry service 43 is insulated from the implementation details of and changes in the archives from which it receives 44 its information. As shown in FIG. 4, each variant of REGS 31 may share a common architecture and fundamental behavior, differing only in the actual metadata properties required for its particular application.

A key feature of the registry database 43 architecture is the provision in every case, of a profile or property set which, in addition to any non-identity related properties, explicitly defines the identity of a specific media object, media instance, media component, or storage item (possibly a qualified data item). Default values for unspecified identity properties are not applied to a profile and any given profile may not have scope gaps in the defined Identity properties (i.e., 'item' defined but not 'component', etc.). Profiles should unambiguously and precisely identify a media object, instance, component or item.

In addition to identity, the retrieval location of the archive 21*a*, 21*b* or 21*c* or other repository where that information resides must be specified either using the 'location' or 'agency' properties. If both are specified, they must define the equivalent location. The additional properties included in any given profile are defined by the registry service operating on or returning the profile, and may not necessarily contain any additional properties other than those defining identity and location.

In order to access the content held within a framework according to the preferred embodiments, the agent 13 or other user creates a search mask in the form of a query 46. The query 46 is a particular variant of the above-described profile set that defines a set of property values which are to be compared to the equivalent properties in one or more profiles. A query differs from a regular property set in that it may contain values that may deviate from the MARS 25 specification in that properties normally allowing only a single value may have multiple values defined in a query 46.

The normal interpretation of multiple query values is to apply 'OR' logic such that the property matches if any of the query values match any of the target values; however, a given registry service is permitted, depending on the application, to apply 'AND' logic requiring that all query values match a target value, and optionally that every target value is matched by a query value. Accordingly, it must be clearly specified for a registry service if 'AND' logic is being applied to multiple query value sets. Furthermore, query values for properties of MARS type String may contain valid POSIX regular expressions rather than literal strings; in which case the property matches if the specified regular expression pattern matches the target value. Query values may be prefixed by one of several comparison operators, with one or more mandatory intervening space characters between the operator and the query value. The order of comparison for binary operators is: query value {operator} target value.

Not all comparison operators are necessarily meaningful for all property value types, nor are all operators required to be supported by any given registry service. It must be clearly specified for every registry service which, if any, comparison operators are supported in input queries.

In the rare case that a literal string value begins with a comparison operator followed by one or more intervening spaces, the initial operator character should be preceded by a backslash character '\'. The registry service must then identify and remove the backslash character before any comparisons. Examples of some comparison operators are given below:

Negation "!"

The property matches if the query value fails to match the target value. E.g. "! approved".

LessThan "<"

The property matches if the query value is less than the target value. E.g. "<2.5".

Greater Than ">"

The property matches if the query value is greater than the target value. E.g. ">draft".

Less Than or Equal To "<="

The property matches if the query value is less than or equal to the target value. E.g. "<=2000-09-22".

Greater Than or Equal To

The property matches if the query value is greater than or equal to the target value. E.g. ">=5000".

Wildcard Value Operator

Any property in a query may have specified for it the special value regardless of property type, which effectively matches any defined value in any target. The wildcard value does not however match a property which has no value defined for it. The wildcard value operator may be preceded by the negation operator.

The special wildcard operator is particularly useful for specifying the level of Identity scoping of the returned profiles for a registry 43 that stores profiles for multiple levels of scope. It is also used to match properties where all that is of interest is that they have some value defined but it does not matter what the value actually is. Alternatively, when combined with the negation operator, to match properties that have no value defined. The latter is useful for validation and quality assurance processes to isolate information that is missing mandatory or critical metadata properties.

The wildcard value operator should be preceded by a backslash character '\' in the rare case that a literal string value equals the wildcard value operator. The registry service should then identify and remove the backslash character before any comparisons.

Each variant of REGS 31 has the following commonality of architecture which is defined by the metadata properties it allows and requires in each profile, the metadata properties it allows and requires in a given search query and whether returned profiles are scored and ordered according to relevance. These three criteria define the interface by which the registry service interacts with all source archives and all users.

A particular registry service will extract from a given archive 27 or be provided by or on behalf of the archive the profiles for all targets of interest which a user may search on, and containing all properties defined for each target which are relevant to the particular registry 43. There profiles are stored in the database 43. Depending on the nature of the registry 43, this may include profiles for both abstract media objects 41, media instances, and media components 37 as well as physical storage items 35 or even qualified data items. Some property values for a profile may be dynamically generated specifically for the registry 43, such as the automated identification or extraction of keywords or index terms from the data content, or similar operations.

The profiles from several archives 21*a*, 21*b* or 21*c* may be combined by the registry service into a single search space 43 for a given application or environment. The location and/or agency properties serve to differentiate the source locations of the various archives 21*a*, 21*b* or 21*c* from which the individual profiles originate.

All registry services 43 define and search over profiles, and those profiles define bodies of information at either an abstract or physical scope; i.e. media objects 41, media instances 39, media components 37, or storage items 35. A given registry database might contain profiles for only a single level of scope or for several levels of scope.

If a query 46 does not define any Identity properties, then the registry service 20 via a query resolution engine 45 should return 48 all matching profiles regardless of scope; however, if the query 46 defines one or more Identity properties, then all profiles returned 48 by the engine 45, should be of the same level of scope as the lowest scoped Identity property defined in the search query 46.

A specific level of scope can be specified in a query 46 by using the special wildcard value "*" for the scope of interest (e.g. "component=meta item=* . . . " to find all storage items within meta components which otherwise match the remainder of the query).

Each set of profiles returned for a given search may be optionally scored and ordered by relevance by the engine 45, according to how closely they match the input query 46. The score must be returned as a value to the MARS 'relevance' property. The criteria for determining relevance is up to each registry service 43, but it must be defined as a percentage value where zero indicates no match whatsoever, 100 indicates a "perfect" match (however that is defined by the registry service), and a value between zero and 100 reflects the closeness of the match proportionally. The scale of relevance from zero to 100 is expected to be linear.

A registry service 43 can be directed by a user, or by implementation, to apply two types of thresholds to constrain the total number of profiles 48 returned by a given search 46. Both thresholds may be applied together to the same search results. The MARS 'size' property can be specified in the search query (or applied implicitly by the registry service) to define the maximum number of profiles to be returned 48. In the case that profiles are scored and ordered by relevance, the maximum number of profiles is to be taken from the highest scoring profiles.

Similarly, the MARS 'relevance' property can be specified in the search query (or applied implicitly by the registry service) to define the minimum score that must be equaled or exceeded by every profile returned. In this regard specifying a minimum relevance of 100 requires that targets match perfectly, allowing the user or agent to select between best match and absolute match.

All property sets (including profiles and queries) which are received/imported by and returned/exported from a registry service via a data stream should be encoded as XML instances conforming to the MARS DTD. This includes sets of profiles extracted from a given archive 44, search queries 46 received from client applications, and sets of profiles returned as the results of a search 48.

If multiple property sets are defined in a MARS XML instance provided as a search request 46, then each property set is processed as a separate query 46, and the results of each query 46 returned 48 in the order specified, combined in a single XML instance. Any sorting or reduction by specified thresholds is done per each query only 46. The results 48 from the separate queries 46 are not combined in any fashion other than concatenated into the single returned XML instance.

Every registry service may organize and manage its internal registry database using whatever means is optimal for that particular service. It is not required to utilize or preserve any XML encoding of the profiles.

Most registry services 43 may include an additional CGI or other web based component 47 that provides a human-usable interface for a terminal 49 operable fan specifying queries 46 and accessing search results 48. This typically acts as a specialized proxy to the general registry service, converting the user specified metadata 50 to a valid MARS query 46' and then mapping the returned XML 48' instance containing the target profiles to HTML 52 for viewing and selection.

The interface or proxy component 47 preferably provides the following functionality in delivering results to the user. The set of returned profiles should be presented as a sequence of links, preserving any ordering based on relevance scoring. Each profile link should be encoded as an (X)HTML 'a' element within a block element or other visually distinct element ('p', 'i', 'td', etc.). The URL value of the 'href' attribute of the 'a' element should be constructed from the profile, based on the 'location' and/or 'agency' properties, which will resolve to the content of (or access interface for) the target. If the 'relevance' property is defined in the profile, its value should begin the content of the 'a' element, differentiated clearly from subsequent content by punctuation or structure such as parentheses, comma, colon, separate table column, etc. If the 'title' property is defined in the profile, its value should complete the content of the 'a' element. Otherwise, a (possibly partial) MRN should be constructed from the profile and complete the content of the 'a' element.

Examples:

<html>

<body>

<p>

<a href="http://xyz.com/GMA?action=retrieve& identifier= . . . ">(98)Foo</a>

</p>

<p>

<a href="http://xyz.com/GMA?action=retrieve& idefltifier . . . ">(87)Bar</a>

</p>

<p>

<a href="http://xyz.com/GMA?action=retrieve& idefltifier= . . . ">(37)Bas</a>

<p>

</body>

</html>

<html>

<body>

<table>

<tr>

<th>Score</th>

<th>Target</th>

</tr>

<tr>

<td>98</td>

<td><a href="http://xyz.com/GMA? action=retrieve& identifier= . . . ">Foo</a></td>

</tr>

<tr>

<td>87</td>

<td><a href="http://xyz.com/GMA?action=retrieve& identifier= . . . ">Bar</a></td>

</tr>

<tr>

<td>37</td>

<td><a href="http://xyz.com/GMA?action=retrieve& identifier= . . . ">Bas</a></td>

</tr>

</table>

</body>

</html>

In order to assist still further in understanding this aspect of the preferred embodiments, a number of different examples of REGS 31 suited to particular activities are set out below. In each case, a brief description is provided, as well as a specification of which metadata properties are required or allowed for profiles and for queries. The 'action' property may be required to be specified with the value 'locate' in all registry service queries, therefore, it is not included in the required query property specifications for each registry service. Likewise, the 'relevance' and 'size' properties are allowed for all input queries to all registry services, therefore, they are also not explicitly listed in the allowed query property specifications for each registry service.

Metadata Registry Service (META-REGS) provides for searching the complete metadata property sets (including inherited values) for all identifiable bodies of information, concrete or abstract; including media objects, media instances, media components, storage items and qualified data items. The results of a search are a set of profiles defining zero or more targets at the lowest level of Identity scope for which there is a property defined in the search query. All targets in the results may be of the same level of scope, even if the registry database contains targets at all levels of scope.

The wildcard operator can be used to force a particular level of scope in the results. For example, to define media instance scope, only one instance property need be defined with the wildcard operator value (e.g. "language=*"); to define media component scope, the component property can be defined with the wildcard operator value (e.g. "component=*"); etc. The registry service may not require nor expect that any particular instance property be used, nor that only one property be used. It may not be permitted for two or more instance properties to have both wildcard and negated wildcard operator values in a given input query.

The default behavior is to provide the best matches for the specified query; however, by defining in the input query a value of 100 for the 'relevance' property, the search results may only include those targets which match the query perfectly. The former is most useful for general browsing and exploration of the information space and the latter for collection and extraction of specifically defined data.

Required profile properties for META-REGS include all Identity properties required to uniquely identify the body of information in question, as well as either the 'location' or 'agency' property. Allowed profile properties for META-REGS include any valid MARS property, in this case being all defined MARS properties applicable to the body of information in question. It is preferred that the 'title' property be defined for all profiles, whenever possible.

There are no required query properties for META-REGS although at least one property must be specified in the search query other than the 'action' property. Allowed query properties for META-REGS include any valid MARS property.

Content Registry Service (CON-REGS) provides for searching the textual content of all media instances within the included archives. It corresponds to a traditional "free-text index" such as those employed by most web sites. The results of a search are a set of profiles defining zero or more data component data storage items or qualified data items.

Profiles may be defined only for data storage items and qualified data items (e.g. fragments) that belong to the data component of a media instance. Other components and other items belonging to the data component should not be included in the search space of a CON-REGS registry service. Note that in addition to actual fragment items, profiles for "virtual" fragments can be defined using a combination of the 'pointer' and (if needed) 'size' properties, where appropriate for the media type (e.g. for specific sections of an XML document instance).

For each data item, the 'keywords' property may be defined as the unique, minimal set of index terms for the item, typically corresponding to the morphological base forms (linguistic forms independent of inflection, derivation, or other lexical variation) excluding common "stop" words such as articles ("the", "a"), conjunctions ("and", "whereas"), or semantically weak words ("is", "said"), etc. It is expected that the same tools and processes for distilling arbitrary input into minimal forms are applied both in the generation of the registry database as well as for all relevant input query values.

The scope of the results, such as whole data items versus fragments, can be controlled using the 'fragment' property and the wildcard value operator "*" for the scope of interest. For example, "fragment=*" will force the search to only return profiles of matching fragments and not of whole data items; whereas "fragment=!*" will only return profiles of matching whole data storage items. If otherwise unspecified, all matching profiles for all items will be returned, which may result in redundant information being identified.

A human user interface will likely hide the definition of the 'fragment' property behind a more mnemonic selection list or set of checkboxes, providing a single field of input for the query keywords. If a given value for the 'keywords' property contains multiple words separated by white space, then all of the words must occur adjacent to one another in the order specified in the target content. Note that this is not the same as multiple property values where each value contains a single word. The set of all property values (string set) constitute an OR set, while the set of words in a single property value (string) constitute a sequence (phrase) in the target. White space sequences in the query property value can be expected to match any white space sequence in the target content, even if those two sequences are not identical (i.e. a space can match a newline or tab, etc.).

A human user interface 47 provides a mechanism for defining multiple 'keywords' property values as well as for differentiating between values having a single word and values containing phrases or other white space delimited sequences of words. In the interest of consistency across registry services, when a single value input field is provided for the 'keywords' or similar property, white space may be used to separate multiple values by default and multi-word values are specially delimited by quotes to indicate that they constitute the same value (e.g., the field [a b "c1 c2 c3" d] defines t four values, the third of which has three words).

It is permitted for special operators or commands to CON-REGS to be interspersed within the set of 'keywords' values, such as those controlling boolean logic, maximal or minimal adjacency distances, etc. It is up to the registry service to ensure that no ambiguity arises between CON-REGS operators and actual values or between REGS special operators and CON-REGS operators. REGS special operators always take precedence over any CON-REGS operators.

Required CON-REGS profile properties are all Identity and Qualifier properties required to uniquely identify each data storage item or qualified data item in question; either the 'location' or 'agency' property; and the 'keywords' property containing a unique, minimal set of index terms for the item in question. Allowed CON-REGS profile properties are all required properties, as well as the 'title' property (recommended).

Required CON-REGS query properties are the 'keywords' property containing the set of index terms to search on which may need to be distilled into a unique, minimal set of base forms by the registry service. Allowed CON-REGS query properties are all required properties, as well as the 'fragment' property with either wildcard value or negated wildcard value only.

Typological Registry Service (TYPE-REGS) provides for searching the set of 'class' property values (including any inherited values) for all media instances according to the typologies defined for the information contained in the included archives. The results of a search are a set of profiles defining zero or more media instances.

In addition to the literal matching of property values, such as provided by META-REGS, TYPE-BEGS also matches query values to target values taking into account one or more "IS-A" type hierarchies as defined by the typologies employed such that a target value which is an ancestor of a query value also matches (e.g., a query value of "dog" would be expected to match a target value of "animal"). If only exact matching is required (such that, e.g., "dog" only matches "dog") then META-REGS should be used.

TYPE-REGS does not differentiate between classification values that belong to different typologies nor for any ambiguity which may arise from a single value being associated with multiple typologies with possibly differing semantics. It is only responsible for efficiently locating all media instances that have defined values matching those in the input query. If conflicts arise from the use of multiple typologies within the same environment, it is recommended that separate registry databases be generated and referenced for each individual typology.

Required TYPE-REGS profile properties are those Identity properties which explicitly and completely define the media instance, one or more values defined for the 'class' property, as well as either the 'location' or 'agency' property. Allowed TYPE-REGS profile properties are all required properties, as well as the 'title' property (recommended).

Required TYPE-BEGS query properties are the 'class' property containing the set of classifications to search. Allowed TYPE-BEGS query properties are restricted to the 'class' property which is the only property allowed in TYPE-BEG search queries.

Dependency Registry Service (DEP-REGS) provides for searching the set of Association property values (including any inherited values) which can be represented explicitly using MARS Identity semantics for all bodies of information in the included archives. The results of a search are a set of profiles defining zero or more targets 30 matching the search query.

DEP-REGS may be used to identify relationships between bodies of information within a given environment such as a document which serves as the basis for a translation to another language or a conversion to an alternate encoding, a high level diagram which summarizes the basic characteristics of a much more detailed low level diagram or set of diagrams, a reusable documentation component which serves as partial content for a higher level component, etc.

The ability to determine such relationships, many of which may be implicit in the data in question, is crucial for managing large bodies of information where changes to one media instance may impact the validity or quality of other instances. For example, to locate all targets that immediately include a given instance in their content, one would construct a query containing the 'includes' property with a value consisting of a URI identifying the instance, such as an MRN. DEP-REGS would then return profiles for all targets that include that instance as a value of their 'includes' property. Similarly, to locate all targets that contain referential links to a given instance, one would construct a query containing the 'refers' property with a value identifying the instance.

DEP-REGS can be seen as a specialized form of META-REGS, based only on the minimal set of Identity and Association properties. Furthermore, in contrast to the literal matching of property values such as performed by META-REGS, DEP-REGS matches Association query values to target values by applying on-the-fly mapping between all equivalent URI values when making comparisons; such as between an MRN and an Agency CGI URL, or between two non-string-identical Agency CGI URLs, which both define the same resource (regardless of location). Note that if the META-REGS implementation provides such equivalence mapping of URI values, then a separate DEP-REGS implementation is not absolutely required, though one may be still employed on the basis of efficiency, given the highly reduced number of properties in a DEP-REGS profile.

Required DEP-REGS profile properties are the identity properties that explicitly and completely define the body of information, all defined Association properties, as well as either the 'location' or 'agency' property. Allowed DEP-REGS profile properties are all required properties, as well as the 'title' property (recommended).

Required DEP-REGS query properties are one or more Association properties. Allowed DEP-REGS query properties are one or more Association properties.

Process Registry Service (PRO-BEGS) provides for searching over 15 sequences of state or event identifiers (state chains) which are associated with specific components of or locations within procedural documentation or other forms of temporal information. The results of a search are a set of profiles defining zero or more targets matching the search query.

PRO-REGS can be used for, among other things, "process sensitive help" where a unique identifier is associated with each significant point in procedures or operations defined by procedural documentation, and software which is monitoring, guiding, and/or managing the procedure keeps a record of the procedural states activated or executed by the user. At any time, the running history of executed states can be passed to PRO-BEGS as a query to locate documentation which most closely matches that sequence of states or events, up to the point of the current state, so that the user receives precise information about how to proceed with the given procedure or operation exactly from where they are. The procedural documentation would presumably be encoded using some form of functional mark-up (e.g. SGML, XML, HTML) and generation of the profiles identifying paths to states or steps in the procedural documentation would be automatically generated based on analysis of the data content, recursively extracting the paths of special state identifiers embedded in the mark-up and producing a profile identifying a qualified data item to each particular point in the documentation using the 'pointer' property.

Required PRO-REGS profile properties are the identity properties that explicitly and completely define the body of information, the 'class' property defining the sequence of state identifiers up to the information in question, as well as either the 'location' or 'agency' property. Allowed PRO-REGS profile properties are all required properties, as well as the 'title' property (recommended).

Required PRO-REGS query properties are the 'class' property defining a sequence of state identifiers based on user navigation history. Allowed PRO-REGS query properties are restricted solely to the 'class' property allowed in search queries.

It was noted previously that in order to improve the readability of the specification, sections that describe in detail all aspects of a particular function processing or operability and that relate to the description relating to the embodiments described herein, would be included at the end of the specification. These sections are detailed following and include sections for the Media Framework for Electronic Media, Media Attribution and Reference Semantics (MARS), Portable Media Archive (PMA), Generalized Media Archive (GMA), and Registry Service Architecture (REGS).

Media Framework for Electronic Media

1 Scope

This section defines the Media Framework for Electronic Media, a generalized metadata driven framework for the management and distribution of electronic media.

2 Overview

The Media Framework defines a set of standard, open and portable models, interfaces, and protocols facilitating the construction of tools and environments optimized for the management, referencing, distribution, storage, and retrieval of electronic media; as well as a set of core software components (agents) providing functions and services relating to archival, versioning, access control, search, retrieval, conversion, navigation, and metadata management. The Media Framework is designed to embody the following qualities and characteristics:

Open

The framework is based on open standards and proven technologies wherever possible, and all framework specific properties and characteristics are fully documented.

Scalable

Environments based on the framework should function equally well with both few and many agents, on a single machine or across a distributed network, and on both small and large systems; where performance issues are primarily tied to the properties and capabilities of the individual agents and/or systems and network bandwidth, and not to properties of the framework itself.

Modular

All agents within a given environment interact efficiently and effectively with one another with little to no specialized configuration and with no special knowledge of the implementation details of particular agents.

Portable

Agents conforming to the framework can be implemented on a broad range of platforms using practically any tools, programming languages, or other means. The core software components provided by the framework itself are implemented in Java, providing maximal portability to different platforms and environments.

Distributed

Agents are not limited to data or the services of other agents running on the same machine, but may interact (often transparently) with agents running on any machine which is accessible over the network.

Reusable

The framework provides for maximal use and reuse of existing software components and agents, where more complex agents are implemented using the services of more specialized agents. This allows refinement and extension of processes with little to no modification to any existing implementation.

Extensible

Additional agents may be added to any environment based on the framework with little to no impact to and/or reconfiguration of any existing agents.

3 Related Documents, Standards, and Specifications 3.1 Media Attribution and Reference Semantics (MARS)

Media Attribution and Reference Semantics (MARS), a component of the Media Framework, is a metadata specification framework and core standard vocabulary and semantics facilitating the portable management, referencing, distribution, storage and retrieval of electronic media.

3.2 Generalized Media Archive (GMA)

The Generalized Media Archive (GMA), a component of the Media Framework, defines an abstract archival model for the storage and management of data based solely on Media Attribution and Reference Semantics (MARS) metadata; providing a uniform, consistent, and implementation independent model for information storage and retrieval, versioning, and access control.

3.3 Portable Media Archive (PMA)

The Portable Media Archive (PMA), a component of the Media Framework, is a physical organization model of a file system based data repository conforming to and suitable for implementations of the Generalized Media Archive (GMA) abstract archival model.

3.4 Registry Service Architecture (REGS)

The Registry Service Architecture (REGS), a component of the Media Framework, is a generic architecture for dynamic query resolution agencies based on the Media Framework and Media Attribution and Reference Semantics (MARS), providing a unified interface model for a broad range of search and retrieval tools.

3.5 HyperText Transfer Protocol (HTTP)

The Hypertext Transfer Protocol (HTTP) is an application-level protocol for distributed, collaborative, hypermedia information systems. It is a generic, stateless, protocol which can be used for many tasks beyond its use for hypertext, such as name servers and distributed object management systems, through extension of its request methods, error codes and headers. A feature of HTTP is the typing and negotiation of data representation, allowing systems to be built independently of the data being transferred. The Media Framework distributed collaboration model is based primarily on HTTP.

3.6 Common Gateway Interface (CGI)

The Common Gateway Interface (CGI) is a standard for interfacing external applications with information servers, such as Web servers. Within the new Media Framework, CGI will serve as the primary communication mechanism between networked clients and software agents.

3.7 Portable Operating System Interface (POSIX)

POSIX (Portable Operating System Interface) is a set of standard operating system interfaces based on the UNIX operating system. The POSIX interfaces were developed under the auspices of the IEEE (Institute of Electrical and Electronics Engineers). The Media Framework adopts the POSIX models for command line arguments, standard input streams, standard output streams, and standard error streams.

3.8 CORBA

CORBA specifies a system which provides interoperability between objects in a heterogeneous, distributed environment and in a way transparent to the programmer. Its design is based on OMG Object Model. Media Framework agents may utilize CORBA as one of several means of agent intercommunication.

3.9 Java

Java is both a programming language and a platform. Java is a high-level programming language that claims to be simple, architecture-neutral, object-oriented, portable, distributed, high-performance, interpreted, multithreaded, robust, dynamic, and secure. The Java platform is a “virtual machine” which is able to run any Java program on any machine for which an implementation of the Java virtual machine (JVM) exists, which is most operating systems commonly in use today. The core software components and agents provided by the Media Framework are implemented in Java.

3.10 W3C TR REC-xml: XML (eXtensible Markup Language)

The eXtensible Markup Language (XML) describes a class of data objects called XML documents and partially describes the behavior of computer programs which process them. XML is an application profile or restricted form of SGML, the Standard Generalized Markup Language. By construction, XML documents are conforming SGML documents. XML is used for the serialization, interchange, and (typically) persistent storage of MARS metadata property sets. The Media Java SDK provides for the importation and exportation of MARS XML encoded instances to and from MARS class instances.

3.11 W3C TR rdf-syntax: RDF (Resource Description Framework)

The Resource Description Framework (RDF) is a foundation for processing metadata; it provides interoperability between applications that exchange machine-understandable information in a distributed environment. The Media Framework uses RDF for defining the semantics of metadata properties.

3.12 W3C TR rdf-schema: RDF Schemas

RDF Schemas provides information about the interpretation of the statements given in an RDF data model and may be used to specify constraints that should be followed by these data models. The Media Framework uses RDF Schemas for relating metadata properties and values a to disjunct but synonymous vocabularies such as Nokia Metadata for Documents and the Dublin Core.

4 Key Terms and Concepts 4.1 Agent

An agent is a software application which conforms to the interface and protocol requirements defined by this specification, and which provides one or more specific and well defined services or operations. Per the general qualities derived from the Media Framework, every agent can be said to exhibit the following two qualities:

Modular

The implementation details of the agent are hidden behind the generic interfaces and protocols of the framework, such that any other agent, user, client, or process can interact with the agent without any privileged knowledge of its internal workings.

Distributed

Every agent is accessible over the network from any system which has access to the system on which the agent resides. In addition to the above, an agent may also exhibit one or more of the following qualities:

Intelligent

An agent may be sensitive to the environment, system, or particular context in which it is operating, automatically adjusting its behavior accordingly.

Replicating

An agent may create copies of itself to optimize processing of a given operation by dividing portions of the task to each copy, which (depending on the underlying system) may be executed in parallel.

Persistent

An agent may remain in memory and function beyond the duration of a single operation, maintaining information from previous operations which may optimize or otherwise facilitate subsequent operations.

Collaborative

An agent may utilize the services of other agents to perform an operation, and management of available agents and their services may be handled by a specialized "broker" agent with which available agents register. A collaborative agent is typically also a persistent agent.

Mobile

An agent may move from machine to machine (create a copy of itself on another machine and then terminate), if needed to accomplish a given operation (such as updating information in a variety of locations). A mobile agent is typically also a persistent, replicating agent.

4.2 Agency

An agency is a set of specific and well defined services and/or operations typically implemented by a set of agents (or other software components, systems, or tools) which are organized under and accessed via a single managing agent. Technically, every agent can be viewed as an agency. The difference is primarily one of perspective. An agency is the abstract functionality and behavior embodied in (or provided via) an agent. The agent itself may be nothing more than a proxy to some other system or service (such as an RDBMS application) which actually implements those services. Thus, while the agent may essentially provide the full range of functionality defined for an agency, it may not implement the full functionality of the agency itself.

5 Framework Architecture

The Media Framework architecture is based on a standard web server running on a platform which provides the basic POSIX command line and standard input/output stream functionality (see diagram on next page). One of the goals of the framework is to be media neutral, such that the particular encoding of any data is not relevant to storage by or interchange between agents. This does not mean that specific encodings or other media constraints may not exist for any given environment implementing the framework, depending on the operating system(s), tools, and processes used, only that the framework itself aims not to impose any such constraints itself. Every agent conforming to the framework must provide two interfaces: (1) HTTP+CGI, and (2) POSIX command line+standard input/output/error. In addition to these, an agent may also provide interfaces based on (3) Java method invocation and/or (4) CORBA method invocation. These interfaces are defined in greater detail below. Any given agent (or other user, client, or process) is free to choose among the available interfaces provided by an agent; whichever is most optimal for the particular context or application. Non-agent systems, processes, tools, or services which are utilized by an agent can still be accessed via proprietary means if necessary or useful for any operations or processes outside of the scope of the framework. Thus, framework based tools and services can co-exist freely with other tools and services utilizing the same resources.

5.1 Framework Protocols and Interfaces 5.1.1 Media Attribution and Reference Semantics (MARS)

MARS is the language by which agents communicate and is the "heart" of the Media Framework. All other protocols and interfaces defined by the framework are merely a means to transfer data streams which are defined, directed, and controlled by MARS metadata. See section 6.1 and the separate MARS specification.

5.1.2 POSIX

The framework adopts the POSIX standard specifications for command line arguments, standard input stream, standard output stream, and standard error stream as the primary local (system internal) interface used for agent intercommunication and data interchange. Every framework agent must provide a POSIX interface. See section 5.2.1 below regarding MARS command line and standard input parameter encoding.

5.1.3 HTTP+CGI

The framework adopts HTTP+CGI as the primary distributed (network) interface used for agent intercommunication and data interchange. Every framework agent must provide an HTTP+CGI interface using the HTTP GET method. See section 5.2.1 below regarding MARS CGI parameter encoding.

5.1.4 Java

Agents which are implemented using the Media Framework SDK will provide for direct method invocation according to the Agency Java interface, included in the SDK.

5.1.5 CORBA

Agents may provide for direct method invocation via a CORBA interface according to the Agency IDL interface, included in the Media Framework SDK.

5.2 Agent Intercommunication

Agents communicate with one another, and with external clients and processes, using MARS metadata semantics, encoded as a property set (a set of values associated with named properties. MARS property sets are the only allowed means of communication, regardless of the interface used.

5.2.1 Property Set Specification

MARS property sets can be passed to any agent in one of the following ways:

1. Command Line Arguments (multiple sets separated by the special argument '--')

Examples:

-identifier xyz123-language en-encoding xhtml

-identifier abc -- -identifier def -- -identifier ghi

2. HTTP/CGI (multiple sets separated by the special valueless field '--')

Examples:

http:// . . . &identifier=xyz123&language=en&encoding=xhtml http:// . . . &identifier=abc&--&identifier=def&--&identifier=ghi 3. Standard Input, encoded as XML instance Examples:

```
<?xml version='1.0'?>
<MARS>
    <property__set>
        <identifier><token>xyz123</token></identifier>
        <language><l:en/></language>
        <encoding><xhtml/></encoding>
    </property__set>
</MARS>
<?xml version='1.0'?>
<MARS>
    <property__set>
        <identifier><token>abc</token></identifier>
    </property__set>
    <property__set>
        <identifier><token>def</token></identifier>
    </property__set>
    <property__set>
        <identifier><token>ghi</token></identifier>
    </property__set>
</MARS>
```

4. Software method invocation (passing instantiated MARS object).

Examples:

myAgent.retrieve(myMARS);

myAgent.generate(sourceMARS, targetMARS);

Command Line/CGI arguments take precedence over standard input, and if specified, standard input, if any, is treated only as an input data stream. Most interaction between agents will specify operations via either command line or CGI arguments. Every agent, regardless of implementation, must provide support for the first three interfaces defined above (command line, CGI, and standard input). Agents implemented using the Media SDK must provide support for the fourth interface defined above (method invocation).

5.2.2 Interpretation of Multiple Property Sets

If multiple property sets are specified, either via arguments or standard input, then they are to be interpreted as follows:

1. The first property set must contain an action property value.

2. If only one property set is defined, then the single action is performed as specified by the property set.

3. If the action of the first property set is 'store', then either both the component property must equal 'meta' and the item property must equal 'data' or the item property must equal 'meta'; in which case the second property set is taken to be a metadata property set to be stored persistently. It is then an error for there to be more than two property sets in the input.

4. If the action of the first property set is 'generate', then the first property set is taken as defining the target of the generation and the second property set is expected to define the source of the generation which must be retrieved. Any subsequent property sets are taken to be part of a compound action to be applied in succession to the results of the generation. It is then an error for any subsequent property set not to have an action defined.

5. If all property sets have an action defined, then the input is taken to be a compound action, and each action is to be applied to the results of the previous action in succession. If a preceding action returns a data stream, then the subsequent action is to take that stream as input; otherwise, it is to retrieve the first item explicitly specified by a preceding property set.

6. If the 'locate' action is included in a compound action sequence, then the chain of subsequent actions following the locate action are applied in succession to each of the items identified by the locate action.

All other combinations of property sets are either invalid or left to the custom interpretation of the particular agent. It is not permitted for any Media agent to apply an interpretation which conflicts with the interpretation specified above.

5.2.3 Diagnostics and Error Notification

All errors, warnings, cautions, and other notes output by an agent which are not part of a result value must be output on the standard error port composed as an XML instance conforming to the Media Framework Diagnostics DTD:

5.2.3.1 Diagnostic Notification Types

The Media Framework Diagnostics DTD provides for the following notification types:

Error

An error signals an occurance which prevents an agent from continuing a particular process or task. The error condition may or may not be recoverable. Typically it is not.

Warning

A warning constitutes a condition or occurance which could cause loss or corruption of information, damage to equipment, or failure of a critical service.

Caution

A caution constitutes a condition or occurance which could affect the efficiency of equipment or of a service, or which may limit the effectiveness of a given process.

Note

A note constitutes any general information about equipment, a service, a process, or data which is considered significant.

Debug

A debug notification is any general information about the operation of the agent as regards its implementation and which might be meaningful to developers or maintainers of the agent software.

The content of any given notification is free-form may consist of pre-formatted diagnostics from legacy tools or systems, well formed XML markup, or any other textual data. By default, any given agent receiving diagnostics from another agent is required only to be able to recognize the particular notification type(s) and optionally display the literal notification(s) content (including any markup) to an end-user. Particular agents, however, may contract to use specific markup for notification content to facilitate specialized processing and/or display of notifications.

5.2.3.2 Diagnostics in a CGI Environment

In the case of an agent operating in a CGI environment, which does not provide for separate standard output and standard error streams, diagnostics may be returned either in place of the return value (in the case of a fatal error) or as part of a multipart MIME stream consisting first of the return value and secondly of the diagnostics instance.

6 Framework Components

The Media Framework is comprised of a number of components, each defining a core area of functionality needed in the construction of a complete production and distribution environment.

Each framework component is defined separately by its own specification. This section only summarizes the role of each component within the Media Framework. Please consult the specification for each framework component for more detailed information.

6.1 Media Attribution and Reference Semantics (MARS)

Media Attribution and Reference Semantics (MARS) is a metadata specification framework and core standard vocabulary and semantics facilitating the portable management, referencing, distribution, storage and retrieval of electronic media.

MARS is the common "language" by which the different Media Framework agencies communicate.

MARS is designed specifically for the definition of metadata for use by automated systems and for the consistent, platform independent communication between software components storing, exchanging, modifying, accessing, searching, and/or displaying various types of electronic media such as documentation, images, video, etc. It is designed with considerations for automated processing and storage by computer systems in mind, not particularly for direct consumption by humans; though mechanisms are provided for associating with any given metadata property one or more presentation labels for use in user interfaces, reports, forms, etc.

MARS aims to fulfill the following two goals:

1. To define a framework within which metadata can be explicitly defined and efficiently and reliably processed by automated systems.

2. To define a core metadata vocabulary of properties and values for automated systems used for storing, exchanging, operating on, and/or displaying electronic media.

Utilizing a common abstract metadata vocabulary and semantics for all reference and communication functions by all agents within the framework affords a considerable amount of modularity, salability, and flexibility for any given set of agents, as each agent constitutes a "black-box" and specific implementation details are irrelevant insofar as their interaction with users and other agents is concerned, and new agents added to an environment are immediately and transparently usable by existing processes. The core MARS vocabulary also provides for an information rich environment enabling processes and operations not possible using only simple identifiers such as filenames, URL's, DOI's, and similar.

6.1.1 XML

XML is used for the serialization, interchange, and (typically) persistent storage of MARS metadata property sets. The Media Java SDK provides for the importation and exportation of MARS XML encoded instances to and from MARS class instances.

6.1.2 XML DTD

An XML DTD for the general framework and for the core properties defined by MARS is defined as a component of the Media Framework. The common tools and processes operating on or directed by MARS metadata must support metadata property value sets encoded as XML instances conforming to this DTD.

The defined DTD provides mechanisms by which additional properties and property values are defined as needed by particular business units, product lines, processes, etc.

6.1.3 XML Schema

An XML Schema for the general framework and for the core properties defined by MARS is defined as a component of the Media Framework, and the common tools and processes operating on or directed by MARS metadata must support metadata property value sets encoded as XML instances conforming to this Schema.

The XML Schema provides for more rigorous validation of MARS XML instances, and is recommended over validation by DTD wherever possible. The defined XML Schema provides mechanisms by which additional properties and property values are defined as needed by particular business units, product lines, processes, etc.

6.1.4 RDF Schema

An RDF Schema for the core properties defined by MARS is defined as a component of the Media Framework, and which grounds their semantic interpretation of MARS in the Dublin Core and Nokia Metadata for Documents, as well as provides a foundation for defining additional semantic qualities of the core vocabulary and its relationships to other vocabularies.

6.2 Generalized Media Archive (GMA)

The Generalized Media Archive (GMA) is an abstract archival model for the storage and management of data based solely on Media Attribution and Reference Semantics (MARS) metadata; providing a uniform, consistent, and implementation independent model for information storage and retrieval, versioning, and access control.

The GMA is a central component of the Media Framework and serves as the common archival model for all managed media controlled and/or accessed by Media Framework agencies. It constitutes an Agency, which may be implemented as one or more Agents.

The GMA provides a uniform, generic, and abstract organizational model and functional interface to a potentially wide range of actual archive implementations; independent of operating system, file system, repository organization, or other implementation details. This abstraction facilitates the creation of tools, processes, and methodologies based on this generic model and interface which are insulated from the internals of the GMA compliant repositories with which they interact.

The GMA defines specific behavior for basic storage and retrieval, access control based on user identity, versioning, and automated generation of variant encodings. The identity of individual storage items is based on MARS and all interaction between a client and a GMA implementation must be expressed as MARS metadata property sets.

6.3 Portable Media Archive (PMA)

The Portable Media Archive (PMA) is a physical organization model of a file system based data repository conforming to and suitable for implementations of the Generalized Media Archive (GMA) abstract archival model.

The PMA defines an explicit yet highly portable file system organization for the storage and retrieval of information based on Media Attribution and Reference Semantics (MARS) metadata. The PMA uses the MARS Identity and Item Qualifier metadata property values themselves as directory and/or file names, avoiding the need for a secondary referencing mechanism and thereby simplifying the implementation, maximizing efficiency, and producing a mnemonic organizational structure.

Any GMA may use a physical organization model other than the PMA. The PMA physical archival model is not a requirement of the GMA abstract archival model. However, the PMA may nevertheless be employed by such implementations both as a data interchange format between disparate GMA implementations as well as a format for storing portable backups of a given archive.

6.4 Registry Service Architecture (REGS)

The Registry Service Architecture (REGS) is a generic architecture for dynamic query resolution agencies based on the Media Framework and Media Attribution and Reference Semantics (MARS), providing a unified interface model for a broad range of search and retrieval tools. A particular registry service constitutes an Agency, which may be implemented as one or more Agents.

REGS provides a generic means to interact with any number of specialized search and retrieval tools using a common set of protocols and interfaces based on the Media Framework; namely MARS metadata semantics and either a POSIX or CGI compliant interface. As with other Media Framework components, this allows for much greater flexibility in the implementation and evolution of particular solutions while minimizing the interdependencies between the tools and their users (human or otherwise).

Being based on MARS metadata allows for a high degree of automation and tight synchronization with the archival and management systems used in the same environment, with each registry service deriving its own registry database directly from the metadata stored in and maintained by the various archives themselves; while at the same time, each registry service is insulated from the implementation details of and changes in the archives from which it receives its information.

Every registry service shares a common architecture and fundamental behavior, differing primarily only in the actual metadata properties required for their particular application.

6.5 Java SDK

The Media Java SDK (Software Development Kit) provides software components implementing the core models and behavior defined by the Media Framework and its components.

The SDK is implemented in Java conforming to the Java 2 platform specification and resides in the Java package com.nokia.ncde.

This section provides a general overview of the principle classes and interfaces defined in the SDK. Consult the JavaDoc documentation for more information about these and other classes and components.

6.5.1 MARS

MARS (com.nokia.ncde.MARS) is a Java class which provides a uniform container for storing, accessing, defining, and passing MARS metadata property sets, including methods for importing from and exporting to XML encoded instances conforming to the MARS DTD.

6.5.2 Agency

Agency (com.nokia.ncde.Agency) is a Java interface which defines the common behavior (methods) which are implemented and shared by all Framework agents.

6.5.3 Agent

Agent (com.nokia.ncde.Agent) is a Java abstract class which implements the Agency interface and provides default methods for basic agent behavior and which is typically the parent or ancestor class of specific agent implementations built using the Media SDK.

6.5.4 AgentProxy

AgentProxy (com.nokia.ncde.AgentProxy) is a Java wrapper class which provides a convenient mechanism for interacting with the network CGI interface of any Agency, as if it were a local object within a Java application (typically an agent).

6.5.5 AgentServlet

AgentServlet (com.nokia.ncde.AgentServlet) is a Java wrapper class which provides Java Servlet functionality to any class implementing the Agency interface.

6.5.6 AgentServer

AgentServer (com.nokia.ncde.AgentServer) is a Java wrapper class which provides CORBA server functionality to any class implementing the Agency interface.

6.5.7 AgentClient

AgentClient (com.nokia.ncde.AgentClient) is a Java wrapper class which provides CORBA client functionality to any class implementing the Agency interface.

MARS: Media Attribution and Reference Semantics

1 Scope

This section defines the Media Attribution and Reference Semantics (MARS), a metadata specification framework and core standard vocabulary and semantics facilitating the portable management, referencing, distribution, storage and retrieval of electronic media.

2 Overview

MARS is designed specifically for the definition of metadata for use by automated systems and for the consistent, platform independent communication between software components storing, exchanging, modifying, accessing, searching, and/or displaying various types of information such as documentation, images, video, etc. It is designed with considerations for automated processing and storage by computer systems in mind, not particularly for direct consumption by humans; though mechanisms are provided for associating with any given metadata property one or more presentation labels for use in user interfaces, reports, forms, etc.

MARS aims to fulfill the following two goals:

1. To define a framework within which metadata can be explicitly defined and efficiently and reliably processed by automated systems.

2. To define a core metadata vocabulary of properties and values for automated systems used for storing, exchanging, operating on, and/or displaying electronic media.

Extensibility of the core vocabulary is of course of paramount importance, as MARS cannot address all of the needs of all groups, systems, processes, products fully and still serve as a manageable standard; nor can it foresee all possible needs and applications in the future; however, it remains possible and beneficial both to define as rigorously as possible a framework for metadata and a core vocabulary and then enable extensions and enhancements to that core as needed, within the constraints of that framework.

It is important to note that the core vocabulary defined by MARS is data-centric and not use-centric, in that the metadata properties defined therein apply primarily to characteristics or attributes of the data itself, and not how, where, or by whom the data is used or referenced. Processes such as for Product Data Management (PDM), Configuration Management (CM), and Work Flow Management (WFM) are not directly addressed in the core MARS vocabulary as these define uses of the data and not characteristics of the data itself.

The core vocabulary is specifically designed to meet the needs of organization and management processes applied to large volumes of technical and user documentation, though the framework and most if not all of the core vocabulary is applicable to many other applications as well.

3 Related Documents, Standards, and Specifications 3.1 Media Framework for Electronic Media The Media Framework is a generalized metadata driven framework for the management and distribution of electronic media which defines a set of standard, open and portable models, interfaces, and protocols facilitating the construction of tools and environments optimized for the management, referencing, distribution, storage, and retrieval of electronic media; as well as a set of core software components (agents) providing functions and services relating to archival, versioning, access control, search, retrieval, conversion, navigation, and metadata management.

MARS is a component of the Media Framework and serves as the common "language" by which the different Media Framework agents communicate.

3.2 Generalized Media Archive (GMA)

The Generalized Media Archive (GMA), a component of the Media Framework, is an abstract archival model for the storage and management of data based solely on Media Attribution and Reference Semantics (MARS), metadata; providing a uniform, consistent, and implementation independent model for information storage and retrieval, versioning, and access control.

3.3 Portable Media Archive (PMA)

The Portable Media Archive (PMA), a component of the Media Framework, is a physical organization model of a file system based data repository conforming to and suitable for implementations of the Generalized Media Archive (GMA) abstract archival model.

3.4 Registry Service Architecture (REGS)

The Registry Service Architecture (REGS), a component of the Media Framework, is a generic architecture for dynamic query resolution agencies based on the Media Framework and Media Attribution and Reference Semantics (MARS), providing a unified interface model for a broad range of search and retrieval tools.

3.5 Nokia Metadata for Documents

MARS is a derivative of Nokia Metadata for Documents. MARS deviates from that work to some degree in order to meet the specific requirements of the Media Framework; primarily where identity and management properties and more rigorous data typing is required.

Within all systems and environments based on Media Framework, MARS supersedes the Nokia Metadata for Documents specification for all metadata related applications.

3.6 The Dublin Core

The Dublin Core is a metadata element set intended to facilitate discovery of electronic resources. Originally conceived for author-generated description of Web resources, it has attracted the attention of formal resource description communities such as museums, libraries, government agencies, and commercial organizations.

MARS can be viewed as a functional superset of the Dublin Core, and an RDF Schema for MARS could be created which inherits directly from the Dublin Core RDF Schema, such that any tools which are designed to operate on Dublin Core compliant metadata will also be able to operate correctly on MARS compliant metadata.

3.7 ISO 639: Language Codes

ISO 639 specifies a set of two-letter codes represented by case-insensitive ASCII characters which uniquely identify world languages.

MARS adopts ISO 639 language codes for the allowed values of certain property types.

3.8 ISO 3166-1: Country Codes

ISO 3166-1 specifies a set of two-letter codes represented by case-insensitive ASCII characters which uniquely identify countries. MARS adopts ISO 3166-1 country codes for the allowed values of certain property types.

3.9 ISO 8601: General Date and Time Formats

ISO 8601 specifies a number of standard methods for encoding date and time information, for portability between different computer systems and applications.

MARS adopts a subset of ISO 8601 encodings for the allowed values of certain property types.

3.10 W3C TR NOTE datetime: Specific Date and Time Formats

The datetime W3C TR note defines a profile of ISO 8601, the International Standard for the representation of dates and times, restricting the supported formats to a smaller number likely to satisfy most requirements.

MARS adopts a subset of the W3C datetime NOTE encodings for the allowed values of certain property types.

3.11 RFC 2046: MIME (Multipurpose Internet Mail Extensions)

The IETF MIME standard defines a platform independent and portable media typing system and defines an initial set of media types and general media encoding properties. The MIME system is used by a broad range of internet and other systems, standards, and protocols.

MARS adopts RFC 2046 content type and character set identifiers for the allowed values of certain property types.

3.12 W3C TR xptr: XML Pointer Language

XPointer, which is based on the XML Path Language (XPath), supports addressing into the internal structures of XML documents. It allows for traversals of a document tree and choice of its internal parts based on various properties, such as element types, attribute values, character content, and relative position.

MARS adopts W3C XPointer syntax for the allowed values of certain property types.

3.13 Common Gateway Interface (CGI)

The Common Gateway Interface (CGI) is a standard for interfacing external applications with information servers, such as Web servers. Within the new Media Framework, CGI will serve as the primary communication mechanism between networked clients and software agents.

The MARS Agency data type is comprised of a CGI URL prefix.

3.14 RFC 2396: Uniform Resource Identifier (URI)

A Uniform Resource Identifier (URI) is a compact string of characters for identifying an abstract or physical resource. It serves as the general syntax by which URNs, URLs, and other identifiers are defined.

MARS adopts RFC 2396 URIs for the allowed values of certain property types.

3.15 RFC 2141: Uniform Resource Name (URN)

Uniform Resource Names (URNs) are intended to serve as persistent, location-independent, resource identifiers and are designed to make it easy to map other namespaces (which share the properties of URNS) into URN-space. The URN syntax provides a means to encode character data in a form that can be sent in existing protocols, transcribed on most keyboards, etc. MARS adopts RFC 2141 URNs for the allowed values of certain property types.

3.16 RFC 1738: Uniform Resource Locator (URL)

A Uniform Resource Locator (URL) is a compact string of characters for identifying a physical resource available via the Internet. It is the most common form of URI presently in use on the web.

MARS adopts RFC 1738 URLs for the allowed values of certain property types.

3.17 Unicode

The Unicode Standard is a fixed-width, uniform encoding scheme for written characters and text. The repertoire of this international character code for information processing includes characters for the major scripts of the world, as well as technical symbols in common use.

MARS adopts Unicode for the allowed values of string property types.

3.18 POSIX Regular Expression Syntax

POSIX (Portable Operating System Interface) is a set of standard operating system interfaces based on the UNIX operating system. The POSIX interfaces were developed under the auspices of the IEEE (Institute of Electrical and Electronics Engineers). Regular expressions are used to recognize specific patterns within textual data. POSIX defines a standard encoding for regular expressions.

MARS expresses property value types using POSIX regular expression syntax.

3.19 Metadata for Graphics in Customer Documentation

Guidelines for the application of MARS metadata for the management of and access to graphics media in the NET Customer Documentation Environment (NCDE).

4 Key Terms and Concepts 4.1 Property

A property, for the purpose of this specification, is a quality or attribute which can be assigned or related to an identifiable body of information, and is defined as an ordered collection of one or more values sharing a common name. The name of the collection represents the name of the property and the value(s) represent the realization of that property. Typically, constraints are placed on the values which may serve as the realization of a given property.

4.2 Property Set

A property set is any set of valid MARS metadata properties.

4.3 Media Object

Media objects represent abstract bodies of information about which we can communicate and which correspond to common organizational concepts such as “document”, “book”, “manual”, “chapter”, “section”, “sidebar”, “table”, “image”, “chart”, “diagram”, “graph”, “photo”, “video segment”, “audio stream”, etc.

They are, however, abstract and have no specification for any given language, coverage, or encoding. The same media object can be realized in many languages, with many geographical, regional, distributional, or other variations, and be encoded in a multitude of formats, without affecting in the least the scope and qualities of the information that they embody.

An abstract media object is given an identifier which is intended to be unique for the entire known universe. So long as all media objects within a given environment follow the same identification scheme, or any number of mutually exclusive schemes, then all will be well.

It is up to the tools and processes in use to ensure that media object identifiers remain unique within any given environment.

4.4 Media Instance

A media instance represents a particular realization of an abstract media object for a particular language, coverage, encoding, and release. Every distinct combination of these four properties constitutes a different instance of the media object. Some (in fact most) instances of a given media object will be automatically generated, derived from some other instance, particularly those differing in encoding. Similarly, instances in various languages will typically all be derived from a single instance, representing the source language from which all translations to other languages are made.

4.5 Media Component

Each media instance is comprised of a set of components, which are all intimately related to that particular realization and inseparable from it. Most of these components are automatically generated, or are accessed and modified only indirectly via one or more storage and/or management systems. The only mandatory component for a media instance is the data component. The existence and use of other components depends on the specific needs, functions, requirements, or processes comprising the environment within which that data resides. MARS defines a bounded set of component types; though this may be extended as needed as new requirements, processes, or methodologies arise.

Media objects may also contain components, in which case the components are taken to represent properties or other characteristics inherited by or attributable to each instance of that media object.

4.6 Storage Item

Storage items constitute the only actual physical entities within a MARS based environment. Just as a media instance is comprised of one or more components, so a component is comprised of one or more storage items. Items correspond to what would typically be stored in a single file or database record, and are the things which are actually created, encoded, modified, transferred, etc. Items may embody content, content fragments, metadata, revision deltas, or other information needed for the reliable storage, management, and processing of a given media component. Items are the discrete computational objects which are passed from process to process, and which form the building blocks from which the information space and the environment used to manage, navigate, and manipulate it are formed.

4.7 Qualified Data Item

Any given ‘data’ storage item for any component may be qualified in one or more of the following ways:

4.7.1 Content Pointer

MARS provides for referencing (and hence defining an explicit identity for) specific content within a given item, component, instance, or object; depending on the nature of the reference. E.g., a particular element within an SGML, HTML, or XML entity can be referenced by a unique element identifier, which would be valid for all of the above mentioned scopes. Alternatively, the reference could be based on a particular path through the structure of the entity, possibly specifying a given range of data content characters, in which case it might be valid only for a particular component or item.

MARS adopts the W3C XPointer standard for encoding such content specific references in SGML, HTML, or XML content, and it is up to a given application, process, or methodology to ensure the validity of references applied at a given scope. It is recommended that wherever possible that explicit element ID values be used for all pointer references and that structural paths and data content specific references be avoided if at all possible; for the sake of maximal validity of pointer values to all realizations of a given media object, irrespective of language, coverage, encoding, or partitioning.

Though XPointer is not yet a final Recommendation by the W3C, and some changes may occur within the standard, it is presently a Candidate Recommendation and is expected to reach full Recommendation status in the very near future.

Future versions of MARS may adopt additional internal pointer mechanisms for other encodings as needed and as available.

Content pointers are only defined for 'data' storage items.

4.7.2 Revision

A revision is an identifiable editorial milestone for a 'data' storage item within the scope of a particular managed release. It is a snapshot in time, either static or reproducible, to which one can return.

Revisions are only defined and maintained for 'data' storage items.

4.7.3 Fragment

A fragment is an identifiable linear sub-sequence of the data content of a component, either static or reproducible, which can be provided in cases where the full content is either too large in volume for a particular application or not specifically relevant.

Fragments are only defined and maintained for 'data' storage items.

4.8 Inheritance of Metadata

Metadata defined at higher scopes is inherited by lower scopes. There are two simple rules governing the inheritance of metadata from higher scopes to lower scopes:

1. All metadata properties defined in higher scopes are fully visible, applicable, and meaningful in all lower scopes, without exception.

2. Any property defined in a lower scope completely overrides, hides, shadows, replaces any definition of the same property that might exist in a higher scope.

Thus, all metadata properties defined for a media object are inherited by all instances of that object; and all metadata properties defined for a media instance (or media object) are inherited by all of its components.

MARS does not define the mechanisms, algorithms or other procedures for affecting the inheritance of metadata properties defined in higher scopes to operations performed in lower scopes. It is the responsibility of the tools and processes to ensure that metadata is inherited properly and reliably.

4.9 Versioning Model

MARS defines a simple, portable, and practical versioning model using only two levels of distinction, corresponding to the concepts of 'release' and 'revision'.

A release is a published version of a media instance which is maintained and/or distributed in parallel to other releases. One could view a release as a branch in common tree based versioning models. A revision is a milestone in the editorial lifecycle of a given release; or a node on a branch.

In addition to release and revision, a particular coverage can be defined and applied to a media instance to differentiate variant content intended for a particular application and/or audience.

5 Metadata Classification and Naming Conventions 5.1 Property Name

All property names must be valid tokens (see formal specification in section 5.2.1).

Furthermore, all property name tokens for a given environment share the same lexical scope.

The format for tokens was motivated by the desire to have a naming scheme which could be used consistently across a very broad scope of encodings. This not only makes adoption and application of such a standard easier in a heterogeneous environment but also simplifies the construction of and interaction between common tools and processes.

Compatibility with a very broad set of encoding schemes allows for MARS metadata property names and token values to be used as variables, symbols, names, tokens, identifiers, directories, filenames, etc. in the various encoding schemes, allowing for consistent semantics both for the metadata itself as well as for the systems, applications and models storing, operating on, describing, and/or referencing that metadata.

Encodings for which the token format is known to be compatible include:

Programming/Scripting/Command Languages:

C, C++, Objective C, Java, Visual BASIC, Ada, Smalltalk, LISP, Emacs Lisp, Scheme, Prolog, JavaScript/ECMAScript, Perl, Python, TCL, Bourne Shell, C Shell, Z Shell, Bash, Korn Shell, POSIX, Win32, REXX, SQL.

Markup/Typesetting Languages:

SGML, XML, HTML, XHTML, DSSSL, CSS, PostScript, PDF.

File Systems:

FAT (MS-DOS), VFAT (Windows 95/98), NTFS (Windows NT/2000), HFS (Macintosh), HPFS (OS/2), HP/UX, UFS (Solaris), ext2 (Linux), ODS-2 (VMS), NFS, ISO 9660 (CDROM), UDF (CDR/W, DVD).

It is likely that there exist many other encodings, in addition to those listed above, with which the MARS token format is compatible.

5.2 Property Value Type

MARS defines a number of property value types which serve to constrain the format and content of specific values. These data typing constraints simplify the construction of software systems which operate on MARS metadata, and provide for more consistent and uniform usage.

The total length or magnitude of property values, or sets of values, is only dependent on the storage limitations of the systems and tools operating on the metadata. MARS itself imposes no arbitrary restrictions.

Specific environments, processes, systems, or applications might restrict the magnitude of one or more value types to satisfy storage, bandwidth, or other constraints. MARS property value types may be constrained further (e.g. limiting Identity property token values to 30 characters, or limiting integers to the range 0.9999) but may not be relaxed in any fashion (e.g. allowing tokens to have case distinction or include white space or colon characters, etc.). It is up to each system and/or application to address the risk of data loss or corruption when unable to support the magnitude of existing metadata property values.

Many property values are "Environment Dependent". This means that they may be specific to a given system or LAN, or may be defined by an organization, business unit, product line, etc. and thus not have global significance—nor guaranteed to be globally unique if two previously disjunct environments are merged, where e.g. a token is used as the value for a given property in both environments, but with different semantics.

In the property specifications below, properties which may have values which are environment dependent are marked with an asterisk.

Although MARS defines only a core set of metadata properties, and one can extend MARS with additional properties and allowed values for core MARS properties, it remains an important goal to maintain as much uniformity and consistency between all applications of MARS, and every possible effort should be made to publish and synchronize all MARS extended property sets; with the addition of new properties and values to the core standard where clearly justified by common usage.

5.2.1 Token

Any sequence of characters beginning with a lowercase alphabetic character followed by zero or more lowercase alphanumeric characters with optional single intervening underscore characters. More specifically, any string matching the following POSIX regular expression:

/[a–z](_?[a–z0–9])*/

Examples:

abcd ab_cd a123 x2_3_4_5 here_is_a_very_long_token_value

Most MARS metadata properties are of type token, particularly those which are controlled sets. In fact, a token value type can usually be considered synonymous with an explicit, bound, and typically ordinal set of values. The primary reasons for this are (1) information management processes based on controlled sets of explicitly defined values are more robust than those based on arbitrary values, and (2) that current and emerging tools and technologies for modeling, encoding, and processing structured information such as metadata provide special functionality for defining, validating, and processing bounded sets of token like symbols, which are not available for arbitrary strings.

Furthermore, because MARS is intended for the management of very large documentation sets (millions or even billions of managed objects), practical considerations must be taken into account, and token values impose far less demands on storage than arbitrary strings in most circumstances. Since presentation issues can be addressed separately from internal representations, more concise and efficient token values can be utilized. Longer, more user-friendly, and mnemonic labels may be associated with each property name and token value, including different labels for various languages or other needs, which can be defined once in a schema or similar specification and used wherever needed when presenting metadata information to a human being; without unnecessarily burdening the systems storing, operating on, or being directed/controlled by that metadata. All defined token values must have an explicitly specified and fixed value for both 'name' (corresponding to the token itself) and a 'label' (used for presentation purposes).

5.2.2 Integer

Any sequence of one or more decimal digit characters representing a signed integer value.

More specifically, any string matching the following POSIX regular expression:

/[\–\+]?[0–9]+/

Examples:

12345

0

–9590728691

32

+32

5.2.3 Count

Any sequence of one or more decimal digit characters representing an unsigned (non-negative) integer value. More specifically, any string matching the following POSIX regular expression:

/[0–9]+/

Examples:

12345

0

9590728691

32

5.2.4 Decimal

Any floating point numerical value in simple decimal notation. More specifically, any string matching the following POSIX regular expression:

/[\–\+]?[0–9]+\.[0–9]+/

Examples:

12345.0

+0.02

5.9590728691

–32.23.18 (74)

5.2.5 Percentage

Any percentage value belonging to the integer value range from 0 to 100. More specifically, any string matching the following POSIX regular expression:

/(100)|([1–9][0–9])|([0–9])/

Examples:

15

3

73

100

Percentage values should not be prefixed or suffixed by a percent '%' sign.

5.2.6 String

Any sequence of one or more Unicode character/glyph code points. The particular Unicode conformant encoding (e.g. UTF-8, UTF-16, etc.) is system and application dependent and not specified explicitly by MARS.

5.2.7 Date

A string conforming to ISO 8601 & W3C TR NOTE datetime-19980827, defining a complete date:

YYYY-MM-DD where:

YYYY=four-digit year

MM=two-digit month (01=January, etc.)

DD = two-digit day of month (01 through 31)

− = literal separator (hyphen)

Examples:

1966-03-31

2000-05-01

2193-12-31

5.2.8 Time

A string conforming to ISO 8601 & W3C TR NOTE datetime-19980827, defining a complete date plus hours, minutes, and seconds in Universal Coordinated Time:

YYYY-MM-DDThh:mm:ssZ where:

YYYY=four-digit year

MM=two-digit month (01 January, etc.)

DD=two-digit day of month (01 through 31)

T=literal separator indicating start of time component hh=two digits of hour (00 through 23) (am/pm NOT allowed)

mm=two digits of minute (00 through 59)

ss=two digits of second (00 through 59)

Z = time zone designator for Universal Coordinated Time (UTC)

− = literal separator (hyphen)

: = literal separator (colon)

Examples:

1966-03-31T05:11:23Z 2000-05-01T22:54:08Z 2193-12-31T23:59:59Z 5.2.9 Ranking

A ranking value is a sequence of decimal separated integers. More specifically, any string matching the following POSIX regular expression:

```
/[\-\+]?[0–9]+(\.[\-\+]?[0–9]+)*/
```

Examples:

7

3.11.4.7

-2.1.2.9

2.-1.1

A ranking value defines a path in an ordered tree of nodes where the values for each dot delimited field specifies the sort order of the node in the tree at that level of the path. The root node of the tree is not defined explicitly. The first integer value thus defines the sort order relating to the immediate children (level 1) of the implicit root, the next integer defines the sort order relating to the children of the level 1 node, etc. This defines a tree where the linear ordering of nodes is derivable by a depth first ordered traversal of the tree. E.g. the token:ranking pairs foo:1, bar:2, bas:3, and boo:4 represent the following tree:

(root)/
 1(foo)
 2(bar)
 3(bas)
 4(boo)

defining the ordered set:

foo<bar<bas<boo

We can insert a token 'xxx' between 'foo' and 'bar' with the ranking '1.1':

(root)/
 1(foo)/
 1(xxx)
 2(bar)
 3(bas)
 4(boo)

defining the ordered set:

foo<xxx<bar<bas<boo and then insert another token 'yyy' between 'foo' and 'xxx' with the ranking '1.0':

(root)/
 1(foo)/
 0(yyy)
 1(xxx)
 2(bar)
 3(bas)
 4(boo)

defining the ordered set:

foo<yyy<xxx<bar<bas<boo

Ranking values are used to define the order of ranked token values. It is not allowed for any two values defined for the same property in a given environment to have an identical ranking (i.e. to define the same path in the ordered tree of nodes).

It is expected that ranked token sets are seldom extended, and that extensions would be defined at the highest specification level possible, with all rank values normalized to simple positive integer values. Nevertheless, the ranking value model defined here allows for unlimited arbitrary insertion of new ranked token values into any existing sequence as needed.

5.2.10 ID

A token which serves as a unique identifier for a particular property within a given environment. ID token values need not be unique across all properties.

5.2.11 Actor

A string which serves as a unique identifier for an actor within a given environment. An actor is either a person or a software application which operates on, or has special responsibility or interest in the data in question. The actor identifier method employed must be supported by the user authentication processes in use within each particular environment.

5.2.12 Agency

A string comprising the URL prefix of the CGI interface to an Media Framework agency, up to and including the question mark; typically used to define the media object Archive or other Media Framework compliant archive where particular data resides. E.g.

"http://docserv.nokia.com/GMA?"

5.2.13 Content Type

A string containing a valid MIME Content Type. E.g.: “text/html”, “text/xml”, “image/gif”, “application/octet-stream”, etc.

5.2.14 Character Set

A string containing a valid MIME Character Set identifier. E.g. “us-ascii”, “iso-8859-1”, “utf-8”, “utf-16”, “gb2312”, “iso-2022-jp”, “shift_jis”, “euc-kr”, etc.

5.2.15 Encoding

An encoding is a complex data type representing a set of properties identified by a unique token name. They represent configurations of syntactic and semantic characteristics which are significant to the production or management of information in a given environment.

Only values for properties defined as part of the Encoding Module (see section 6.6) may be defined for an encoding data type. Encodings are the required data type for the ‘encoding’ property in the Identity Module in section 6.1.5.

As with tokens, each encoding must have defined for it a ‘name’ and a ‘label’. In addition, every encoding must have defined for it a valid MIME ‘content_type’ value.

5.2.15.1 Simple Encoding

A simple encoding is one which has defined values only for the Encoding properties ‘content_type’ and (optionally) ‘character_set’ and ‘suffix’. Simple encodings are roughly equivalent in resolution to MIME encodings.

5.2.15.2 Complex Encoding

A complex encoding is one which has defined values for at least one other Encoding property other than those allowed in a simple encoding, such as ‘schema’, ‘line_delimitation’, etc.

5.2.16 Universal Resource Identifier (URI)

Any valid Universal Resource Identifier (URI).

This may be a URL (Uniform Resource Locator), a URN (Uniform Resource Name), or some other form of URI.

5.2.17 Uniform Resource Locator (URL)

Any valid Uniform Resource Locator (URL).

A typical case is a URL referencing MARS classified data, consisting of a string containing the set of MARS metadata property name/value pairs formatted as a URL encoded string prefixed by the value of the “archive” property. E.g.

“http://xml.nokia.com/
GMA?action=retrieve&identifier=dn99278& . . .
& . . . ”

5.2.18 Uniform Resource Name (URN)

Any valid Uniform Resource Name (URN).

5.2.19 Media Resource Name (MRN)

Section 8 defines an explicit and compact URN syntax based on MARS Identity metadata properties for encoding the identity of any given storage item as a single string value.

5.3 Property Value Count 5.3.1 Single

A single value count means that there can be at most one value for a given property.

5.3.2 Multiple

A multiple value count means that there can be one or more values for a given property.

The order of multiple values may or may not be significant, but nevertheless must be preserved by any system or application storing, updating, accessing, or operating on the set of values.

When encoded within a single string or field, multiple non-string values must be separated by one or more white space characters. In the case of multiple string values, the individual string values must be separated by line breaks. The line breaks are not included in any value content, but all other white space is considered to be part of the value in which it occurs.

E.g.

“token1 token2 token3”
“2000-02-19
2000-11-07”
“12 34 56 78 90”
“First string value.
Second string value.”.23 (74)

If a string value contains any line breaks, they must be immediately preceded by a backslash ‘\’ character. The backslash is not included as part of the value content. E.g.

“Here is a string value\
with an embedded line break.”

User interfaces which expect single values for particular string properties may choose to map line breaks in user input to spaces rather than interpreting the input as a sequence of multiple string values.

5.4 Property Value Range

For any given property, the set of allowed values for that property may either be bounded or unbounded.

5.4.1 Bounded

The set of allowed values for the given property is finite and explicitly defined. Some property value ranges are bounded by definition, being based on or derived from fixed standards (e.g. language, coverage, format, etc.). Most properties with bounded value ranges are token types having a controlled set of allowed values.

5.4.2 Unbounded

The set of allowed values for the given property is infinite, though perhaps otherwise constrained by format or other characteristics as defined for the property value type.

5.5 Property Value Ranking

For any given property, the set of allowed values for that property may be ordered by an implicit or explicit ordinal ranking, either presumed by all applications operating on or referencing those values or defined explicitly in the schema declaration of those values.

Some property value types are ranked implicitly due to their type and subsequently the value ranges of all properties of such types are automatically ranked (e.g. Integer, Count, Date, Time, etc.). Most properties with ranked value ranges are token types having a controlled set of allowed values which have a significant sequential ordering (e.g. status, release, milestone, etc.).

Ranking may either be strict or partial. With strict ranking, no two values for a given property may share the same ranking. With partial ranking, multiple values may share the same rank, or may be unspecified for rank, having the implicit default rank of zero.

Ranked properties may only have single values. This is a special constraint which follows logically from the fact that ranking defines a relationship between objects having ranked values, and comparisons between ranked values becomes potentially ambiguous if multiple values are allowed. E.g. if the values x, y, and z for property P have the ranking 1, 2, and 3 respectively, and object ‘foo’ has the property P(y) and object ‘bar’ has the property P(x,z), then a boolean query such as “foo.P<bar.P?” cannot be resolved to a single boolean result, as y is both less than z and greater than x, and thus the query is both true and false, depending on which value is chosen for bar.P (i.e. foo.P(y)<bar.P (x)=False, while foo.P(y)<bar.P(z)=True).

Ranking for all property types other than token are defined implicitly by the data type, usually conforming to fundamental mathematical or industry standard conventions.

Ranking for token property values are specified using Ranking values as defined in section 5.2.9.

5.5.1 Strict

The set of allowed values for the given property corresponds to a strict ordering, and each value is associated with a unique ranking within that ordering.

5.5.2 Partial

The set of allowed values for the given property corresponds to a partial ordering, and each value is associated with a ranking within that ordering, defaulting to zero if not otherwise specified.

5.5.3 None

The set of allowed values for the given property corresponds to a free ordering, and any ranking specified for any value is disregarded.

6 Metadata Properties

MARS is made up of sets of metadata properties grouped into modules. Each module corresponds to a particular function or purpose which the properties contained in that module share. Modules are an organizational convenience and do not have any significance to any of the processes or applications operating on MARS compliant metadata.

Applications are not expected to know of, nor required to provide any behavior relating to modules. Note that modules do not represent individual namespaces or scopes; and thus no two modules may have properties with the same name.

MARS specifies a set of core properties which are common to all processes and tools operating within the Media Framework, both for documentation production as well as distribution. Additional properties can be defined and used as required by particular processes or needs, and the methods used for defining, encoding, and validating metadata support flexible extensibility of the metadata vocabulary.

Nearly all properties are persistent, meaning that they are intended to be defined and stored in some explicit encoding. Some properties, however, are not persistent, but are used only for communication between software components operating within the Media Framework.

In particular is the property 'action' which specifies what operation is to be performed by the agent receiving a particular MARS encoded query. In the sections that follow, metadata properties whose values may be environment dependent are marked with an asterisk '*' and metadata properties which may not always be persistent are marked with a section symbol '§'.

6.1 Identity

The properties defined in the Identity module are the heart of the MARS metadata model.

As the module name implies, these properties are use to encode the unique identity of data entities, both abstract and concrete. The identity properties are scoping, meaning that they define a hierarchy of levels, corresponding to Media Object, Instance, Component, and Item (see FIG. 3).

The "identifier" property identifies an abstract media object.

The four properties "release", "language", "coverage", and "encoding" together, along with the "identifier" property, identify an abstract media instance.

The "component" property, together with the higher scoped properties, identifies an abstract media component.

The "item" property, together with the higher scoped properties, identifies a concrete storage item.

It is important to note that the Identity properties differ from all other properties in that some value is required in order to fully identify any discrete body of data. Tools operating on MARS metadata are permitted to presume that the specified default values are valid if no other value is provided.

Filenames, URLs, and other system specific means of identification are typically fragile, frequently non-portable, and do not necessarily follow any formal model or methodology, hampering interoperability between disparate systems. Using sets of standard metadata properties such as those defined in the MARS Identity module provides a platform, system, and process independent means of defining the identity of documentation entities. It also allows systems to operate on one or more levels of scope, such as media object or instance, using user and/or environment information to resolve abstract references to physical data items.

Identity properties may only have Single values. This is a special constraint and follows logically from the fact that if multiple values are allowed, there is no way to ensure that the same values are always used or that new values are not added, essentially changing the identity of the data. To change an Identity value is to change the data's identity. It is similar in effect to changing a filename in a file system.

6.1.1 identifier*

The unique identifier of an abstract media object.

| | |
|---|---|
| Name | identifier |
| Label | Media Object Identifier |
| Type | ID |
| Count | Single |
| Range | Unbounded |
| Ranking | None |
| Values | Any valid ID value as defined by this specification. |

6.1.2 release*

The numeric, sequential identifier for a published version of a media instance which is maintained and/or distributed in parallel to other releases.

| | |
|---|---|
| Name | release |
| Label | Release |
| Type | Count |
| Count | Single |
| Range | Unbounded |
| Ranking | Strict |
| Values | Any valid Count value as defined by this specification. |
| Default | 0 |

The date is the numeric, sequential identifier of the independently managed release. Release values thus both differentiate between and also order different releases over time. A release with value '7' is considered to contain more current information than a release of the same media object with value '4'.

Release values may typically coincide with (synchronize to) major version branch numbers in a revision control system, corresponding to version branches directly connected to the trunk; though this is not a requirement of MARS.

6.1.3 language

The primary language in which the data is written.

| | |
|---|---|
| Name | language |
| Label | Language |
| Type | Token |
| Count | Single |
| Range | Bounded |
| Ranking | None |
| Values | The token value 'none', or any ISO 639 two-letter language code. |
| Default | none |

Because some graphics, photos, or other data may contain no textual information and are undefined with regards to language, the default language value is 'none'.

See Appendix 9.1 for a complete listing of allowed ISO 639 values.

6.1.3.1 none

The data is unspecified for language (presumably because it contains no textual content).

| | |
|---|---|
| Name | none |
| Label | None |

6.1.4 coverage*

The geopolitical or application scope of the data, particularly relating to standards, policies, units of measure and other regional aspects.

| | |
|---|---|
| Name | coverage |
| Label | Coverage |
| Type | Token |
| Count | Single |
| Range | Bounded |
| Ranking | None |
| Values | One of: global, europe, north_america south_america, africa, middle_east asia_pacific, any ISO 3166-1 two-letter country code, or any valid Token value as defined by this specification. |
| Default | global |

All ISO 3166-1 codes must be entered in lowercase to comply with the constraints of the MARS Token format. ISO 3166-1 itself does not specify case as being significant, thus all lowercase encoded values used in MARS metadata are fully compliant with ISO 3166-1.

Custom token values for the coverage property, such as those defining the scope of a particular customer or application, may not supersede the semantics of either the values defined by this specification nor the ISO 3166-1 country codes. I.e., it is not permitted to define a custom value which has identical coverage to a MARS defined value, such as 'world' as a synonym for 'global' or 'france' as a synonym for 'fr', etc. The creation of ad-hoc coverage scopes from existing defined scopes as a means of documenting current application rather than overall relevance (e.g. 'fr_ge' for France plus Germany rather than 'europe') is highly discouraged. In general practice, one should use great constraint before defining a new coverage value.

See Appendix 9.2 for a complete listing of allowed ISO 3166-1 values.

6.1.4.1 global

Coverage is world-wide.

| | |
|---|---|
| Name | global |
| Label | Global |

6.1.4.2 europe

Coverage applies only to Western, Northern, Southern, and Eastern Europe.

| | |
|---|---|
| Name | europe |
| Label | Europe |

6.1.4.3 north_america

Coverage applies only to the United States, Canada, and Mexico

| | |
|---|---|
| Name | north_america |
| Label | North America |

6.1.4.4 south_america

Coverage applies only to Central and South America, and the Caribbean.

| | |
|---|---|
| Name | south_america |
| Label | South America |

6.1.4.5 africa

Coverage applies only to Africa.

| | |
|---|---|
| Name | africa |
| Label | Africa |

6.1.4.6 middle_east

Coverage applies only to the Middle East.

| | |
|---|---|
| Name | middle_east |
| Label | Middle East |

6.1.4.7 asia_pacific

Coverage applies only to Asia and the Pacific.

| | |
|---|---|
| Name | asia_pacific |
| Label | Asia-Pacific |

6.1.5 encoding*

The syntactic and semantic encoding of the data.

| | |
|---|---|
| Name | encoding |
| Label | Media Encoding |
| Type | Encoding |
| Count | Single |
| Range | Bounded |
| Ranking | None |
| Values | Either binary or any valid Encoding as defined by this specification. |

Default Binary 6.1.5.1 binary

Data has literal binary encoding which is not expected to be parsed in any fashion.

| | |
|---|---|
| Name | binary |
| Label | Literal Binary Encoding |
| Content Type | application/octet-stream |
| Suffix | bin |

6.1.6 component*

The abstract component of a media object or media instance.

| | |
|---|---|
| Name | component |
| Label | Component |
| Type | Token |
| Count | Single |
| Range | Bounded |
| Ranking | None |
| Values | One of: data, meta, too, index, glossary; or other defined token value. |
| Default | data |

Typically, components belong to a media instance, though components can also be defined for an abstract media object itself, defining properties and other characteristics shared by all instances of that media object.

6.1.6.1 data

Represents the data content component.

| | |
|---|---|
| Name | data |
| Label | Data Content |

6.1.6.2 meta

Represents the metadata component.

| | |
|---|---|
| Name | meta |
| Label | Metadata |

6.1.6.3 toc

Represents the table of contents component.

| | |
|---|---|
| Name | toc |
| Label | Table of Contents |

6.1.6.4 index

Represents the index component.

| | |
|---|---|
| Name | index |
| Label | Index |

6.1.6.5 glossary

Represents the glossary component.

| | |
|---|---|
| Name | glossary |
| Label | Glossary |

6.1.7 item*

The concrete, physical item belonging to a media component.

| | |
|---|---|
| Name | item |
| Label | Item |
| Type | Token |
| Count | Single |
| Range | Bounded |
| Ranking | None |
| Values | One of: data, meta, idmap, or lock. |
| Default | data |

Most item property values are significant only to the Generalized Media Archive. In nearly all cases, end users will never specify nor concern themselves with item property values directly, but will interact primarily with components.

6.1.7.1 data

Contains the actual data content of the component.

| | |
|---|---|
| Name | data |
| Label | Data Content |

6.1.7.2 meta

Management metadata for the data item of the same component.

| | |
|---|---|
| Name | meta |
| Label | Metadata |

6.1.7.3 idmap

Symbolic ID pointer to content fragment mapping table.

| | |
|---|---|
| Name | idmap |
| Label | ID Pointer to Fragment Map |

This item is mandatory for each data item which has statically partitioned data containing internal cross reference targets and defines a mapping from each symbolic Xpointer reference to the number of the fragment containing that target (e.g. “#xyz” □“123”).

6.1.7.4 lock

Marker preventing accidental collisions between concurrent management systems or sessions.

| | |
|---|---|
| Name | lock |
| Label | Modification Lock |

The format and nature of the lock item is dependent on the GMA managing the component.

6.2 Item Qualifier 6.2.1 pointer*

A reference to a particular structural element or sequence of elements within the data content, encoded as an XPointer string. Typically a pointer to an element ID value (e.g. “#EID38281”).

| | |
|---|---|
| Name | pointer |
| Label | Content Pointer |
| Type | String |
| Count | Single |
| Range | Unbounded |
| Ranking | None |
| Values | Any valid XPointer reference string. |

6.2.2 revision

The number of a particular editorial revision milestone for the release.

| | |
|---|---|
| Name | revision |
| Label | Editorial Revision |
| Type | Count |
| Count | Single |
| Range | Unbounded |
| Ranking | Strict |
| Values | Any valid Count value as defined in this specification. |

6.2.3 fragment

The number of a specific, static, linear sub-sequence of the data content of the component.

| | |
|---|---|
| Name | fragment |
| Label | Data Content Fragment |
| Type | Count |
| Count | Single |
| Range | Unbounded |
| Ranking | Strict |
| Values | Any valid Count value as defined in this specification. |

6.3 Management

The properties defined within the Management module relate to the control of processes operating on or directed by MARS metadata, such as retrieval, storage, change management (also referred to as version management), etc. It does not include metadata properties which might be needed for other higher level management processes such as workflow management, package/configuration management, or editorial process lifecycle management. Such processes can be built on top of the functionality provided by this and other modules.

6.3.1 action §

The action or operation which a particular Media Framework Agent is to perform.

| | |
|---|---|
| Name | action |
| Label | Action |
| Type | Token |
| Count | Multiple |
| Range | Bounded |
| Ranking | None |
| Values | One of: store, retrieve, generate, remove, qualify, locate, lock, or unlock. |

A software application must assume default values for unspecified Identity properties as defined by this standard, and/or to apply values based on user and/or environment configurations, in order to resolve any given query to a physical item.

Multiple actions can be specified at any given time, in which case they are to be applied in the order specified to the data resulting from any preceeding actions, or otherwise to the originally specified data.

This permits the convenient specification of compound actions such as ‘generate store’, ‘lock retrieve’, ‘store unlock’, or ‘locate remove’.

6.3.1.1 store

Store a data stream, associating it with the item defined by the Identity property values otherwise provided in the same query.

| | |
|---|---|
| Name | store |
| Label | Store Data |

6.3.1.2 Retrieve

Retrieve the data stream associated with the item defined by the Identity property values otherwise provided in the same query.

| | |
|---|---|
| Name | retrieve |
| Label | Retrieve Data |

6.3.1.3 Generate

Generate a new data stream, possibly derived from an input data stream, associating it with the item defined by the Identity property values otherwise provided in the same query.

| | |
|---|---|
| Name | generate |
| Label | Generate Data |

6.3.1.4 remove

Remove (delete/destroy) the data defined by the Identity property values otherwise provided in the same query.

| | |
|---|---|
| Name | remove |
| Label | Remove Data |

6.3.1.5 Qualify

Return a boolean value indicating the existence, validity, or other status of the data defined by the Identity property values otherwise provided in the same query.

| | |
|---|---|
| Name | qualify |
| Label | Qualify Data |

6.3.1.6 Locate

Return one or more complete item property value sets for all items matching in some fashion the set of properties provided in the query.

| | |
|---|---|
| Name | locate |
| Label | Locate Data |

6.3.1.7 lock

Set the modification lock for the item defined by the Identity property values otherwise provided in the same query.

| | |
|---|---|
| Name | lock |
| Label | Set Modification Lock |

6.3.1.8 unlock

Release the modification lock for the item defined by the Identity property values otherwise provided in the same query.

| | |
|---|---|
| Name | unlock |
| Label | Release Modification Lock |

6.3.2 agency*

The CGI URL prefix to the Media Framework Agency where the data resides; typically to a Generalized Media Archive.

| | |
|---|---|
| Name | agency |
| Label | Agency CGI URL |
| Type | Agency |
| Count | Single |
| Range | Unbounded |
| Ranking | None |
| Values | Any valid Agency value as defined by this specification. |

6.3.3 location*

A URL from which the data can be retrieved; typically a combination of the agency CGI prefix, the action 'retrieve', and the Identity properties of the data.

| | |
|---|---|
| Name | location |
| Label | Location |
| Type | URL |
| Count | Single |
| Range | Unbounded |
| Ranking | None |
| Values | Any valid URL value as defined by this specification. |

6.3.4 size

The total number of bytes of data. Can be used as a simple checksum for data transfers or other operations.

| | |
|---|---|
| Name | size |
| Label | Size |
| Type | Count |
| Count | Single |
| Range | Unbounded |
| Ranking | Strict |
| Values | Any valid Count value as defined by this specification. |

6.3.5 relevance §

The relevance of the data with regards to the ideal target of a search query or similar form of comparison to other data. A value of zero indicates no relevance. A value of 100 indicates full relevance or a "perfect match".

| | |
|---|---|
| Name | relevance |
| Label | Relevance |
| Type | Percentage |
| Count | Single |
| Range | Bounded |
| Ranking | Strict |
| Values | Any valid Percentage value as defined by this specification. |

The relevance property is used almost exclusively as a transient value whenever a score or other proximity value must be specified in relation to a search query or other similar operation. It is not intended to be stored persistently, as its meaning is highly contextual and typically valid only within the scope of the results from a particular action by an agent.

6.3.6 status

The general lifecycle status of the data; typically indicating the maturity of the content and controlling release to specific audiences.

| | |
|---|---|
| Name | status |
| Label | Status |
| Type | Token |
| Count | Single |
| Range | Bounded |
| Ranking | Strict |
| Values | One of: draft, approved, or expired. |

6.3.6.1 draft

The content either has not been created yet or is currently being created or modified and is not likely to be fully valid for its intended purpose.

| | |
|---|---|
| Name | draft |
| Label | Draft |
| Rank | 1 |

6.3.6.2 approved

The content has been verified as correct and valid for its intended purpose.

| | |
|---|---|
| Name | approved |
| Label | Approved |
| Rank | 2 |

6.3.6.3 expired

The content is no longer valid for its intended purpose and/or is no longer maintained.

| | |
|---|---|
| Name | expired |
| Label | Expired |
| Rank | 3 |

6.3.7 access*

Corresponds to one or more user and/or group identifiers specifying users having rights to modify content.

| | |
|---|---|
| Name | access |
| Label | Access |
| Type | String |
| Count | Multiple |
| Range | Unbounded |
| Ranking | None |
| Values | Any valid String value as defined by this specification, and which conforms to the access control mechanisms in use in the given environment. |

6.3.8 revision*

The sequential editorial milestone identifier for a particular revision of the data item of a media component, incremented with each store action following modifications to the data content.

| | |
|---|---|
| Name | revision |
| Label | Revision |
| Type | Count |
| Count | Single |
| Range | Unbounded |
| Ranking | Strict |
| Values | Any valid Count value as defined by this specification. |

6.3.9 comment §

A note or comment documenting an operation performed on the data (e.g. the change note for a given modification).

| | |
|---|---|
| Name | comment |
| Label | Comment |
| Type | String |
| Count | Single |
| Range | Unbounded |
| Ranking | None |
| Values | Any valid String value as defined by this specification. |

6.3.10 tool*

A full description of the name and version of the tool used to create or last modify the data.

| | |
|---|---|
| Name | tool |
| Label | Tool Description |
| Type | String |
| Count | Single |
| Range | Unbounded |
| Ranking | None |
| Values | Any valid String value as defined by this specification. |

6.3.11 created

The time when the data was first created.

| | |
|---|---|
| Name | created |
| Label | Time Created |
| Type | Time |
| Count | Single |
| Range | Unbounded |
| Ranking | Strict |
| Values | Any valid Time value as defined by this specification. |

6.3.12 locked

The time when the data was locked.

| | |
|---|---|
| Name | locked |
| Label | Time Locked |
| Type | Time |
| Count | Single |
| Range | Unbounded |
| Ranking | Strict |
| Values | Any valid Time value as defined by this specification. |

6.3.13 modified

The time when the data was last modified.

| | |
|---|---|
| Name | modified |
| Label | Time Last Modified |
| Type | Time |
| Count | Single |
| Range | Unbounded |
| Ranking | Strict |
| Values | Any valid Time value as defined by this specification. |

6.3.14 approved

The time when the data was approved.

| | |
|---|---|
| Name | approved |
| Label | Time Approved |
| Type | Time |
| Count | Single |
| Range | Unbounded |
| Ranking | Strict |
| Values | Any valid Time value as defined by this specification. |

6.3.15 reviewed

The time when the data was last reviewed.

| | |
|---|---|
| Name | reviewed |
| Label | Time Last Reviewed |
| Type | Time |
| Count | Single |
| Range | Unbounded |
| Ranking | Strict |
| Values | Any valid Time value as defined by this specification. |

6.3.16 validated

The time when the data was last validated.

| | |
|---|---|
| Name | validated |
| Label | Time Last Validated |
| Type | Time |
| Count | Single |
| Range | Unbounded |
| Ranking | Strict |
| Values | Any valid Time value as defined by this specification. |

6.3.17 start_pov

The date after which the content is valid.

| | |
|---|---|
| Name | start_pov |
| Label | Start of Period of Validity |
| Type | Date |
| Count | Single |
| Range | Unbounded |
| Ranking | Strict |
| Values | Any valid Date value as defined by this specification. |

6.3.18 end_pov

The date up to which the content is valid.

| | |
|---|---|
| Name | end_pov |
| Label | End of Period of Validity |
| Type | Date |
| Count | Single |
| Range | Unbounded |
| Ranking | Strict |
| Values | Any valid Date value as defined by this specification. |

6.3.19 expiration

The date after which the data no longer need be stored or managed and can be discarded (after optional archival).

| | |
|---|---|
| Name | expiration |
| Label | Expiration Date |
| Type | Date |
| Count | Single |
| Range | Unbounded |
| Ranking | Strict |
| Values | Any valid Date value as defined by this specification. |

6.3.20 mrn §

A Media Resource Name (MRN) derived from the set of Identity and Qualifier properties as defined by this specification.

| | |
|---|---|
| Name | mrn |
| Label | Media Resource Name |
| Type | MRN |
| Count | Single |
| Range | Unbounded |
| Ranking | None |
| Values | Any valid MRN value as defined in this specification. |

Values for the 'mrn' property are typically not stored statically with the property set of a given object or instance, but are a convenience mechanism used by particular Media Framework agents for internally defining and referencing storage items via single string index keys.

If an MRN value is stored in any fashion by any Agency, it is the responsibility of that Agency to maintain absolute synchronization between the MRN value and all of its component values from which the MRN is derived.

6.4 affiliation

Affiliation properties define the organizational environment or scope where data is created and maintained.

6.4.1 function

The business function primarily responsible for the creation, validation, and maintenance of the data content.

| | |
|---|---|
| Name | function |
| Label | Business Function |
| Type | Token |
| Count | Single |
| Range | Bounded |
| Ranking | None |
| Values | One of: management, finance, sales, marketing, research_and_development, human_resources, legal, intellectual_property_rights, purchasing, sourcing, production, |

-continued

| |
|---|
| manufacturing_technology, quality, information_management, logistics, customer_service, or business_administration, or business_management. |

6.4.1.1 finance

| | |
|---|---|
| Name | finance |
| Label | Finance |

6.4.1.2 sales

| | |
|---|---|
| Name | sales |
| Label | Sales |

6.4.1.3 marketing

| | |
|---|---|
| Name | marketing |
| Label | Marketing |

6.4.1.4 research_and_development

| | |
|---|---|
| Name | research_and_development |
| Label | Research and Development |

6.4.1.5 human_resources

| | |
|---|---|
| Name | human_resources |
| Label | Human Resources |

6.4.1.6 legal

| | |
|---|---|
| Name | legal |
| Label | Legal |

6.4.1.7 intellectual_property_rights

| | |
|---|---|
| Name | intellectual_property_rights |
| Label | Intellectual Property Rights |

6.4.1.8 purchasing

| | |
|---|---|
| Name | purchasing |
| Label | Purchasing |

6.4.1.9 sourcing

| | |
|---|---|
| Name | sourcing |
| Label | Sourcing |

6.4.1.10 production

| | |
|---|---|
| Name | production |
| Label | Production |

6.4.1.11 manufacturing_technology

| | |
|---|---|
| Name | manufacturing_technology |
| Label | Manufacturing Technology |

6.4.1.12 quality

| | |
|---|---|
| Name | quality |
| Label | Quality |

6.4.1.13 information_management

| | |
|---|---|
| Name | information_management |
| Label | Information Management |

6.4.1.14 logistics

| | |
|---|---|
| Name | logistics |
| Label | Logistics |

6.4.1.15 customer_service

| | |
|---|---|
| Name | customer_service |
| Label | Customer Service |

6.4.1.16 business_administration

| | |
|---|---|
| Name | business_administration |
| Label | Business Administration |

6.4.2 organization*

The top-level organization to which the data belongs.

| | |
|---|---|
| Name | organization |
| Label | Organization |
| Type | Token |

-continued

| | |
|---|---|
| Count | Single |
| Range | Bounded |
| Ranking | None |
| Values | Any valid Token value as defined by this specification. |

6.4.3 business_unit*

The business unit to which the data belongs.

| | |
|---|---|
| Name | business_unit |
| Label | Business Unit |
| Type | Token |
| Count | Multiple |
| Range | Bounded |
| Ranking | None |
| Values | Any valid Token value as defined by this specification. |

The values for this property must be defined separately by each individual organization for all business units within that organization.

6.4.4 product_family*

The product family to which the data belongs.

| | |
|---|---|
| Name | product_family |
| Label | Product Family |
| Type | Token |
| Count | Multiple |
| Range | Bounded |
| Ranking | None |
| Values | Any valid Token value as defined by this specification. |

The values for this property must be defined separately by each individual organization or business unit for all product families within that organization and/or business unit.

6.4.5 product*

The product to which the data belongs.

| | |
|---|---|
| Name | product |
| Label | Product |
| Type | Token |
| Count | Multiple |
| Range | Bounded |
| Ranking | None |
| Values | Any valid Token value as defined by this specification. |

The values for this property must be defined separately by each individual organization, business unit, or product line for all products within that organization, business unit, and/or product line.

6.4.6 product_release*

The product release to which the data belongs.

| | |
|---|---|
| Name | product release |
| Label | Product Release |
| Type | Token |
| Count | Multiple |
| Range | Bounded |
| Ranking | Strict |
| Values | Any valid Token value as defined by this specification. |

The values for this property must be defined separately by each individual organization, business unit, or product line for all product releases within a given product.

6.4.7 project*

The project to which the data belongs.

| | |
|---|---|
| Name | project |
| Label | Project |
| Type | Token |
| Count | Multiple |
| Range | Bounded |
| Ranking | None |
| Values | Any valid Token value as defined by this specification. |

The values for this property must be defined separately by each individual organization, business unit, or product line for all projects within that organization, business unit, and/or product line.

6.4.8 process*

The process to which the data belongs.

| | |
|---|---|
| Name | process |
| Label | Process |
| Type | Token |
| Count | Multiple |
| Range | Bounded |
| Ranking | None |
| Values | Any valid Token value as defined by this specification. |

The values for this property must be defined separately by each individual organization, business unit, or product line for all processes within that organization, business unit, and/or product line.

6.4.9 milestone*

A symbolic milestone with which the data is associated.

| | |
|---|---|
| Name | milestone |
| Label | Milestone |
| Type | Token |
| Count | Multiple |
| Range | Bounded |
| Ranking | Strict |
| Values | Any valid Token value as defined by this specification. |

The values for this property must be defined separately by each individual organization, business unit, or product line for all processes within that organization, business unit, and/or product line.

6.5 Content

Content properties define characteristics about data, often irrespective of its production, application, or realization.

6.5.1 publisher

The entity responsible for making the data available. Typically the organization owning the data.

| | |
|---|---|
| Name | publisher |
| Label | Publisher |
| Type | String |
| Count | Single |
| Range | Unbounded |
| Ranking | None |
| Values | Any valid String value as defined by this specification. |

6.5.2 rights

Information about rights held in and over the data. Typically a copyright notice.

| | |
|---|---|
| Name | rights |
| Label | Rights |
| Type | String |
| Count | Single |
| Range | Unbounded |
| Ranking | None |
| Values | Any valid String value as defined by this specification. |

6.5.3 confidentiality

The level of permitted access to the data.

| | |
|---|---|
| Name | confidentiality |
| Label | Confidentiality |
| Type | Token |
| Count | Single |
| Range | Bounded |
| Ranking | Strict |
| Values | One of: public, company, confidential, or secret. |

6.5.3.1 public

Access to the data is unrestricted.

| | |
|---|---|
| Name | public |
| Label | Public |
| Rank | 1 |

6.5.3.2 company

Access to the data is restricted to company personnel.

| | |
|---|---|
| Name | company |
| Label | Company Confidential |
| Rank | 2 |

6.5.3.3 confidential

Access to the data is restricted to those who are entitled by virtue of their duties.

| | |
|---|---|
| Name | confidential |
| Label | Confidential |
| Rank | 3 |

6.5.3.4 secret

Access to the data is restricted to the owner and to individuals named by the owner.

| | |
|---|---|
| Name | secret |
| Label | Secret |
| Rank | 4 |

6.5.4 title

The name given to the data, usually by the creator.

| | |
|---|---|
| Name | title |
| Label | Title |
| Type | String |
| Count | Single |
| Range | Unbounded |
| Ranking | None |
| Values | Any valid String value as defined by this specification. |

6.5.5 description

A textual description of the data content.

| | |
|---|---|
| Name | description |
| Label | Description |
| Type | String |
| Count | Single |
| Range | Unbounded |
| Ranking | None |
| Values | Any valid String value as defined by this specification. |

6.5.6 type

The content type represented by the data.

| | |
|---|---|
| Name | type |
| Label | Content Type |
| Type | Token |
| Count | Single |
| Range | Bounded |
| Ranking | None |
| Values | One of: general, product, project, process, management, or business. |

6.5.6.1 general

Content is used for general purposes.

| | |
|---|---|
| Name | general |
| Label | General Content |

6.5.6.2 product

Content is used for product related purposes.

| | |
|---|---|
| Name | product |
| Label | Product Related Content |

6.5.6.3 project

Content is used for project related purposes.

| | |
|---|---|
| Name | project |
| Label | Project Related Content |

6.5.6.4 process

Content is used for process related purposes.

| | |
|---|---|
| Name | process |
| Label | Process Related Content |

6.5.6.5 management

Content is used for management related purposes.

| | |
|---|---|
| Name | management |
| Label | Management Related Content |

6.5.6.6 business

Content is used for business related purposes.

| | |
|---|---|
| Name | business |
| Label | Business Related Content |

6.5.7 class*

One or more topical, scope, typing, application, or other classificatory identifiers.

| | |
|---|---|
| Name | class |
| Label | Classification |
| Type | Token |
| Count | Multiple |
| Range | Bounded |
| Ranking | None |
| Values | Any valid Token value as defined by this specification. |

The values for this property must be defined separately by each individual organization, business unit, or product line in accordance with their classification needs.

6.5.8 keywords*

One or more keywords (or terms or phrases) used to classify the general content of the data.

| | |
|---|---|
| Name | keywords |
| Label | Keywords |
| Type | String |
| Count | Multiple |
| Range | Unbounded |
| Ranking | None |
| Values | Any valid String value as defined by this specification. |

This property is intended to be used when the values defined for the 'class' property are not fully sufficient for the classification needed or when classification must be based on identifiers which are not valid Tokens. Care should be taken to ensure that it is not used in lieu of the 'class' property when the latter property offers one or more suitable values.

6.6 Encoding

Encoding properties define special qualities relating to the format, structure, or general serialization of data streams which are significant to tools and processes operating on that data.

6.6.1 content_type*

The MIME content type of the data.

| | |
|---|---|
| Name | content_type |
| Label | MIME Content Type |
| Type | String |
| Count | Single |
| Range | Bounded |
| Ranking | None |
| Values | Any valid MIME content type value. |
| Default | "application/octet-stream" |

The default MIME content type value corresponds to an otherwise unspecified stream of binary data, and coincides with the default values for the 'encoding' and 'suffix' properties.
See Appendix 9.3 for a listing of the most commonly used MIME content type values.

6.6.2 suffix*

The filename suffix associated with a particular encoding.

| | |
|---|---|
| Name | suffix |
| Label | Filename Suffix |
| Type | String |
| Count | Single |
| Range | Unbounded |
| Ranking | None |
| Values | Any valid String value as defined in this specification. |
| Default | "bin" |

The default suffix value corresponds to an otherwise unspecified stream of binary data, and coincides with the default values for the 'encoding' and 'mime' properties.

6.6.3 schema*

The identifier for a DTD, XML Schema, or other like mechanism defining the syntactic/structural model of the data (if any).

| | |
|---|---|
| Name | schema |
| Label | Schema |
| Type | String |
| Count | Single |
| Range | Unbounded |
| Ranking | None |
| Values | Any valid String value as defined by this specification. |

The structure and interpretation of schema string values is environment and system dependent.

6.6.4 aspect*

Selection criteria for inclusion of the data within a given context, process, scope, or other conditional application.

| | |
|---|---|
| Name | aspect |
| Label | Aspect |
| Type | String |
| Count | Single |
| Range | Unbounded |
| Ranking | None |
| Values | Any valid String value as defined by this specification. |

Aspect values are typically defined within structured document instances and seldom stored as persistent metadata externally.

6.6.5 character_set

The MIME character set identifier for the primary or base character set in which textual content is encoded.

| | |
|---|---|
| Name | character_set |
| Label | MIME Character Set |
| Type | String |
| Count | Single |
| Range | Bounded |
| Ranking | None |
| Values | Any valid MIME character set identifier. |

6.6.6 line_delimiter

The line delimiter character or character sequence for textual content.

| | |
|---|---|
| Name | line_delimiter |
| Label | Line Delimiter |
| Type | Token |
| Count | Single |
| Range | Bounded |
| Ranking | None |
| Values | One of lf, cr, crlf, or any valid Token value as defined by this specification. |

6.6.6.1 lf

Lines of content are delimited by line feed (lf) characters (also called newline characters).

This is the line delimitation method for Unix, Linux, Windows NT/2000, and most POSIX compliant operating systems.

| | |
|---|---|
| Name | lf |
| Label | Line Feed |

6.6.6.2 cr

Lines of content are delimited by carriage return (cr) characters. This is the line delimitation method for the Macintosh operating system.

| | |
|---|---|
| Name | cr |
| Label | Carriage Return |

6.6.6.3 crlf

Lines of content are delimited by an ordered adjacent pair of carriage return and line feed characters. This is the method for MS-DOS and Windows 95/98 operating systems.

| | |
|---|---|
| Name | crlf |
| Label | Carriage Return + Line Feed |

6.6.7 width_in_millimeters

Absolute width dimension in millimeters.

| | |
|---|---|
| Name | width_in_millimeters |
| Label | Width in Millimeters |
| Type | Count |

-continued

| | |
|---|---|
| Count | Single |
| Range | Unbounded |
| Ranking | Strict |
| Values | Any valid Count value as defined by this specification. |

6.6.8 height_in_millimeters

Absolute height dimension in millimeters.

| | |
|---|---|
| Name | height_in_millimeters |
| Label | Height in Millimeters |
| Type | Count |
| Count | Single |
| Range | Unbounded |
| Ranking | Strict |
| Values | Any valid Count value as defined by this specification. |

6.6.9 width_in_pixels

Absolute width dimension in pixels.

| | |
|---|---|
| Name | width_in_pixels |
| Label | Width in Pixels |
| Type | Count |
| Count | Single |
| Range | Unbounded |
| Ranking | Strict |
| Values | Any valid Count value as defined by this specification. |

6.6.10 height_in_pixels

Absolute height dimension in pixels.

| | |
|---|---|
| Name | height_in_pixels |
| Label | Height in Pixels |
| Type | Count |
| Count | Single |
| Range | Unbounded |
| Ranking | Strict |
| Values | Any valid Count value as defined by this specification. |

6.6.11 resolution

Resolution of an image or the desired rendering resolution in dots per inch (dpi) for graphical data encodings.

| | |
|---|---|
| Name | resolution |
| Label | Resolution (dpi) |
| Type | Count |
| Count | Single |
| Range | Unbounded |
| Ranking | Strict |
| Values | Any valid Count value as defined by this specification. |

6.6.12 compression

The method used for compression of graphical data encodings.

| | |
|---|---|
| Name | compression |
| Label | Compression |

-continued

| | |
|---|---|
| Type | Token |
| Count | Single |
| Range | Bounded |
| Ranking | None |
| Values | Any valid Token value as defined by this specification. |

6.6.13 color_depth

The total number of bits per pixel (bpp) used to encode individually displayable colors in graphical data encodings.

| | |
|---|---|
| Name | color_depth |
| Label | Color Depth (bpp) |
| Type | Count |
| Count | Single |
| Range | Unbounded |
| Ranking | Strict |
| Values | Any valid Count value as defined by this specification. |

6.6.14 color_space

The color space (model) used for graphical data encodings.

| | |
|---|---|
| Name | color_space |
| Label | Color Space |
| Type | Token |
| Count | Single |
| Range | Unbounded |
| Ranking | None |
| Values | One of rgb, rgba, cmyk, hsl; or any valid Token value as defined by this specification. |

6.6.14.1 rgb

Red/Green/Blue (RGB).

| | |
|---|---|
| Name | rgb |
| Label | Red/Green/Blue (RGB) |

6.6.14.2 rgba

Red/Green/Blue/Alpha (RGBA).

| | |
|---|---|
| Name | rgba |
| Label | Red/Green/Blue/Alpha (RGBA) |

6.6.14.3 cmyk

Cyan/Magenta/Yellow/blacK (CMYK).

| | |
|---|---|
| Name | cmyk |
| Label | Cyan/Magenta/Yellow/blacK (CMYK). |

6.6.14.4 hsl

Hue/Saturation/Lightness (HSL).

| | |
|---|---|
| Name | hsl |
| Label | Hue/Saturation/Lightness (HSL) |

6.7 Association

Association properties define special relationships relating to the origin, scope, and/or focus of the content in reference to other data. Values may be any valid URI, though it is recommended that wherever possible, MRNs be used.

6.7.1 source*

Resource(s) from which the data is derived.

| | |
|---|---|
| Name | source |
| Label | Source |
| Type | URI |
| Count | Multiple |
| Range | Unbounded |
| Ranking | None |
| Values | Any valid URI value as defined by this specification. |

6.7.2 refers*

Resource(s) to which the data refers.

| | |
|---|---|
| Name | refers |
| Label | Refers To |
| Type | URI |
| Count | Multiple |
| Range | Unbounded |
| Ranking | None |
| Values | Any valid URI value as defined by this specification. |

6.7.3 supersedes*

Resource(s) which the data supersedes or replaces.

| | |
|---|---|
| Name | supersedes |
| Label | Supersedes |
| Type | URI |
| Count | Multiple |
| Range | Unbounded |
| Ranking | None |
| Values | Any valid URI value as defined by this specification. |

6.7.4 summarizes*

Resource(s) which the data summarizes.

| | |
|---|---|
| Name | summarizes |
| Label | Summarizes |
| Type | URI |
| Count | Multiple |
| Range | Unbounded |
| Ranking | None |
| Values | Any valid URI value as defined by this specification. |

6.7.5 expands*

Resource(s) which the data expands.

| | |
|---|---|
| Name | expands |
| Label | Expands |
| Type | URI |
| Count | Multiple |
| Range | Unbounded |
| Ranking | None |
| Values | Any valid URI value as defined by this specification. |

6.7.6 includes §*

Resource(s) which are included as partial content for the data as a whole.

| | |
|---|---|
| Name | includes |
| Label | Includes |
| Type | URI |
| Count | Multiple |
| Range | Unbounded |
| Ranking | None |
| Values | Any valid URI value as defined by this specification. |

6.8 Role

Role properties specify one or more actors who have a special relationship with the data. An actor is usually a person, but can also be a software application.

6.8.1 user §*

Identifier of actor performing operation on or currently having modification rights to data.

| | |
|---|---|
| Name | user |
| Label | User |
| Type | Actor |
| Count | Single |
| Range | Unbounded |
| Ranking | None |
| Values | Any valid Actor value as defined by this specification. |

This property value is required to be persistent only when a modification lock is in force.
Otherwise, it is typically transient for any given operation.

This property value is required to be persistent only when a modification lock is in force.

Otherwise, it is typically transient for any given operation.

6.8.2 creator*

Identifier of actor who created the original data.

| | |
|---|---|
| Name | creator |
| Label | Creator |
| Type | Actor |
| Count | Single |
| Range | Unbounded |
| Ranking | None |
| Values | Any valid Actor value as defined by this specification. |

6.8.3 owner*

Identifier of actor who has primary rights and responsibilities for the data.

| | |
|---|---|
| Name | owner |
| Label | Owner |
| Type | Actor |
| Count | Single |
| Range | Unbounded |
| Ranking | None |
| Values | Any valid Actor value as defined by this specification. |

6.8.4 modifier*

Identifier of actor who last modified the data.

| | |
|---|---|
| Name | modifier |
| Label | Modifier |
| Type | Actor |
| Count | Single |
| Range | Unbounded |
| Ranking | None |
| Values | Any valid Actor value as defined by this specification. |

6.8.5 approver*

Identifier(s) of actor(s) responsible for the quality and correctness of the data.

| | |
|---|---|
| Name | approver |
| Label | Approver |
| Type | Actor |
| Count | Multiple |
| Range | Unbounded |
| Ranking | None |
| Values | Any valid Actor value as defined by this specification. |

6.8.6 contributor*

Identifier(s) of actor(s) having contributed to the data.

| | |
|---|---|
| Name | contributor |
| Label | Contributor |
| Type | Actor |
| Count | Multiple |
| Range | Unbounded |
| Ranking | None |
| Values | Any valid Actor value as defined by this specification. |

6.8.7 reviewer*

Identifier(s) of actor(s) responsible for evaluating the quality and correctness of the data.

| | |
|---|---|
| Name | reviewer |
| Label | Reviewer |
| Type | Actor |
| Count | Multiple |
| Range | Unbounded |

-continued

| | |
|---|---|
| Ranking | None |
| Values | Any valid Actor value as defined by this specification. |

6.8.8 distribution*

Identifier(s) of actor(s) having a key interest in the data and are typically notified in some fashion regarding changes in the content or status of the data.

| | |
|---|---|
| Name | distribution |
| Label | Distribution |
| Type | Actor |
| Count | Multiple |
| Range | Unbounded |
| Ranking | None |
| Values | Any valid Actor value as defined by this specification. |

7 Serialization and Validation

Because MARS is strictly a metadata specification framework and vocabulary, there is no required method for encoding MARS metadata property values or rules governing their validity. However, the Generalized Media Archive (GMA) specification defines a serialization for MARS property value sets based on XML which is suitable for both data interchange as well as persistent storage, and provides a DTD and other mechanisms for validation and processing.

8 MRN (Media Resource Name) Syntax

This specification defines a URN syntax for MARS item references which is made up of the ordered concatenation of Identity properties, and optionally Item Qualifier properties, separated by colons. The ordered sequence is identifier, release, language, coverage, encoding, component, item, [revision, fragment, pointer].

All MRNs share the common fixed prefix 'urn:mars:' in accordance with RFC 2141.

Note that the case of this prefix is not significant, but the case of the remainder of the URN is significant. I.e., 'URN: MARS:', 'urn:mars:', and 'UrN:MaRs:' are all equivalent.

It is recommended, however, that the prefix be all in lowercase, as shown in the examples, for the sake of consistent readability across systems and environments.

There are two forms of MRN: (1) media instance component items (the typical case), and (2) media object component items (for inherited or defining information).

In addition, either form of MRN may be qualified for revision, fragment, and/or pointer.

MRNs provide an explicit, concise, unique, consistent, and information rich identity string value in cases where such a single identity string is needed. MRNs identify only storage items, and not higher level abstract entities such as components, instances or objects. Note though, that the Media Framework Java API provides for the notion of an MRN pattern, which can be employed to represent metadata-related sets of items defined by valid MRNs.

8.1 Media Instance Component Item MRN

A media instance component item MRN is required to have valid property values for every Identity property. E.g.:

"urn:mars:dn823942931891:2:en:global:xhtml:meta:data"

"urn:mars:dn823942931891:2:fi:fi:neutral_mu:toc:data"

"urn:mars:tan82819:0:none:global:cgm_2:data:data"

"urn:mars:x928bks212_u:11:ch:asia:word:data:meta"

8.2 Media Object Component Item MRN

Media object component item MRNs all share the same fixed sub-sequence ':*:*:*:*:' between the identifier and component property values, and are required to have valid property values for every identifier, component and item property. E.g.:

"urn:mars:dn823942931891:*:*:*:*:meta:data"

"urn:mars:dn823942931891:*:*:*:*:toc:data"

"urn:mars:tan82819:*:*:*:*:data:data"

The sequence ':*:*:*:*:' signifies that the defined items have global scope over all instances, regardless of release, language, coverage, or encoding.

Note that MARS does not define how global information that is defined for media objects is to be applied to instances, nor which components may be defined for any given media object, nor their interpretation. MARS simply defines how those storage items are named and organized using MARS metadata properties. In a typical environment, the only components defined for media objects would be a meta component for global metadata shared by all instances and possibly a data component containing a template or general document or abstract defining the content and/or structure shared by all instances.

8.3 Qualified MRN

A qualified MRN has three additional fields suffixed to an unqualified MRN, corresponding to the property values for revision, fragment, and pointer; in that order. If any Qualifier property is undefined, its field must contain an asterisk '*'. All three fields are mandatory.

E.g.:

"urn:mars:tan82819:0:none:global:cgm_2:data:data:3:*:*"

"urn:mars:x928bks212_u:11:ch:asia:word:data:meta:*:234:*"

"urn:mars:dn823942931891:*:*:*:*:data:data:*:*:#EID2z821"

Combinations of values for both revision and fragment may only be meaningful if the revision number corresponds to the latest revision (in which case the revision number is superfluous) or if the fragment can be reliably regenerated based solely on the fragment number, as it is expected that static fragments are typically maintained only for the latest revision.

9 Appendices 9.1 Language Property Values

The following table lists all allowed token values for the "language" property, along with their presentation labels, as defined in ISO 639.

| Name | Label |
|---|---|
| Aa | Afar |
| Ab | Abkhazian |
| Af | Afrikaans |
| Am | Amharic |
| Ar | Arabic |
| As | Assamese |
| Ay | Aymara |
| Az | Azerbaijani |

-continued

| Name | Label |
|---|---|
| Ba | Bashkir |
| Be | Byelorussian |
| Bg | Bulgarian |
| Bh | Bihari |
| bi | Bislama |
| bn | Bengali; Bangla |
| bo | Tibetan |
| br | Breton |
| ca | Catalan |
| co | Corsican |
| Cs | Czech |
| cy | Welsh |
| da | Danish |
| de | German |
| dz | Bhutani |
| el | Greek |
| en | English |
| eo | Esperanto |
| es | Spanish |
| et | Estonian |
| eu | Basque |
| fa | Persian |
| fi | Finnish |
| fj | Fiji |
| fo | Faeroese |
| fr | French |
| fy | Frisian |
| ga | Irish |
| gd | ScotsGaelic |
| gl | Galician |
| gn | Guarani |
| Gu | Gujarati |
| Ha | Hausa |
| hi | Hindi |
| hr | Croatian |
| hu | Hungarian |
| hy | Armenian |
| ia | Interlingua |
| ie | Interlingue |
| ik | Inupiak |
| in | Indonesian |
| is | celandic |
| it | Italian |
| iw | Hebrew |
| ja | Japanese |
| ji | Yiddish |
| jw | Javanese |
| ka | Georgian |
| kk | Kazakh |
| kl | Greenlandic |
| km | Cambodian |
| kn | Kannada |
| ko | Korean |
| ks | Kashmiri |
| ku | Kurdish |
| ky | Kirghiz |
| la | Latin |
| ln | Lingala |
| lo | Laothian |
| lt | Lithuanian |
| lv | Latvian Lettish |
| mg | Malagasy |
| mi | Maori |
| mk | Macedonian |
| ml | Malayalam |
| mn | Mongolian |
| mo | Moldavian |
| mr | Marathi |
| ms | Malay |
| mt | Maltese |
| my | Burmese |
| na | Nauru |
| ne | Nepali |
| nl | Dutch |
| no | Norwegian |
| oc | Occitan |
| om | (Afan) Oromo |

-continued

| Name | Label |
|---|---|
| or | Oriya |
| pa | Punjabi |
| pl | Polish |
| ps | Pashto, Pushto |
| pt | Portuguese |
| qu | Quechua |
| rm | Rhaeto-Romance |
| rn | Kirundi |
| ro | Romanian |
| ru | Russian |
| rw | Kinyarwanda |
| sa | Sanskrit |
| sd | Sindhi |
| sg | Sangro |
| sh | Serbo-Croatian |
| si | Singhalese |
| sk | Slovak |
| sl | Slovenian |
| sm | Samoan |
| sn | Shona |
| so | Somali |
| sq | Albanian |
| sr | Serbian |
| ss | Siswati |
| st | Sesotho |
| su | Sundanese |
| sv | Swedish |
| sw | Swahili |
| ta | Tamil |
| te | Tegulu |
| tg | Tajik |
| th | Thai |
| ti | Tigrinya |
| tk | Turkmen |
| ti | Tagalog |
| tn | Setswana |
| to | Tonga |
| tr | Turkish |
| ts | Tsonga |
| tt | Tatar |
| tw | Twi |
| uk | Ukrainian |
| ur | Urdu |
| uz | Uzbek |
| vi | Vietnamese |
| vo | Volapuk |
| wo | Wolof |
| xh | Xhosa |
| yo | Yoruba |
| zh | Chinese |
| zu | Zulu |

9.2 Coverage Property Values

The following table lists the allowed token values for the “coverage” property, adopted from ISO 3166-1, along with their presentation labels.

| Name | Label |
|---|---|
| Ad | Andorra |
| Ae | United Arab Emirates |
| af | Afghanistan |
| ag | Antigua and Barbuda |
| ai | Anguilla |
| al | Albania |
| am | Armenia |
| an | Netherlands Antilles |
| ao | Angola |
| aq | Antarctica |
| ar | Argentina |
| as | American Samoa |

-continued

| Name | Label |
| --- | --- |
| at | Austria |
| au | Australia |
| aw | Aruba |
| az | Azerbaidjan |
| ba | Bosnia-Herzegovina |
| bb | Barbados |
| bd | Bangladesh |
| be | Belgium |
| bf | Burkina Faso |
| bg | Bulgaria |
| bh | Bahrain |
| bi | Burundi |
| bj | Benin |
| bm | Bermuda |
| bn | Brunei Darussalam |
| bo | Bolivia |
| br | Brazil |
| bs | Bahamas |
| bt | Bhutan |
| bv | Bouvet Island |
| bw | Botswana |
| by | Belarus |
| bz | Belize |
| ca | Canada |
| cc | Cocos (Keeling) Islands |
| cf | Central African Republic |
| cg | Congo |
| ch | Switzerland |
| ci | Ivory Coast (Cote D'Ivoire) |
| ck | Cook Islands |
| cl | Chile |
| cm | Cameroon |
| cn | China |
| co | Colombia |
| cr | Costa Rica |
| cs | Former Czechoslovakia |
| cu | Cuba |
| cv | Cape Verde |
| cx | Christmas Island |
| cy | Cyprus |
| cz | Czech Republic |
| de | Germany |
| dj | Djibouti |
| dk | Denmark |
| dm | Dominica |
| do | Dominican Republic |
| dz | Algeria |
| ec | Ecuador |
| ee | Estonia |
| eg | Egypt |
| eh | Western Sahara |
| er | Eritrea |
| es | Spain |
| et | Ethiopia |
| fi | Finland |
| fj | Fiji |
| fk | Falkland Islands |
| fm | Micronesia |
| fo | Faroe Islands |
| fr | France |
| fx | France (European Territory) |
| ga | Gabon |
| gb | Great Britain |
| gd | Grenada |
| ge | Georgia |
| gf | French Guyana |
| gh | Ghana |
| gi | Gibraltar |
| gl | Greenland |
| gm | Gambia |
| gn | Guinea |
| gp | Guadeloupe (French) |
| gq | Equatorial Guinea |
| gr | Greece |
| gs | S. Georgia & S. Sandwich Isls |
| gt | Guatemala |
| gu | Guam (USA) |

-continued

| Name | Label |
| --- | --- |
| gw | Guinea Bissau |
| gy | Guyana |
| hk | Hong Kong |
| hm | Heard and McDonald Islands |
| hn | Honduras |
| hr | Croatia |
| ht | Haiti |
| hu | Hungary |
| id | Indonesia |
| ie | Ireland |
| il | Israel |
| in | India |
| io | British Indian Ocean Territory |
| iq | Iraq |
| ir | Iran |
| is | Iceland |
| it | Italy |
| jm | Jamaica |
| jo | Jordan |
| jp | Japan |
| ke | Kenya |
| kg | Kyrgyzstan |
| kh | Cambodia |
| ki | Kiribati |
| km | Comoros |
| kn | Saint Kitts & Nevis Anguilla |
| kp | North Korea |
| kr | South Korea |
| kw | Kuwait |
| ky | Cayman Islands |
| kz | Kazakhstan |
| la | Laos |
| lb | Lebanon |
| lc | Saint Lucia |
| li | Liechtenstein |
| lk | Sri Lanka |
| lr | Liberia |
| ls | Lesotho |
| lt | Lithuania |
| lu | Luxembourg |
| lv | Latvia |
| ly | Libya |
| ma | Morocco |
| mc | Monaco |
| md | Moldavia |
| mg | Madagascar |
| mh | Marshall Islands |
| mk | Macedonia |
| ml | Mali |
| mm | Myanmar |
| mn | Mongolia |
| mo | Macau |
| mp | Northern Mariana Islands |
| mq | Martinique (French) |
| mr | Mauritania |
| ms | Montserrat |
| mt | Malta |
| mu | Mauritius |
| mv | Maldives |
| mw | Malawi |
| mx | Mexico |
| my | Malaysia |
| mz | Mozambique |
| na | Namibia |
| nc | New Caledonia (French) |
| ne | Niger |
| net | Network |
| nf | Norfolk Island |
| ng | Nigeria |
| ni | Nicaragua |
| nl | Netherlands |
| no | Norway |
| np | Nepal |
| nr | Nauru |
| nt | Neutral Zone |
| nu | Niue |
| nz | New Zealand |

-continued

| Name | Label |
|---|---|
| om | Oman |
| pa | Panama |
| pe | Peru |
| pf | Polynesia (French) |
| pg | Papua New Guinea |
| ph | Philippines |
| pk | Pakistan |
| pl | Poland |
| pm | Saint Pierre and Miquelon |
| pn | Pitcairn Island |
| pr | Puerto Rico |
| pt | Portugal |
| pw | Palau |
| py | Paraguay |
| qa | Qatar |
| re | Reunion (French) |
| ro | Romania |
| ru | Russian Federation |
| rw | Rwanda |
| sa | Saudi Arabia |
| sb | Solomon Islands |
| sc | Seychelles |
| sd | Sudan |
| se | Sweden |
| sg | Singapore |
| sh | Saint Helena |
| si | Slovenia |
| sj | Svalbard and Jan Mayen Islands |
| sk | Slovak Republic |
| sl | Sierra Leone |
| sm | San Marino |
| sn | Senegal |
| so | Somalia |
| sr | Suriname |
| st | Saint Tome (Sao Tome) and Principe |
| su | Former USSR |
| sv | El Salvador |
| sy | Syria |
| sz | Swaziland |
| tc | Turks and Caicos Islands |
| td | Chad |
| tf | French Southern Territories |
| tg | Togo |
| th | Thailand |
| tj | Tadjikistan |
| tk | Tokelau |
| tm | Turkmenistan |
| tn | Tunisia |
| to | Tonga |
| tp | East Timor |
| tr | Turkey |
| tt | Trinidad and Tobago |
| tv | Tuvalu |
| tw | Taiwan |
| tz | Tanzania |
| ua | Ukraine |
| ug | Uganda |
| uk | United Kingdom |
| um | USA Minor Outlying Islands |
| us | United States |
| uy | Uruguay |
| uz | Uzbekistan |
| va | Vatican City State |
| vc | Saint Vincent & Grenadines |
| ve | Venezuela |
| vg | Virgin Islands (British) |
| vi | Virgin Islands (USA) |
| vn | Vietnam |
| vu | Vanuatu |
| wf | Wallis and Futuna Islands |
| ws | Samoa |
| ye | Yemen |
| yt | Mayotte |
| yu | Yugoslavia |

-continued

| Name | Label |
|---|---|
| za | South Africa |
| zm | Zambia |
| zr | Zaire |
| zw | Zimbabwe |

9.3 MIME Derived Property Values

The following are the most commonly used MIME content types and character sets which are expected to be most frequently used; although any valid MIME content type or character set is permitted (though not all may be supported by the tools and/or processes of a given environment). They are provided here only for convenient reference.

9.3.1 Content Types

"application/http"

"application/msword"

"application/octet-stream"

"application/pdf"

"application/postscript"

"application/rtf"

"application/sgml"

"application/sgml-open-catalog"

"application/vnd.lotus-notes"

"application/vnd.mif"

"application/vnd.ms-excel"

"application/vnd.ms-powerpoint"

"application/vnd.ms-project"

"application/vnd.visio"

"application/vnd.wap.slc"

"application/vnd.wap.slc"

"application/vnd.wap.wbxml"

"application/vnd.wap.wmlc"

"application/vnd.wap.wmlscriptc"

"application/xml"

"image/cgm"

"image/gif"

"image/jpeg"

"image/png"

"image/tiff"

"image/vnd.dwg"

"image/vnd.dxf"

"model/vrml"

"text/css"

"text/enriched"

"text/html"

"text/plain"

"text/rtf"

"text/sgml"

"text/uri-list"

"text/vnd.wap.sl"

"text/vnd.wap.sl"

"text/vnd.wap.wml"

"text/vnd.wap.wmlscript"

"text/xml"

"video/mpeg"

"video/quicktime"

9.3.2 Character Sets

"us-ascii"

"iso-8859-1"

"utf-8"

"utf-16"

"gb2312"

"iso-2022—jp"

"shift_jis"

"euc-kr"

GMA: Generalized Media Archive

1 Scope

This document defines the Generalized Media Archive (GMA), an abstract archival model based solely on Media Attribution and Reference Semantics (MARS) metadata; providing a uniform, consistent, and implementation independent model for the storage, retrieval, versioning, and access control of electronic media.

The GMA model is a component of the Media Framework for Electronic Media. A basic understanding of the Media Framework and MARS is presumed by this specification.

2 Overview

The GMA is a central component of the Media Framework and serves as the common archival model for all managed media objects controlled, accessed, transferred or otherwise manipulated by Media Framework agencies. The GMA provides a uniform, generic, and abstract organizational model and functional interface to a potentially wide range of actual archive implementations; independent of operating system, file system, repository organization, versioning mechanisms, or other implementation details. This abstraction facilitates the creation of tools, processes, and methodologies based on this generic model and interface which are insulated from the internals of the GMA compliant repositories with which they interact.

The GMA defines specific behavior for basic storage and retrieval, access control based on user identity, versioning, automated generation of variant instances, and event processing.

The identity of individual storage items is based on MARS metadata semantics and all interaction between a client and a GMA implementation must be expressed as MARS metadata property sets.

3 Related Documents, Standards, and Specifications 3.1 Media Framework for Electronic Media The Media Framework is a generalized metadata driven framework for the management and distribution of electronic media which defines a set of standard, open and portable models, interfaces, and protocols facilitating the construction of tools and environments optimized for the management, referencing, distribution, storage, and retrieval of electronic media; as well as a set of core software components (agents) providing functions and services relating to archival, versioning, access control, search, retrieval, conversion, navigation, and metadata management.

3.2 Media Attribution and Reference Semantics (MARS)

Media Attribution and Reference Semantics (MARS), a component of the Media Framework, is a metadata specification framework and core standard vocabulary and semantics facilitating the portable management, referencing, distribution, storage and retrieval of electronic media.

3.3 Portable Media Archive (PMA)

The Portable Media Archive (PMA), a component of the Media Framework, is a physical organization model of a file system based data repository conforming to and suitable for implementations of the Generalized Media Archive (GMA) abstract archival model.

3.4 Registry Service Architecture (REGS)

The Registry Service Architecture (REGS), a component of the Media Framework, is a generic architecture for dynamic query resolution agencies based on the Media Framework and Media Attribution and Reference Semantics (MARS), providing a unified interface model for a broad range of search and retrieval tools.

4 General Architecture

A GMA manages media components and contains storage items. The operation of a GMA can be divided into the following five functional units:

Versioning

Generation

Storage and

Retrieval

Access Control

Events

Storage and Retrieval of items is simply the act of associating electronic media data streams to MARS storage item identities and making persistent, retrievable copies of those data streams indexed by their MARS identity (either directly or indirectly), as well as the management of creation and modification time stamps.

Access Control is based on several controlling criteria as defined for the environment in which the GMA resides and as stored in the metadata of individual components managed by the GMA. Access control is defined for entire components and never for individual items within a component. Access control can also be defined for media objects and media instances, in which case subordinate media components inherit the access configuration from the higher scope(s) in the case that it is not defined specifically for the component.

Access control also includes the management of user identity and role metadata such as creator, owner, contributor, etc.

Versioning is performed only for 'data' items of a media component and constitutes the revision history of the data content of the media component. It also includes general management and updating of creation, modification and other time stamps. Storage or update of items other than the 'data' item neither effect the status of management metadata stored in the 'meta' item of the component (unless the item in question is in fact the 'meta' item of the component) nor are reflected in the revision history of the component. If a revision history or particular metadata must be maintained for any MARS identifiable body of content, then that content must be identified and managed as a separate media component, possibly belonging to a separate media instance.

Generation is the process of automatically producing an item either from another item or from metadata, or both in response to a generation or retrieval request from some client (possibly recursively from the GMA itself). The automatically produced item is typically derived from the 'data' item of a component as a variant encoding, a report of some form, a fragment or subset of the original content, or some other derivative of the original data item.

Events concern the handling of events which may trigger other operations automatically in conjunction with the client specified operations; typically the regeneration of items, components or instances derived from content data and/or metadata when the content from which they are derived changes. Every GMA must implement the storage and retrieval functional unit in some fashion (it need not be an explicit implementation unit), but may optionally omit any of the other functional units, or allow for them to be disabled, depending on the needs of the given application and/or environment. It is not permitted, however, for a GMA to only partially implement a functional unit; or rather, a GMA cannot claim to include a functional unit unless the behavior of the functional unit as defined in this specification is fully implemented.

4.1 Management -BY- Metadata

A GMA relies on specific MARS metadata (and only that metadata) in order to operate, and also defines or updates MARS metadata as part of its operation. Management and manipulation of electronic media solely via metadata is a fundamental goal of the Media Framework and thus also of the GMA.

4.1.1 Content Versus Management Metadata

It is important to make a clear distinction between content metadata and management metadata. Content metadata describes the qualities and characteristics of the information content as a whole, independent of how it is managed. Management metadata, on the other hand, is specifically concerned with the history of the physical data, such as who may retrieve or modify it, when it was created, whether a user is currently making modifications to it, what the current revision identifier is, etc. Content metadata is outside the scope of concern of a GMA, and typically is stored as a separate 'meta' component, not a 'meta' item, such that the actual specification of the content metadata is managed by the GMA just as any other media component. The metadata that is of primary concern to a GMA, and which a GMA accesses, updates, and stores persistently, is the metadata associated with each component.

A GMA manages media components, and the management metadata for each media component is stored persistently in the 'meta' storage item of the media component.

A special case exists with regards to management metadata which might be defined at the media instance or media object scope, where that metadata is inherited by all subcomponents of the higher scope(s). See section 4.2.2 for details.

4.1.2 MARS Properties Required by GMA

The following MARS metadata properties are required by a GMA to be defined in the input query and/or for the target data, depending on the action being performed and which functional units are implemented. See the pseudocode in section 5 for usage details.

The functional units are represented in the table as follows: Storage & Retrieval='SR', Versioning='V', Access Control='A', Generation='G', and Events='E'.

| Property | Functional Unit | Action |
|---|---|---|
| identifier, release, language, coverage, encoding, component, item | SR, V, A, G, E | qualify, retrieve, store, remove, generate |
| identifier, release, language, coverage, encoding, component | SR, A, E | lock, unlock |
| user, access | A | qualify, retrieve, store, remove, lock |
| user | A | unlock |
| revision | V | qualify, retrieve, store |
| fragment | SR | qualify, retrieve, store |
| pointer | SR | retrieve |
| comment | V | store |
| size, pointer | G | generate, retrieve |

4.1.3 MARS Properties Used by GMA

The following MARS metadata properties are generated, updated, or otherwise modified by a GMA for one or more actions, depending on which functional units are implemented. See the pseudocode in section 5 for usage details.

| Property | Functional Unit | Action |
|---|---|---|
| created, modified, size | SR | store |
| owner, creator, modifier, contributor | A | store |
| user | V | lock |
| locked | SR | lock, unlock |
| revision | V | store |
| fragment | G | generate |

4.1.4 Default Property Values

A GMA may assume the default values as defined by the MARS specification for all properties which it requires but are not specified explicitly. It is an error for a required property to have neither a default MARS value nor an explicitly specified value.

4.2 Management -OF- Metadata

In addition to relying on already defined metadata, a GMA is itself responsible for defining, updating, and maintaining the management metadata relevant for the 'data' item of each media component, which is stored persistently as the 'meta' item of the component. In fact, most of the metadata produced by a GMA is later used by the GMA for subsequent operations.

4.2.1 Persistent Storage

A GMA is free to store 'meta' items, containing management metadata, in any internal format; however every GMA must accept and return 'meta' storage items as XML instances as defined in section 6 of this specification. Content metadata, however, constituting the data content of a 'meta' component and stored as the 'data' item of the 'meta' component, must always be a valid XML instance as defined by this specification. These two constraints ensure that any software agent is able to retrieve from or store to a GMA both content and management metadata as needed, as well as any GMA may resolve inherited management metadata from meta components at higher scopes in a generic fashion.

4.2.2 Inheritance and Scope

The MARS specification defines a set of simple rules for metadata property inheritance. In short, properties defined at a given scope are visible at all lower scopes, and the definition of a property at a lower scope takes precedence over any definition at a higher scope.

Management metadata may be defined at the media object or media instance scope, applying to (being inherited by) all sub-component scopes.

It is the responsibility of the GMA to both retrieve and utilize all inherited metadata properties of a component, as well as to differentiate inherited from component specific properties when storing persistent metadata property sets, such that only component specific properties are stored. This ensures that changes to inherited properties take effect on all subsequent operations in the component scope. A GMA is free to "mirror" inherited properties at the component scope so long as absolute synchronization is maintained between the mirrored properties and their inherited source.

A GMA may never include inherited properties in any 'meta' storage item output as the result of a retrieve action.

4.3 Storage and Retrieval

Storage and Retrieval of items is simply the act of associating electronic media data streams to MARS storage item identities and making persistent, retrievable copies of those data streams indexed by their MARS identity (either directly or indirectly), as well as the management of creation and modification time stamps.

Every GMA must implement the core storage and retrieval functional unit. If versioning, access control, generation, and/or event units are also implemented, then the storage and retrieval operations may be augmented in one or more ways.

A GMA is free to use any means to organize both the repository of storage items as well as the mapping mechanisms relating MARS identity metadata to locations within that repository. GMA implementations might employ common relational or object oriented database technology, direct file system storage, or any number of custom and/or proprietary technologies. Regardless of the underlying implementation, a GMA must accept input and provide output in accordance with this specification.

4.4 Access Control

A GMA implementation is not required to implement access control, but if access control is provided, it must conform to the behavior defined in this specification.

Access Control of media components is based on several controlling criteria as defined for the environment in which the GMA resides and as stored in the metadata of individual components managed by the GMA. Access control is defined for entire components and never for individual items within a component. Access control can also be defined for media objects and media instances, in which case subordinate media components inherit the access configuration from the higher scope(s) in the case that it is not defined specifically for the component.

The four controlling criteria for media access are:

1. User identity
2. Group membership(s) of user
3. Read permission for user or group
4. Write permission for user or group 4.4.1 User Identity Every user must have a unique identifier within the environment in which the GMA operates, and the permissions must be defined according to the set of all users (and groups) within that environment.

A user can be a human, but also can be a software application, process, or system. This is especially important for both licensing as well as tracking operations performed on data by automated software agents operating within the GMA environment.

4.4.2 Group Membership

Any user may belong to one or more groups, and permissions can be defined for an entire group, and thus for every member of that group. This greatly simplifies the maintenance overhead in environments with large numbers of users and/or high user turnover (many users coming and going).

Permissions defined for an explicit user override permissions defined for a group of which the user is a member. Thus, if a group is allowed write permission to a component, but a particular user is explicitly denied write permission for that component, then the user may not modify the component.

4.4.3 Read Permission

Read permission means that the user or group may retrieve a copy of the data.

The presence of a lock marker does not prohibit retrieval of data, only modification.

If access control is not implemented, and/or unless otherwise specified globally for the GMA environment or for a particular archive, or explicitly defined in the metadata for any relevant scope, a GMA must assume that all users have read permission to all content.

4.4.4 Write Permission

Write permission means that the user or group may modify (store a new version of) the data.

Write permission equates to read permission such that every user or group which has write permission to particular content also has read permission.

This is true even if the user or group is explicitly denied read permission otherwise.

The presence of a lock marker prohibits modification by any user other than the owner of the lock, including the owner of the component if the lock owner and component owner are different. It is permitted for a GMA to provide a means to break a lock, but such an operation should not be available to common users and should provide a means of logging the event and ideally notifying the lock owner of the event.

If access control is not implemented, a GMA must assume that all users have write permission to all content.

If access control is implemented, and unless otherwise specified globally for the GMA environment or for a particular archive, or explicitly defined in the metadata for any relevant scope, a GMA must assume that no users have write permission to any content.

Regardless of any other metadata defined access specifications (not including settings defined globally for the archive), the owner of a component always has write access to that component.

4.4.5 Access Levels

This specification defines a set of access levels which serve as convenience terms when defining, specifying, or discussing the "functional mode" of a particular GMA with regard to read and write access control.

Access levels can be used as configuration values by GMA implementations to easily specify global access behavior for a given GMA where the implementation is capable of providing multiple access levels.

| Level | Read | Write |
|---|---|---|
| 1 | * | * |
| 2 | * | X |
| 3 | * | A |
| 4 | A | A |

* = no access control, public access
X = access prohibited globally
A = access control by user identity.

Note that because write permission subsumes, or includes read permission, it is not meaningful (albeit possible) to define an access level where there is read access control but no write access control. This is because giving global write permission to any user is the same as giving global read permission, as write permission overshadows or overrides read permission, and thus even if a particular user was denied read access for a given storage item, they would still have implicit write permission, which includes read permission; making the denial of read access ineffective.

A GMA implementation is not required to provide a particular level of access control; however, it must be clearly stated for each implementation which level, if any, above level 1 is available. Furthermore, if access control above level 2 is provided, it must conform to the behavior defined in this specification.

4.5 Versioning

A GMA implementation is not required to implement versioning, but if versioning is provided, it must conform to the behavior defined in this specification.

Versioning relates to the identification, preservation, and retrieval of particular revisions (editions) in the editorial lifecycle of some discrete body of data. A version is a snapshot in time, and retrieving a past version is traveling back in time to the point when that snapshot was taken. Sequences of snapshots may be related by sharing a common ancestry while differing in one or more recent revisions.

Versioning is often modeled as a tree, where a sequences of shapshots is a path from the root of the tree, along the branches and sub-branches, to the leaves. Sequences are related by their shared portions in the tree, being the common trunk and branches which are part of both paths from the root; up to the point where the two sequences differ in a given revision, or separate/split into two distinct branches. Each branch is given a sequential identifier (usually a positive integer), and each level of branches, sub-branches, sub-sub- branches, etc. is separated by some distinct punctuation, typically a period. At any given point of separation of two revision sequences (paths through the tree), the branch may either divide equally, such that there become two sub-branches each of which receive a new numbering level, or the main branch may simply "grow" a sub-branch where the revision number sequence of the main branch continues onwards at the same level while the sub-branch's revision number sequence gains an additional level.

The primary (almost exclusive) motivation for having many distinct branches is the management and maintenance of concurrent yet variant instances of the data, which are accessible and used in some fashion in parallel. A good example of this is software, where one version is being used while the next version is being developed. Problems (bugs) arising in the currently used version may not exist in the later version under development, yet one must still make the necessary corrections to the current version. In such a case, the software code revision sequence "branches", with the development process of the newer version becoming a new sub-branch and the maintenance (bug-fix) process of the current version remaining the main branch. Both branches share a common beginning (path from the root) but have unique progressions thereafter. In some cases, two distinct branches (related or otherwise) might merge at some point, making the resultant data model a graph in actuality, but it is nevertheless still common to speak in terms of tree structures.

While providing a very useful and effective means to organize and manage related editorial sequences as connected branches, the tree based versioning model has a number of shortcomings. It allows arbitrarily deep trees, allowing (and in some cases encouraging) the fragmentation of editorial sequences which are not meaningful nor productive in practice. It also allows for a plethora of incompatible interpretations applied to the various levels in the tree, making the interchange of historical information difficult, and in many cases impossible.

The MARS versioning model, which is used by every GMA, addresses the same needs provided for in the tree based versioning model—namely (1) the need to make (and later retrieve) snapshots along a sequence of editorial revisions, (2) the need to manage separate parallel sequences of revisions, and (3) the need to relate sequences with shared history □ but does so in a much simpler and (most importantly) portable fashion.

Versioning is divided into two levels: (1) an individually managed and independently accessible editorial sequences are called a 'release' and corresponds to a branch in the tree based versioning model; and (2) snapshots along an editorial sequence (release) are called revisions and correspond to leaves in the tree based versioning model.

Each release is given a unique positive integer identifier. Likewise, each identified (managed) revision within a release sequence is given a unique positive integer identifier, and the revision numbering sequence begins anew for each release. Releases which are derived from other releases (i.e. sub-branches growing out from parent branches) may specify via the MARS 'source' property the particular release and revision from which they come. These three pieces of information □release number, revision number, and source (if any) □meet all three of the above defined versioning needs.

A GMA which implements versioning is responsible only for the linear sequence of revisions within a media component.

A GMA implementation is not responsible for the automated or semi- automated creation or specification of new instances relating to distinct releases (branching) nor retrieval of revisions not unique to a particular release (paths in the tree up to the beginning of the particular branch) from its source(s) (ancestor branches); though it is free to offer that functionality if it so chooses. Typically, the creation of new releases (branching) will be performed manually by a human editor, including the specification of 'source' and any other relevant metadata values. Other tools, external to the GMA may also exist to aid users in performing such operations.

Versioning is performed by a GMA only for the 'data' item of a media component and that sequence of revisions constitutes the editorial history of the data content of the media component. The GMA is also responsible for general management and updating of creation, modification and other time stamp metadata. Storage or update of items other than the 'data' item neither effect the status of management metadata stored in the 'meta' item of the component (unless the item in question is in fact the 'meta' item of the component) nor are reflected in the revision history of the component. If a revision history or particular metadata must be maintained for any MARS identifiable body of content, then that content must be identified and managed as a separate media component, possibly belonging to a separate media instance.

4.5.1 Revision Numbering Scheme

Revisions are identified by positive integer values (MARS Count values). The scope of each media component is unique and revision values have significance only within the scope of each particular media component. Revision sequences should begin with the value '1' and proceed linearly without gaps.

The revision value zero '0' is reserved for special use by future versions of the GMA model. GMA implementations should neither permit nor generate revisions with a value of zero. Doing so may result in data and/or tools which are incompatible with future versions of this standard.

4.5.2 Storage and Retrieval of Past Revisions

A GMA implementation is free to internally organize and store past revisions in any fashion it chooses. This specification describes two recommended methods for storing past revisions of the content of a media component: snapshotting and reverse deltas. In some cases, more than one method might be applied by a GMA, depending on the nature of the media in question.

Regardless of its internal organization and operations, a GMA is required to return any requested revision which is maintained and stored by the GMA as a complete copy.

4.5.2.1 Snapshotting

Snapshotting is simply the process of preserving a complete copy of every revision. One takes a "snapshot" of the content at a given point in time and assigns a revision number to it. Two clear benefits to snapshotting are that it is very easy to implement, and special (possibly time consuming) regeneration operations are not needed to retrieve past revisions. The latter can be very important in an environment where there is heavy usage and retrieval times are a concern. A major drawback to snapshotting is that it places heavy storage demands on the system hosting the archive. It is also very inefficient in that the differences between revisions is typically very slight and therefore there is a large amount of redundant information being stored in the archive. It is permitted for a GMA implementation to limit the total number of past revisions that are maintained (e.g. no more than 10) in cases where it is not practical or feasible to store every past revision since the creation of the media component; in which case there is the additional drawback that only a limited number of previous revisions are maintained and data loss (of the earliest revisions) is inevitable.

4.5.2.2 Reverse Deltas

A delta is set of one or more editorial operations (modifications) which can be applied to a body of data to consistently derive another body of data. A reverse delta is a delta which allows one to derive a previous revision from a former revision.

Rather than store the complete and total content of each revision, as is done with snapshotting, a GMA which uses reverse deltas simply stores the modifications necessary to derive each past revision from the immediately succeeding (later) revision. A reverse delta then can be seen as a single step backwards in time, along the sequence of editorial milestones represented by each revision of data. To obtain a specific past revision, one must simply begin at the current revision, and then apply the reverse deltas in order for each previous revision until the desired revision is reached.

One could just as well have forward deltas, where the delta defines the operations needed to derive the more recent revision from the preceding revision (and in fact the first revision management systems using deltas worked this way). The drawback to forward deltas, is that once a given editorial sequence becomes sufficiently long, containing many revisions, it takes longer and longer to generate the most recent revision from the very first revision, applying all of the deltas for all of the revisions over time. Typically, only the most current revisions are ever of interest, therefore it is much more efficient to rather work backwards in time to retrieve previous revisions from the most current.

The primary benefit to using reverse (or forward) deltas in a GMA implementation is a dramatic reduction in storage demands. Since most revisions tend to differ from the previous revision only slightly, the GMA need only store the differences and not the entire body of content for every revision. This can be particularly important in environments where there are frequent but slight changes to large media objects (such as graphics or video) or where the archive must be replicated (mirrored) to multiple sites where bandwidth and/or disk space may be at a premium.

A drawback to using reverse deltas in a GMA implementation is that they can be difficult to implement for some media types; especially for complex binary encodings employing compression.

4.6 Generation

A GMA implementation is not required to implement generation, but if generation is provided, it must conform to the behavior defined in this specification.

Generation involves the automated creation of data streams which are not maintained statically as such in the GMA but are derived in one manner or another from one or more existing storage items. This includes conversions from one encoding or format to another, extraction of portions of a component's content, auto-generation of indices, tables of contents, bibliographies, glossaries, etc. as new components of a media instance, generation of usage, history, and/or dependency reports based on metadata values, generation of metadata profiles for use by one or more registry services, etc.

The present version of this specification only addresses one particular type of generation in detail; though it is expected that subsequent versions of the GMA standard will specify additional constraints, methods, and guidelines relating to other forms of generation; including those mentioned above, as well as others.

4.6.1 Dynamic Partitioning

Dynamic partitioning is a special case of generation where a fragment of the data content is returned in place of the entire 'data' item, possibly with automatically generated hypertext links to preceding and succeeding content, and/or information about the structural (contextual) qualities of the omitted content, depending on the media encoding.

Dynamic partitioning can be implemented and used whether or not static fragments exist. Typically, static fragments are created according to the most common usage, whereas dynamic partitioning is relied upon for more specialized applications.

Dynamic partitioning is controlled by two metadata properties, in addition to those defining the identity of the source data item: 'size' and (optionally) 'pointer'. The single determining factor for a partition of data is the maximum number of bytes which the fragment can contain. The point within the data item from which the fragment is extracted can be specified by an optional 'pointer' property value (if the encoding supports it).

The GMA then extracts the requested fragment, starting either at the beginning of the data item or at the point specified by the pointer value, and collecting the largest coherent and meaningful sequence of content up to but not exceeding the specified number of content bytes. What constitutes a coherent and meaningful sequence will depend on the media encoding of the data and possibly interpretations inherent in the GMA implementation itself. Any fragment of a data item must employ the same media encoding as the data item and be a valid data stream according to the rules and constraints of that encoding.

4.7 Events

A GMA implementation is not required to implement event handling, but if event handling is provided, it must conform to the behavior defined in this specification.

The event handling functionality defined for a GMA is very simple, owing to the generic and abstract model defined by MARS metadata.

For each storage item, media component, media instance, or media object, a set of one or more MARS property sets defining some operation(s) can be associated with each MARS action, such that when that action is successfully performed on that item, component, instance, or object, the associated operations are executed. Automated operations are thus defined for the source data and not for any target data which might be automatically generated as a result of an event triggered operation.

Each operation property set must specify the necessary metadata properties to be executed correctly, such as the action(s) to perform and possibly including the CGI URL of the agency which is to perform the action. The GMA is free to employ customized mechanisms for determining how a given operation is to be performed, and by which software component or agent, if otherwise unspecified in the property set using standard MARS and Media Framework conventions.

In the case of a remove action, which will result in the removal of any events defined at the same scope as the removed data, the GMA is still required to execute any operations associated with the remove action defined at that scope, after successful removal of the data, even though the operations themselves are part of the data removed and will never be executed again in that context.

The most common type of operation for events is a compound 'generate store' action which generates a new target item from an input item and stores it persistently in the GMA, taking into account all versioning and access controls in force. This is useful for automatically updating components such as the TOC (Table of Contents) or index when a data component is modified, or for generating static fragments of an updated data component. A GMA is free to associate automated operations globally for any given action, such that the operations are applied within the scope of the data being acted upon. A GMA is also free to associate automated operations with triggers other than MARS actions, such as reoccurring times or days of the week, for the purpose of removing expired data such as via a 'locate remove' compound action, where the locate query defines the expiration based on a comparison of the current date with the end-pov or modified properties. A GMA, however, may only define automated operations in terms of MARS property sets.

5 Actions

The following sections provide pseudocode for the core GMA operations corresponding to Media Framework agent actions.

Note that the pseudocode is intended to be illustrative and informal, and not a rigorous specification of any particular implementation.

For every action, the significant metadata properties are identified. Properties which are highlighted in italics will be assigned default values as specified in MARS if not otherwise defined. Underlined properties may be optional in certain circumstances, depending on the functional units implemented or active for the GMA.

Retrieval of metadata for a given media component scope includes all inherited metadata from media object and media instance scopes.

5.1 Qualify

Verify that a particular storage item (possibly qualified for revision or fragment) exists (has an identity) in the archive; or, if read access control is active, that the item exists and the user has read access for the item. The storage item may have zero content bytes. If read access control is active, if the user does not have read access to the item, yet it exists, the action will nevertheless return 'false'. This is a security feature to prevent unauthorized users from determining which storage items exist, even if they cannot access them.

Synonyms:

Verify, Check, Exists

Properties:

identifier, release, language, coverage, encoding, component, item, user, access, revision, fragment Pseudocode:

```
Boolean qualify (MARS item)
{
    Retrieve MRN from MARS item;
    Resolve MRN to archive location for item;
    if (item exists in archive)
    {
        if (Versioning and input item property is equal to 'data')
        {
            Retrieve metadata for component;
            Retrieve value of revision property from component
            metadata;
            if (component revision not equal to input revision)
            {
                if (input revision cannot be retrieved or regenerated)
```

-continued

```
                {
                        Return 'false';
                }
            }
            if (input fragment value specified)
            {
            if (fragment cannot be retrieved or regenerated)
            {
                    return 'false';
                }
            }
    }
    if (Read Access Control)
    {
        Retrieve metadata for component;
        Retrieve value of access property from component metadata;
        if (NOT (user has write access OR has read access))
        {
            Return 'false';
        }
    }
    Return 'true';
}
else
{
    if (AutoGeneration
       AND the item can be generated from
            one or more other source items in the archive)
    {
            for each source item
            {
                if (self.qualify(source_item) equal to 'true')
                {
                    Return 'true';
                }
            }
        }
    }
    Return 'false';
}
```

Comments:

Mapping the MARS property set to a MRN ensures that an actual storage item is specified, and if any Identity properties were omitted in the input MARS property set, the default values are applied. It also frees the GMA implementation from tracking any changes in default values specified by the MARS standard.

5.2 Retrieve

Synonyms:

Read, Open, Check Out

Properties:

identifier, release, language, coverage, encoding, component, item, user, access, revision, fragment, pointer.

Pseudocode:

```
DataStream retrieve (MARS item)
{
    if (self.qualify(item) equal to 'false')
    {
    Report error and Abort;
    }
    Retrieve MRN from MARS item;
    Resolve MRN to archive location for item;
    if (item does not exist in archive)
    {
        Determine best source item for requested target item;
```

-continued

```
        Return self.generate(source_item, item);
    }
    if (input item property is equal to 'data')
    {
        if (Versioning)
        {
            Retrieve metadata for component;
            Retrieve value of revision property from component
    metadata;
            if (component revision not equal to input revision)
            {
                Set target revision to input revision;
            }
            else
            {
                Set target revision to current component revision;
            }
        if (input fragment value specified)
        {
            Retrieve or regenerate fragment for target revision;
        }
        elsif (input pointer specified
                and pointer is single ID reference)
        {
                Retrieve idmap for component for target
    revision;
                Resolve pointer to fragment number;
                if (pointer resolves to fragment number)
                {
                Retrieve or regenerate fragment for target
            revision;
                }
                else
                {
                Retrieve or regenerate data item for target
            revision;
                }
            }
            else
            {
            Retrieve or regenerate data item for target
    revision;
            }
            Return data item or fragment for revision as
            DataStream;
        }
        else
        {
            if (input fragment value specified)
            {
              Retrieve or regenerate specified fragment for
            data item;
            }
            elsif (input pointer specified and pointer is #ID
            reference)
            {
            Retrieve idmap for component;
            Resolve pointer to fragment number;
            if (pointer resolves to fragment number)
            {
                Retrieve or regenerate fragment;
            }
            else
            {
                Retrieve data item;
            }
    }
            else
            {
                Retrieve data item;
            }
            Return data item or fragment as DataStream;
        }
    }
    Return input specified item as DataStream;
}
```

Comments:

Verification of read access and existence of particular revision or fragment of a data item is handled by the qualify( ) action, so the retrieve( ) action need not recheck these.

5.3 store

Synonyms:

Write, Save, Check In

Properties:

identifier, release, language, coverage, encoding, component, item, user, access, revision, fragment, created, modified, owner, creator, modifier, contributor, comment Pseudocode:

```
store (MARS item, DataStream input)
{
Retrieve MRN from MARS input;
if (lock item does not exist for component)
{
self.lock(item); // user must have write permission to succeed
}
Retrieve metadata for component;
if (input item property is equal to 'data')
{
    if (data item exists)
    {
        if (Versioning)
        {
            if (input data item identical to current data item)
            {
                    Notify user that revisions are identical;
                    self.unlock(item);
                    Exit;
            }
            Set comment in component metadata to input comment;
            Store component metadata to meta item for component;
            Move current data item under current revision;
            Move current meta item under current revision;
            if (Static Fragments)
            {
                Move current idmap item under current revision;
                Move current fragments under current rev. (optional);
                }
                Increment revision number in component metadata;
            }
            Retrieve owner from component metadata;
            Retrieve contributor from component metadata;
            if (owner not equal to user and user not in contributor)
            {
                Add input user to contributor in component metadata;
                }
        }
        else
        {
                if (Versioning)
                {
                    Set revision in component metadata to '1';
                }
                Set creator in component metadata to input user;
                Set owner in component metadata to input user;
                Set created in component metadata to current time;
        }
        Set modifier in component metadata to input user;
        Set modified in component metadata to current time;
        Set size in component metadata to bytes in input item;
        Store component metadata to meta item for component;
        }
    Store input DataStream to input specified item;
    self.unlock(item);
}
```

Comments:

When storing a data item, the revision cannot be specified. The GMA must begin all revision sequences from '1' and increment each subsequent revision linearly.

5.4 remove

Remove one or more storage items defined for a given scope, including any events associated with any actions at the specified scope.

Synonyms:

Delete

Properties:

identifier, release, language, coverage, encoding, component, item, user, access Pseudocode:

```
remove (MARS property_set)
{
    if (identifier property not defined)
    {
        Report error and Abort;
    }
    MARS[] items = self.locate (property_set)
    foreach item in items[]
    {
    Retrieve MRN from MARS item;
    if item = 'data' // only check each component once, by
    data item
    {
        Retrieve metadata for component;
        if (Write Access Control)
        {
            Retrieve value of access property from component
            metadata;
            if (user does not have write access)
            {
                Report error and Abort;
            }
        }
        if (lock item exists for component)
        {
            Retrieve value of user property from component
            metadata;
            if (input user not equal to component user)
            {
                Report error and Abort; // not lock owner
            }
            }
        }
    }
        foreach item in items[]
        {
            Retrieve MRN from MARS item;
            if (lock item does not exist for component)
            {
                self.lock(item);
            }
            Delete data stream associated with item from
    system;
            self.unlock(item);
    }
}
```

Comments:

The input MARS property set to the retrieve action must define a media object, media instance, media component, or storage item.

Any user who has write permission for a component can remove that component.

Any user who has write permission for all components of a media instance can remove that media instance.

Any user who has write permission for all immediate components and all instances of a media object can remove that media object.

The removal of any component, instance, or object includes the removal of all storage items and associated events within or belonging to that scope.

Any events associated with the remove action which are valid for the scope of removed data must be executed even though the specifications of those actions are removed along with the other stored data.

5.5 locate

Given a set of Identity properties, produce a listing of zero or more storage items which match all specified properties; and if read access control is used, only include those items for which the user has read access.

Synonyms:

Find, Search, List

Properties:

identifier, release, language, coverage, encoding, component, item, user, access Pseudocode:

```
MARS[] locate (MARS query)
{
    Remove and save 'user' property value from query, if defined;
    MARS[] items = All storage items matching the MARS query;
    if (Read Access Control).
{
    foreach item in items[]
    {
        Set user property in item to input user property value;
        if (self.qualify(item) equal to 'false')
        {
            Remove item from items[]; // no read permission
        }
    }
 }
 Return items[]; // possibly an empty list
}
```

Comments:

The MARS property sets for each returned item are only required to contain values for Identity properties, i.e. identifier, release, language, coverage, encoding, component, and item. Any other included properties are optional and informative only. Applications may not rely on any non-Identity properties being returned by any GMA.

MARS property sets which do not fully identify a unique storage item may NOT be returned in the result list; i.e. every Identity property must have an explicit value defined. Default implicit values should not be applicable to any property set returned by the locate action.

5.6 lock

Lock a particular component in the archive. If write access control is used and the component already exists, the user is required to have write access for the component. Fails if a lock already exists for the component.

Synonyms:

Check out.

Properties:

identifier, release, language, coverage, encoding, component, user, access, locked Pseudocode:

```
lock (MARS component)
{
    if (lock item exists for component)
    {
     Report error and Abort;
    }
    Retrieve metadata for component;
    if (Write Access Control)
    {
        Retrieve value of access property from component metadata;
        if (user does not have write access)
        {
            Report error and Abort;
        }
    }
    Create lock item for component;
    Set user property in component metadata to input user;
    Store component metadata to meta item for component;
}
```

5.7 unlock

Remove the lock on a given component. The user must be the owner of the lock, defined by the user property in the component metadata. Fails if no lock exists.

Synonyms:

Check in, Release

Properties:

identifier, release, language, coverage, encoding, component, user

Pseudocode:

```
    unlock (MARS component)
    {
        if (lock item does not exist for component)
        {
            Report error and Abort;
        }
        Retrieve metadata for component;
        Retrieve value of user property from component metadata;
        if (input user not equal to component user)
        {
            Report error and Abort; // not lock owner
        }
        Remove user property from component metadata;
        Store component metadata to meta item for component;
        Remove lock item for component;
    }
```

5.8 generate

Generate the target item from the source item, if possible, and return it as a data stream.

Synonyms:

Transform, Convert, Produce, Extract

Properties:

identifier, release, language, coverage, encoding, component, item

Pseudocode:

```
DataStream generate (MARS source_item, MARS target_item)
{
    if (self.qualify(source_item) equal to 'false')
    {
        Report error and Abort; // either no read access or item
                                // does not exist in archive...
    }
    Determine proper generation process from source to target;
    if (generation is not possible)
    {
        Report error and Abort;
    }
    Generate target from source and return as DataStream;
}
```

Comments:

The generate action is often used in conjunction with the retrieve action when a given item does not exist in the archive, such as the dynamic creation of a data fragment or converting from one encoding to another.

It's up to the GMA to know how to determine if a given generation is possible, typically employing the help of an external agent to resolve and perform the generation (such as a conversion agent).

6 Serialization and Encoding of Specialized Storage Items

Several storage items defined by MARS and central to the operation of any GMA must conform to particular serialization and encoding requirements insofar as data interchange is concerned. Actual internal storage, encoding, and management of these items is up to each particular GMA implementation in some cases, but every GMA implementation must accept and return the following storage items as defined by this specification.

6.1 'meta' Storage Items

Every 'meta' storage item which is presented to a GMA for storage or returned by a GMA on retrieval must be a valid XML instance conforming to the MARS 2.0 DTD:

Metadata property values "contained" within 'meta' storage items need not be stored or managed internally in the GMA using XML, but every GMA implementation must accept and return 'meta' items as valid XML instances.

6.2 'data' Storage Items within 'meta' Media Components

The same DTD defining the serialization of 'meta' storage items is also used to encode all 'data' storage items for all 'meta' components. Although a GMA must persistently store all 'data' storage items literally, it may also choose to parse and extract a copy of the metadata property values defined within meta component data items to more efficiently determine inherited metadata properties at specific scopes within the archive.

6.3 'idmap' Storage Items

Every 'idmap' storage item which is presented to a GMA for storage or returned by a GMA on retrieval must be encoded as a CSV (comma separated value) data stream defining a table with two columns where each row is a single mapping and where the first column/field contains the value of the 'pointer' property defining the symbolic reference and the second column/field contains the value of the 'fragment' property specifying the data content fragment containing the target of the reference. E.g.:

```
. . .
#EID284828,228
#EID192,12
#EID9928,3281
#EID727,340
. . .
```

The mapping information "contained" within 'idmap' storage items need not be stored or managed internally in the GMA in CSV format, but every GMA implementation must accept and return 'idmap' items as CSV formatted data streams.

6.4 'data' Storage Items for a Specific Revision

The GMA must return the complete and valid contents of a given 'data' storage item for a specified revision (if it exists), regardless how previous revisions are managed internally. Reverse deltas or other change summary information which must be applied in some fashion to regenerate or rebuild the desired revision must never be returned by a GMA, even if that is all that is stored for each revision data item internally. Only the complete data item is to be returned.

PMA: Portable Media Archive

1 Scope

This document defines the Portable Media Archive (PMA), a physical organization model of a file system based data repository conforming to and suitable for implementations of the Generalized Media Archive (GMA) abstract archival model.

The PMA model is a component of the Media Framework for Electronic Media. A basic understanding of the Media Framework, the GMA, and MARS is presumed by this specification.

2 Overview

The PMA defines an explicit yet highly portable file system organization for the storage and retrieval of information based on Media Attribution and Reference Semantics (MARS) metadata. The PMA uses the MARS Identity and Item Qualifier metadata property values themselves as directory and/or file names, avoiding the need for a secondary referencing mechanism and thereby simplifying the implementation, maximizing efficiency, and producing a mnemonic organizational structure.

This specification only defines the physical organization of a file system, and not the processes or algorithms for accessing, manipulating, or otherwise interacting with or operating on that file system. Different GMA implementations based on the PMA model may interact with the data in different ways.

Any GMA may use a physical organization model other than the PMA. The PMA physical archival model is not a requirement of the GMA abstract archival model. However, the PMA may nevertheless be employed by such implementations both as a data interchange format between disparate GMA implementations as well as a format for storing portable backups of a given archive.

3 Related Documents, Standards, and Specifications 3.1 Media Framework for Electronic Media The Media Framework is a generalized metadata driven framework for the management and distribution of electronic media which defines a set of standard, open and portable models, interfaces, and protocols facilitating the construction of tools and environments optimized for the management, referencing, distribution, storage, and retrieval of electronic media; as well as a set of core software components (agents) providing functions and services relating to archival, versioning, access control, search, retrieval, conversion, navigation, and metadata management.

3.2 Media Attribution and Reference Semantics (MARS)

Media Attribution and Reference Semantics (MARS), a component of the Media

Framework, is a metadata specification framework and core standard vocabulary and semantics facilitating the portable management, referencing, distribution, storage and retrieval of electronic media.

3.3 Generalized Media Archive (GMA)

The Generalized Media Archive (GMA), a component of the Media Framework, is an abstract archival model for the storage and management of data based solely on Media Attribution and Reference Semantics (MARS) metadata; providing a uniform, consistent, and implementation independent model for information storage and retrieval, versioning, and access control.

4 General Architecture

The physical structure of a PMA is organized as a hierarchical directory tree that follows the MARS object/instance/component/item scoping model. Each media object comprises a branch in the directory tree, each media instance a sub-branch within the object branch, each media component a sub-branch within the instance, and so forth.

Only MARS Identity and Item Qualifier property values are used.

All other metadata properties (as well as Identity and Qualifier properties) are defined and stored persistently in ‘meta’ storage items; conforming to the serialization and interchange encodings defined by the GMA specification. Because Identity and Item Qualifier properties must either be valid MARS tokens or integer values, any such property value is an acceptable directory or file name in all major file systems in use today.

4.1 Media Object Scope

The media object scope is encoded as a directory path consisting of a sequence of nested directories, one for each character in the media object ‘identifier’ property value. E.g.:

identifier=“dn9982827172”==> d/n/9/9/8/2/8/2/7/1/2/

Identifier values are broken up in this fashion in order to support very large numbers of media objects, possibly millions or billions, residing in a given archive. If the identifiers were used as complete directory names, most file systems would support only several hundred to several thousand media objects, depending on the file system.

Using only one character per directory ensures that there will be at most 37 child sub-directories within any given directory level (one possible sub-directory for each character in the set [a–z0–9_] allowed in MARS token values), further satisfying the maximum directory children constraints of most modern file systems (see below).

The media object scope may contain either media instance sub-scopes or media component sub-scopes; the latter defining information (metadata or otherwise) which is shared by or relevant to all instances of the media object.

4.2 Media Instance Scope

The media instance scope is encoded as a nested directory sub-path within the media object scope and consisting of one directory for each of the property values for ‘release’, ‘language’, ‘coverage’, and ‘encoding’, in that order. E.g.:

release=“1” language=“en” coverage=“global” encoding=“xhtml”=>1/en/global/xhtml/

4.3 Media Component Scope

The media component scope is encoded as a sub-directory within either the media object scope or media instance scope and named the same as the component property value. E.g.:

component=“meta”=>meta/

4.4 Revision Scope

The revision scope, grouping the storage items for a particular revision milestone, is encoded as a directory sub-path within the media component scope beginning with the literal directory ‘revision’ followed by a sequence of nested directories corresponding to the digits in the non-zero padded revision property value. E.g.:

revision=“27”=>revision/2/7/

The ‘data’ item for a given revision must be a complete and whole snapshot of the revision, not a partial copy or set of deltas to be applied to some other revision or item. It must be fully independent of any other storage item insofar as its completeness is concerned.

4.5 Fragment Scope

The fragment scope, grouping the storage items for a particular static fragment of the data component content, is encoded as a directory sub-path within the media component scope or revision scope and beginning with the literal directory ‘fragment’ followed by a sequence of nested directories corresponding to the digits in the non-zero padded fragment property value. E.g.:

fragment=“5041”=>fragment/5/0/4/1/

4.6 Event Scope

The event scope, grouping action triggered operations for a particular component, instance, or object, is encoded as a directory sub-path within the media component scope, media instance scope, or media object scope and beginning with the literal directory ‘events’ and containing one or more files named the same as the MARS action property values, each file containing a valid MARS XML instance defining the sequence of operations as ordered property sets. E.g.:

events/store events/retrieve events/unlock 4.7 Storage Item

The storage item is encoded as a filename within the media component, revision, or fragment scope and named the same as the item property value.

E.g.:

item=“data”=>data.6

5 Host File System Requirements

This specification does not set minimum requirements on the capacities of host file systems, nor absolute limits on the volume or depth of conforming archives. However, an understanding of the variables which may affect portability from one file system to another is important if data integrity is to be maintained.

This specification does, however, define the following recommended minimal constraints on a host file system, which should be met, regardless of the total capacity or other capabilities of the file system in question:

File and Directory Name Length: 30

Directory Depth: 64

Number of Directory Children: 100

The above specified constraints are compatible with the following commonly used file systems, which are therefore suitable for hosting an PMA (which also does not exceed real constraints of the given host file system):

VFAT (Windows 95/98), NTFS (Windows NT/2000), HFS (Macintosh), HPFS (OS/2), HP/UX, UFS (Solaris), ext2 (Linux), ISO 9660 Levels 2 and 3 (CDROM), and UDF (CDR/W, DVD).

There are likely many other file systems in addition to those listed above which are suitable for hosting an PMA.

Note that FAT (MS-DOS, Windows 3.x) and ISO 9660 Level 1 file systems are not suitable for hosting an PMA. ISO 9660 Level 1 plus Joliet or Rock Ridge extensions may be suitable in some cases, but this is not generally recommended.

6 Example Archive File System

The following is a fragment of an example file system organization for a Portable Media Archive. The location of the directory paths with respect to the root directory is not specified. The directory separator is illustrative only, and will conform to each particular file system in which a given archive is stored.

Media object scope path segments are highlighted in blue, media instance scope segments in red, media component scope segments in green, revision scope segments in violet, fragment scope segments in orange, event scope segments in crimson, and storage items in black.

d/n/9/9/8/2/8/2/7/1/2/meta/data d/n/9/9/8/2/8/2/7/1/2/meta/meta d/n/9/9/8/2/8/2/7/1/2/meta/revision/1/data d/n/9/9/8/2/8/2/7/1/2/meta/revision/1/meta d/n/9/9/8/2/8/2/7/1/2/meta/revision/2/data d/n/9/9/8/2/8/2/7/1/2/meta/revision/2/meta d/n/9/9/8/2/8/2/7/1/2/meta/revision/3/data d/n/9/9/8/2/8/2/7/1/2/meta/revision/3/meta d/n/9/9/8/2/8/2/7/1/2/meta/revision/4/data d/n/9/9/812/8/2/7/1/2/meta/revision/4/meta d/n/9/9/8/2/8/2/7/1/2/meta/revision/5/data d/n/9/9/8/2/8/2/7/1/2/meta/revision/5/meta d/n/9/9/8/2/8/2/7/1/2/meta/events/generate d/n/9/9/8/2/8/2/7/1/2/1/en/global/docbook/meta/data d/n/9/9/8/2/8/2/7/1/2/1/en/global/docbook/meta/meta d/n/9/9/8/2/8/2/7/1/2/1/en/global/docbook/meta/revision/1/data d/n/9/9/8/2/8/2/7/1/2/1/en/global/docbook/meta/revision/1/meta d/n/9/9/8/2/8/2/7/1/2/1/en/global/docbook/meta/revision/2/data d/n/9/9/8/2/8/2/7/1/2/1/en/global/docbook/meta/revision/2/meta d/n/9/9/8/2/8/2/7/1/2/1/en/global/docbook/toc/data d/n/9/9/8/2/8/2/7/1/2/1/en/global/docbook/toc/meta d/n/9/9/8/2/8/2/7/1/2/1/en/global/docbook/index/data d/n/9/9/8/2/8/2/7/1/2/1/en/global/docbook/index/meta d/n/9/9/8/2/8/2/7/1/2/1/en/global/docbook/glossary/data d/n/9/9/8/2/8/2/7/1/2/1/en/global/docbook/glossary/meta d/n/9/9/8/2/8/2/7/1/2/1/en/global/docbook/data/data d/n/9/9/8/2/8/2/7/1/2/1/en/global/docbook/data/meta d/n/9/9/8/2/8/2/7/1/2/1/en/global/docbook/data/revision/1/data d/n/9/9/8/2/8/2/7/1/2/1/en/global/docbook/data/revision/1/meta d/n/9/9/8/2/8/2/7/1/2/1/en/global/docbook/data/revision/2/data d/n/9/9/8/2/8/2/7/1/2/1/en/global/docbook/data/revision/2/meta d/n/9/9/8/2/8/2/7/1/2/1/en/global/docbook/data/revision/3/data d/n/9/9/8/2/8/2/7/1/2/1/en/global/docbook/data/revision/3/meta d/n/9/9/8/2/8/2/7/1/2/1/en/global/docbook/data/revision/4/data d/n/9/9/8/2/8/2/7/1/2/1/en/global/docbook/data/revision/4/meta d/n/9/9/8/2/8/2/7/1/2/1/en/global/docbook/data/revision/ . . .

d/n/9/9/8/2/8/2/7/1/2/1/en/global/docbook/data/revision/2/1/data d/n/9/9/8/2/8/2/7/1/2/1/en/global/docbook/data/revision/2/1/meta d/n/9/9/8/2/8/2/7/1/2/1/en/global/docbook/data/events/store d/n/9/9/8/2/8/2/7/1/2/1/en/global/docbook/data/events/remove.8 (9)

d/n/9/9/8/2/8/2/7/1/2/1/en/global/xhtml/meta/data d/n/9/9/8/2/8/2/7/1/2/1/en/global/xhtml/meta/meta d/n/9/9/8/2/8/2/7/1/2/1/en/global/xhtml/meta/revision/1/data d/n/9/9/8/2/8/2/7/1/2/1/en/global/xhtml/meta/revision/1/meta d/n/9/9/8/2/8/2/7/1/2/1/en/global/xhtml/data/revision/ . . .

d/n/9/9/8/2/8/2/7/1/2/1/en/global/xhtml/meta/revision/9/data d/n/9/9/8/2/8/2/7/1/2/1/en/global/xhtml/meta/revision/9/meta d/n/9/9/8/2/8/2/7/1/2/1/en/global/xhtml/toc/data d/n/9/9/8/2/8/2/7/1/2/1/en/global/xhtml/toc/meta d/n/9/9/8/2/8/2/7/1/2/1/en/global/xhtml/index/data d/n/9/9/8/2/8/2/7/1/2/1/en/global/xhtml/index/meta d/n/9/9/8/2/8/2/7/1/2/1/en/global/xhtml/glossary/data d/n/9/9/8/2/8/2/7/1/2/1/en/global/xhtml/glossary/meta d/n/9/9/8/2/8/2/7/1/2/1/en/global/xhtml/data/data d/n/9/9/8/2/8/2/7/1/2/1/en/global/xhtml/data/meta d/n/9/9/8/2/8/2/7/1/2/1/en/global/xhtml/data/idmap d/n/9/9/8/2/8/2/7/1/2/1/en/global/xhtml/data/fragment/0/data d/n/9/9/8/2/8/2/7/1/2/1/en/global/xhtml/data/fragment/0/meta d/n/9/9/8/2/8/2/7/1/2/1/en/global/xhtml/data/fragment/1/data d/n/9/9/8/2/8/2/7/1/2/1/en/global/xhtml/data/fragment/1/meta d/n/9/9/8/2/8/2/7/1/2/1/en/global/xhtml/data/fragment/2/data d/n/9/9/8/2/8/2/7/1/2/1/en/global/xhtml/data/fragment/2/meta d/n/9/9/8/2/8/2/7/1/2/1/en/global/xhtml/data/fragment/3/data d/n/9/9/8/2/8/2/7/1/2/1/en/global/xhtml/data/fragment/ . . .

d/n/9/9/8/2/8/2/7/1/2/1/en/global/xhtml/data/fragment/9/data d/n/9/9/8/2/8/2/7/1/2/1/en/global/xhtml/data/fragment/9/meta d/n/9/9/8/2/8/2/7/1/2/1/en/global/xhtml/data/fragment/1/0/data d/n/9/9/8/2/8/2/7/1/2/1/en/global/xhtml/data/fragment/1/0/meta d/n/9/9/8/2/8/2/7/1/2/1/en/global/xhtml/data/fragment/ . . .

d/n/9/9/8/2/8/2/7/1/2/1/en/global/xhtml/data/fragment/5/9/data d/n/9/9/8/2/8/2/7/1/2/1/en/global/xhtml/data/fragment/5/9/meta d/n/9/9/8/2/8/2/7/1/2/1/en/global/xhtml/data/fragment/ . . .

d/n/9/9/8/2/8/2/7/1/2/1/en/global/xhtml/data/fragment/5/9/3/2/data d/n/9/9/8/2/8/2/7/1/2/1/en/global/xhtml/data/fragment/5/9/3/2/meta d/n/9/9/8/2/8/2/7/1/2/1/en/global/xhtml/data/revision/0/data d/n/9/9/8/2/8/2/7/1/2/1/en/global/xhtml/data/revision/0/meta d/n/9/9/8/2/8/2/7/1/2/1/en/global/xhtml/data/revision/0/ . . .

d/n/9/9/8/2/8/2/7/1/2/1/en/global/xhtml/data/revision/ . . .

d/n/9/9/8/2/8/2/7/1/2/1/en/global/xhtml/data/revision/3/4/data d/n/9/9/8/2/8/2/7/1/2/1/en/global/xhtml/data/revision/3/4/meta d/n/9/9/8/2/8/2/7/1/2/1/en/global/xhtml/data/revision/3/4/idmap d/n/9/9/8/2/8/2/7/1/2/1/en/global/xhtml/data/revision/3/4/fragment/0/data d/n/9/9/8/2/8/2/7/1/2/1/en/global/xhtml/data/revision/3/4/fragment/0/meta d/n/9/9/8/2/8/2/7/1/2/1/en/global/xhtml/data/revision/3/4/fragment/ . . .

d/n/9/9/8/2/8/2/7/1/2/1/en/global/xhtml/data/revision/3/4/fragment/5/9/3/2/data d/n/9/9/8/2/8/2/7/1/2/1/en/global/xhtml/data/revision/3/4/fragment/5/9/3/2/meta d/n/2/4/8/2/0/5/3/meta/data d/n/2/4/8/2/0/5/3/meta/meta d/n/2/4/8/2/0/5/3/meta/revision/ . . .

d/n/2/4/8/2/0/5/3/8/en/global/cgm__4/meta/data.9 (9)

d/n/2/4/8/2/0/5/3/8/en/global/cgm__4/meta/meta d/n/2/4/8/2/0/5/3/8/en/global/cgm__4/meta/revision/ . . .

d/n/2/4/8/2/0/5/3/8/en/global/cgm__4/index/data d/n/2/4/8/2/0/5/3/8/en/global/cgm__4/index/meta d/n/2/4/8/2/0/5/3/8/en/global/cgm__4/data/data d/n/2/4/8/2/0/5/3/8/en/global/cgm__4/data/meta d/n/2/4/8/2/0/5/3/8/en/global/cgm__4/data/revision/1/data d/n/2/4/8/2/0/5/3/8/en/global/cgm__4/data/revision/1/meta d/n/2/4/8/2/0/5/3/8/en/global/cgm__4/data/revision/ . . .

d/n/2/4/8/2/0/5/3/8/en/global/cgm__4/data/revision/1/7/data d/n/2/4/8/2/0/5/3/8/en/global/cgm__4/data/revision/1/7/meta REGS: Registry Service Architecture 1 Scope This document defines the Registry Service Architecture (REGS), a generic architecture for dynamic query resolution agencies based on the Media Framework and Media Attribution and Reference Semantics (MARS), providing a unified interface model for a broad range of search and retrieval tools.

The REGS architecture is a component of the Media Framework for Electronic Media. A basic understanding of the Media Framework and MARS is presumed by this specification.

2 Overview

REGS provides a generic means to interact with any number of specialized search and retrieval tools using a common set of protocols and interfaces based on the Media Framework; namely MARS metadata semantics and either a POSIX or CGI compliant interface. As with other Media Framework components, this allows for much greater flexibility in the implementation and evolution of particular solutions while minimizing the interdependencies between the tools and their users (human or otherwise).

Being based on MARS metadata allows for a high degree of automation and tight synchronization with the archival and management systems used in the same environment, with each registry service deriving its own registry database directly from the metadata stored in and maintained by the various archives themselves; while at the same time, each registry service is insulated from the implementation details of and changes in the archives from which it receives its information.

Every registry service shares a common architecture and fundamental behavior, differing primarily only in the actual metadata properties required for their particular application.

3 Related Documents, Standards, and Specifications 3.1 Media Framework for Electronic Media The Media Framework is a generalized metadata driven framework for the management and distribution of electronic media which defines a set of standard, open and portable models, interfaces, and protocols facilitating the construction of tools and environments optimized for the management, referencing, distribution, storage, and retrieval of electronic media; as well as a set of core software components (agents) providing functions and services relating to archival, versioning, access control, search, retrieval, conversion, navigation, and metadata management.

3.2 Media Attribution and Reference Semantics (MARS)

Media Attribution and Reference Semantics (MARS), a component of the Media

Framework, is a metadata specification framework and core standard vocabulary and semantics facilitating the portable management, referencing, distribution, storage and retrieval of electronic media.

3.3 Generalized Media Archive (GMA)

The Generalized Media Archive (GMA), a component of the Media Framework, is an abstract archival model for the storage and management of data based solely on Media Attribution and Reference Semantics (MARS) metadata; providing a uniform, consistent, and implementation independent model for information storage and retrieval, versioning, and access control.

4 Key Terms and Concepts 4.1 Property

A property, as defined by the MARS specification, is a quality or attribute which can be assigned or related to an identifiable body of information, and is defined as an ordered collection of one or more values sharing a common name. The name of the collection represents the name of the property and the value(s) represent the realization of that property. Typically, constraints are placed on the values which may serve as the realization of a given property.

4.2 Property Set

A property set is any set of valid MARS metadata properties.

4.3 Profile

A profile is a property set which, in addition to any non-identity related properties, explicitly defines the identity of a specific media object, media instance, media component, or storage item (possibly a qualified data item).

Default values for unspecified Identity properties are not applied to a profile and any given profile may not have scope gaps in the defined Identity properties (i.e. 'item' defined but not 'component', etc.). Profiles must unambiguously and precisely identify a media object, instance, component or item.

In addition to identity, the retrieval location of the archive or other repository where that information resides must be specified either using the 'location' or 'agency' properties. If both are specified, they must define the equivalent location. The additional properties included in any given profile are defined by the registry service operating on or returning the profile, and may not necessarily contain any additional properties other than those defining identity and location.

4.4 Query

A query is a special kind of property set which defines a set of property values which are to be compared to the equivalent properties in one or more profiles. A query differs from a regular property set in that it is allowed to contain values which may deviate from the MARS specification in the following ways:

4.4.1 Multiple Values

Properties normally allowing only a single value may have multiple values defined in a query.

The normal interpretation of multiple query values is to apply 'OR' logic such that the property matches if any of the query values match any of the target values; however, a given registry service is permitted, depending on the application, to apply 'AND' logic requiring that all query values match a target value, and optionally that every target value is matched by a query value.

It must be clearly specified for a registry service if 'AND' logic is being applied to multiple query value sets.

4.4.2 Regular Expressions

Query values for properties of MARS type String may contain valid POSIX regular expressions rather than literal strings; in which case the property matches if the specified regular expression pattern matches the target value.

4.4.3 Comparison Operators

Query values may be prefixed by one of several comparison operators, with one or more mandatory intervening space characters between the operator and the query value.

The order of comparison for binary operators is:

query value {operator} target value

Not all comparison operators are necessarily meaningful for all property value types, nor are all operators required to be supported by any given registry service.

It must be clearly specified for every registry service which, if any, comparison operators are supported in input queries.

In the rare case that a literal string value begins with a comparison operator followed by one or more intervening spaces, the initial operator character should be preceded by a backslash character '\'. The registry service must then identify and remove the backslash character prior to any comparisons.

4.4.3.1 Negation "!"

The property matches if the query value fails to match the target value.

E.g. "! approved".

4.4.3.2 Less Than "<"

The property matches if the query value is less than the target value.

E.g. "<2.5".

4.4.3.3 Greater Than ">"

The property matches if the query value is greater than the target value.

E.g. ">draft".

4.4.3.4 Less Than or Equal To "<="

The property matches if the query value is less than or equal to the target value.

E.g. "<=2000-09-22".

4.4.3.5 Greater Than or Equal to ">="

The property matches if the query value is greater than or equal to the target value.

E.g. ">=5000".

4.4.4 Wildcard Value Operator

Any property in a query may have specified for it the special value "*", regardless of property type, which effectively matches any defined value in any target. The wildcard value does not however match a property which has no value defined for it.

The wildcard value operator may be preceded by the negation operator.

This special wildcard operator is particularly useful for specifying the level of Identity scoping of the returned profiles for a registry which stores profiles for multiple levels of scope (see section XXX). It is also used to match properties where all that is of interest is that they have some value defined but it doesn't matter what the value actually is. Or, when combined with the negation operator, to match properties which have no value defined. The latter is useful for validation and quality assurance processes to isolate information which is missing mandatory or critical metadata properties.

In the rare case that a literal string value equals the wildcard value operator, the wildcard value operator must be preceded by a backslash character '\'. The registry service must then identify and remove the backslash character prior to any comparisons.

5 General Architecture

Every registry service shares the following common features and qualities with regards to its implementation and operation (see FIG. 1).

MARS metadata profiles are collected from one or more archives, and combined into an optimized, specialized database for performing searches, according to the nature of the particular registry service.

The internal organization and operation of the registry service is totally independent from and ignorant of the internal organization and operation of each archive from which it receives profiles.

All registry services implement the MARS 'locate' action, and only that action, which must be explicitly specified in every input query.

Users (human or otherwise) submit MARS metadata search queries to the registry service and receive zero or more MARS metadata profiles matching the search query, possibly scored and ordered by relevance.

The MARS metadata-based query interface completely hides the internal organization and operation of the registry service from the user.

The implementation of any registry service can be modified or even replaced entirely by a different implementation with no impact to or dependency upon archives or users.

New archives can contribute profiles to a registry service with no special knowledge or modification by the registry service.

5.1 Defining Characteristics of a Registry Service

A registry service is defined by the following three characteristics:

1. the metadata properties it allows and requires in each profile 2. the metadata properties it allows and requires in a given search query 3. whether returned profiles are scored and ordered according to relevance These three criteria define the interface by which the registry service interacts with all source archives and all users.

All other criteria are hidden within and totally open to the particular implementation of the registry service, so long as the implementation conforms to the general behavior and operation otherwise defined for all registry services by this specification.

5.2 Generation of the Registry Database

A particular registry service will extract from a given archive (or be provided by or on behalf of the archive) the profiles for all targets of interest which a user may search on, and containing all properties defined for each target which are relevant to the particular registry.

Depending on the nature of the registry, this may include profiles for both abstract media objects, media instances, and media components as well as physical storage items or even qualified data items. Some property values for a profile may be dynamically generated specifically for the registry, such as the automated identification or extraction of keywords or index terms from the data content, or similar operations.

The profiles from several archives may be combined by the registry service into a single search space for a given application or environment. The location and/or agency properties serve to differentiate the source locations of the various archives from which the individual profiles originate.

5.3 Resolution of Search Results

All registry services define and search over profiles, and those profiles define bodies of information at either an abstract or physical scope; i.e. media objects, media instances, media components, or storage items. A given registry database might contain profiles for only a single level of scope or for several levels of scope.

If a query does not define any Identity properties, then the registry service must return all matching profiles regardless of scope; however, if the query defines one or more Identity properties, then all profiles returned by the registry service must be of the same level of scope as the lowest scoped Identity property defined in the search query.

Note that a specific level of scope can be specified in a query by using the special wildcard value "*" for the scope of interest (e.g. "component=meta item=* . . . " to find all storage items within meta components which otherwise match the remainder of the query).

Each set of profiles returned for a given search may be optionally scored and ordered by relevance, according to how closely they match the input query. The score must be returned as a value to the MARS 'relevance' property. The criteria for determining relevance is up to each registry service, but it must be defined as a percentage value where zero indicates no match whatsoever, 100 indicates a "perfect" match (however that is defined by the registry service), and a value between zero and 100 reflects the closeness of the match proportionally. The scale of relevance from zero to 100 is expected to be linear.

5.4 Minimum and Maximum Thresholds

A registry service can be directed by a user, or by implementation, to apply two types of thresholds to constrain the total number of profiles returned by a given search. Both thresholds may be applied together to the same search results.

5.4.1 Maximum Size

The MARS 'size' property can be specified in the search query (or applied implicitly by the registry service) to define the maximum number of profiles to be returned.

In the case that profiles are scored and ordered by relevance, the maximum number of profiles are to be taken from the highest scoring profiles.

5.4.2 Minimum Relevance

The MARS 'relevance' property can be specified in the search query (or applied implicitly by the registry service) to define the minimum score which must be equaled or exceeded by every profile returned.

Note that specifying a minimum relevance of 100 requires that targets match perfectly, allowing one to choose between best match and absolute match.

5.5 Serialization of Input/Output

All property sets (including profiles and queries) which are received/imported by and returned/exported from a registry service via a data stream must be encoded as XML instances conforming to the MARS DTD. This includes sets of profiles extracted from a given archive, search queries received from client applications, and sets of profiles returned as the results of a search.

If multiple property sets are defined in a MARS XML instance provided as a search request, then each property set is processed as a separate query, and the results of each query returned in the order specified, combined in a single XML instance. Any sorting or reduction by specified thresholds is done per each query only. The results from the separate queries are not combined in any fashion other than concatenated into the single returned XML instance. Every registry service is free to organize and manage its internal registry database using whatever means is optimal for that particular service. It is not required to utilize or preserve any XML encoding of the profiles.

5.5.1 Human User Interface Recommendations

Most registry services will include an additional CGI or other web based component which provides a human-usable interface for specifying queries and accessing search results. This will typically act as a specialized proxy to the general registry service, converting the user specified metadata to a valid MARS query and then mapping the returned XML instance containing the target profiles to HTML for viewing and selection. Although such an interface or proxy component is outside the scope of this specification proper, the following recommendations, if followed, should provide for a certain degree of consistency between various human user interfaces to registry services.

The set of profiles should be presented as a sequence of links, preserving any ordering based on relevance scoring.

Each profile link should be encoded as an (X)HTML 'a' element within a block element or other visually distinct element ('p', 'li', 'td', etc.).

The URL value of the 'href' attribute of the 'a' element should be constructed from the profile, based on the 'location' and/or 'agency' properties, which will resolve to the content of (or access interface for) the target.

If the 'relevance' property is defined in the profile, its value should begin the content of the 'a' element, differentiated clearly from subsequent content by punctuation or structure such as parentheses, comma, colon, separate table column, etc.

If the 'title' property is defined in the profile, its value should complete the content of the 'a' element. Otherwise, a (possibly partial) MRN should be constructed from the profile and complete the content of the 'a' element.

Examples:

```
<html>
<body>
<p>
</p>
<p>
</p>
<p>
</body>
</html>
<html>
<body>
<table>
<tr>
<th>Score</th>
<th>Target</th>
</tr>
<tr>
<td>98</td>
<td><a href="http://xyz.com/GMA?action=retrieve&identifier=.">Foo</a></td>
</tr>
<tr>
   <td>87</td>
<td><a                      href="http://xyz.com/GMA?action=retrieve&identifier= . . . ">Bar</a></td>
</tr>
<tr>
<td>37</td>
<td><a href="http://xyz.com/GMA?action=retrieve&identifier=. . . ">Bas</a></td>
</tr>
</table>
```

</body>

</html>0.12 (16)

6 Core Registry Services

The following registry services are defined as sub-components of the Media Framework. For each registry service, a brief description is provided, as well as a specification of which metadata properties are required or allowed for profiles and for queries. No discussion is provided regarding the scoring and ordering of search results by relevance. Each registry service is free to provide such functionality as needed and in a fashion optimal to the nature of the particular registry service.

The 'action' property is required to be specified with the value 'locate' in all registry service queries, therefore it is not included in the required query property specifications for each registry service. Likewise, the 'relevance' and 'size' properties are allowed for all input queries to all registry services, therefore they are also not explicitly listed in the allowed query property specifications for each registry service.

6.1 Metadata Registry Service (META-REGS)

META-REGS provides for searching the complete metadata property sets (including inherited values) for all identifiable bodies of information, concrete or abstract; including media objects, media instances, media components, storage items and qualified data items.

The results of a search are a set of profiles defining zero or more targets at the lowest level of Identity scope for which there is a property defined in the search query. All targets in the results will be of the same level of scope, even if the registry database contains targets at all levels of scope.

The wildcard operator can be used to force a particular level of scope in the results. E.g. to define media instance scope, only one instance property need be defined with the wildcard operator value (e.g. "language=*"); to define media component scope, the component property can be defined with the wildcard operator value (e.g. "component=*"); etc. The registry service may not require nor expect that any particular instance property be used, nor that only one property be used. It is not permitted for two or more instance properties to have both wildcard and negated wildcard operator values in a given input query.

The default behavior is to provide the best matches for the specified query; however, by defining in the input query a value of 100 for the 'relevance' property, the search results will only include those targets which match the query perfectly. The former is most useful for general browsing and exploration of the information space and the latter for collection and extraction of specifically defined data.

6.1.1 Profile Properties

Required: All Identity properties required to uniquely identify the body of information in question, as well as either the 'location' or 'agency' property. Allowed: Any valid MARS property, presumably all defined MARS properties applicable to the body of information in question. It is recommended that the 'title' property be defined for all profiles, whenever possible.

6.1.2 Query Properties

Required: No specific properties required. At least one property must be specified in the search query other than the 'action' property.

Allowed: Any valid MARS property.

6.2 Content Registry Service (CON-REGS)

CON-REGS provides for searching the textual content of all media instances within the included archives. It corresponds to a traditional "free-text index" such as those employed by most web sites.

The results of a search are a set of profiles defining zero or more data component data storage items or qualified data items.

Profiles are defined only for data storage items and qualified data items (e.g. fragments) which belong to the data component of a media instance. Other components and other items belonging to the data component are not to be included in the search space of a CON-REGS registry service. Note that in addition to actual fragment items, profiles for "virtual" fragments can be defined using a combination of the 'pointer' and (if needed) 'size' properties, where appropriate for the media type (e.g. for specific sections of an XML document instance).

For each data item, the 'keywords' property is defined as the unique, minimal set of index terms for the item, typically corresponding to the morphological base forms (linguistic forms independent of inflection, derivation, or other lexical variation) excluding common "stop" words such as articles ("the", "a"), conjunctions ("and", "whereas"), or semantically weak words ("is", "said"), etc. It is expected that the same tools and processes for distilling arbitrary input into minimal forms are applied both in the generation of the registry database as well as for all relevant input query values.

The scope of the results, such as whole data items versus fragments, can be controlled using the 'fragment' property and the wildcard value operator "*" for the scope of interest. E.g., "fragment=*" will force the search to only return profiles of matching fragments and not of whole data items; whereas "fragment=!*" will only return profiles of matching whole data storage items. If otherwise unspecified, all matching profiles for all items will be returned, which may result in redundant information being identified.

A human user interface will likely hide the definition of the 'fragment' property behind a more mnemonic selection list or set of checkboxes, providing a single field of input for the query keywords.

If a given value for the 'keywords' property contains multiple words separated by white space, then all of the words must occur adjacent to one another in the order specified in the target content. Note that this is not the same as multiple property values where each value contains a single word. The set of all property values (string set) constitute an OR set, while the set of words in a single property value (string) constitute a sequence (phrase) in the target. White space sequences in the query property value can be expected to match any white space sequence in the target content, even if those two sequences are not identical (i.e. a space can match a newline or tab, etc.).

A human user interface will have to provide a mechanism for defining multiple 'keywords' property values as well as for differentiating between values having a single word and values containing phrases or other white space delimited sequences of words. In the interest of consistency across registry services, it is recommended that when a single value input field is provided for the 'keywords' or similar property, white space is used to separate multiple values by default and multi-word values are specially delimited by quotes to indicate that they constitute the same value (e.g. the field [a b "c1 c2 c3" d] defines four values, the third of which has three words).

It is permitted for special operators or commands to CON-REGS to be interspersed within the set of 'keywords' values, such as those controlling boolean logic, maximal or minimal adjacency distances, etc. It is up to the registry service to ensure that no ambiguity arises between CON-REGS operators and actual values nor between REGS special operators and CON-REGS operators. REGS special operators always take precedence over any CON-REGS operators.

6.2.1 Profile Properties

Required: All Identity and Qualifier properties required to uniquely identify each data storage item or qualified data item in question; either the 'location' or 'agency' property; and the 'keywords' property containing a unique, minimal set of index terms for the item in question.

Allowed: All required properties, as well as the 'title' property (recommended).

6.2.2 Query Properties

Required: The 'keywords' property containing the set of index terms to search on (may need to be distilled into a unique, minimal set of base forms by the registry service).

Allowed: All required properties, as well as the 'fragment' property with either wildcard value or negated wildcard value only.

6.3 Typological Registry Service (TYPE-REGS)

TYPE-REGS provides for searching the set of 'class' property values (including any inherited values) for all media instances according to the typologies defined for the information contained in the included archives. The results of a search are a set of profiles defining zero or more media instances.

In addition to the literal matching of property values, such as provided by META-REGS, TYPE-REGS also matches query values to target values taking into account one or more "IS-A" type hierarchies as defined by the typologies employed such that a target value which is an ancestor of a query value also matches (e.g. a query value of "dog" would be expected to match a target value of "animal"). If only exact matching is required (such that e.g. "dog" only matches "dog") then META-REGS should be used.

TYPE-REGS does not differentiate between classification values which belong to different typologies nor for any ambiguity which may arise from a single value being associated with multiple typologies with possibly differing semantics. It is only responsible for efficiently locating all media instances which have defined values matching those in the input query. If conflicts arise from the use of multiple typologies within the same environment, it is recommended that separate registry databases be generated and referenced for each individual typology.

6.3.1 Profile Properties

Required: The Identity properties which explicitly and completely define the media instance, one or more values defined for the 'class' property, as well as either the 'location' or 'agency' property.

Allowed: All required properties, as well as the 'title' property (recommended).

6.3.2 Query Properties

Required: The 'class' property containing the set of classifications to search on.

Allowed: Only the 'class' property is allowed in search queries.

6.4 Dependency Registry Service (DEP-REGS)

DEP-REGS provides for searching the set of Association property values (including any inherited values) which can be represented explicitly using MARS Identity semantics for all bodies of information in the included archives. The results of a search are a set of profiles defining zero or more targets matching the search query.

DEP-REGS is used to identify relationships between bodies of information within a given environment such as a document which serves as the basis for a translation to another language or a conversion to an alternate encoding, a high level diagram which summarizes the basic characteristics of a much more detailed low level diagram or set of diagrams, a reusable documentation component which serves as partial content for a higher level component, etc. The ability to determine such relationships, many of which may be implicit in the data in question, is crucial for managing large bodies of information where changes to one media instance may impact the validity or quality of other instances.

For example, to locate all targets which immediately include a given instance in their content, one would construct a query containing the 'includes' property with a value consisting of a URI identifying the instance, such as an MRN. DEP-REGS would then return profiles for all targets which include that instance as a value of their 'includes' property. Similarly, to locate all targets which contain referential links to a given instance, one would construct a query containing the 'refers' property with a value identifying the instance. DEP-REGS can be seen as a specialized form of META-REGS, based only on the minimal set of Identity and Association properties. Furthermore, in contrast to the literal matching of property values such as performed by META-REGS, DEP-REGS matches Association query values to target values by applying on-the-fly mapping between all equivalent URI values when making comparisons; such as between an MRN and an Agency CGI URL, or between two non-string-identical Agency CGI URLs, which both define the same resource (regardless of location). Note that if the META-REGS implementation provides such equivalence mapping of URI values, then a separate DEP-REGS implementation is not absolutely required; though one may be still employed on the basis of efficiency, given the highly reduced number of properties in a DEP-REGS profile.

6.4.1 Profile Properties

Required: The Identity properties which explicitly and completely define the body of information, all defined Association properties, as well as either the 'location' or 'agency' property.

Allowed: All required properties, as well as the 'title' property (recommended).

6.4.2 Query Properties

Required: One or more Association properties.

Allowed: One or more Association properties.

6.5 Process Registry Service (PRO-REGS)

PRO-REGS provides for searching over sequences of state or event identifiers (state chains) which are associated with specific components of or locations within procedural documentation or other forms of temporal information.

The results of a search are a set of profiles defining zero or more targets matching the search query.

PRO-REGS can be used for, among other things, "process sensitive help" where a unique identifier is associated with each significant point in procedures or operations defined by procedural documentation, and software which is monitoring, guiding, and/or managing the procedure keeps a record of the procedural states activated or executed by the user. At any time, the running history of executed states can be passed to PRO-REGS as a query to locate documentation which most closely matches that sequence of states or events, up to the point of the current state, so that the user receives precise information about how to proceed with the given procedure or operation exactly from where they are. The procedural documentation would presumably be encoded using some form of functional markup (e.g. SGML, XML, HTML) and generation of the profiles identifying paths to states or steps in the procedural documentation would be automatically generated based on analysis of the data content, recursively extracting the paths of special state identifiers embedded in the markup and producing a profile identifying a qualified data item to each particular point in the documentation using the 'pointer' property.

6.5.1 Profile Properties

Required: The Identity properties which explicitly and completely define the body of information, the 'class' property defining the sequence of state identifiers up to the information in question, as well as either the 'location' or 'agency' property.

Allowed: All required properties, as well as the 'title' property (recommended).

6.5.2 Query Properties

Required: The 'class' property defining a sequence of state identifiers based on user navigation history.

Allowed: Only the 'class' property is allowed in search queries.

The invention claimed is:

1. A method of maintaining data in an object oriented programming environment comprising:

defining a set of persistent data entities each having a predetermined level of abstraction and scope; and defining a set of related data entities having a hierarchical plurality of levels of abstraction such that the scope identified for data entities at a higher level of abstraction encompasses the scope of those related data entities at a lower level of abstraction, said set of related data entities including a plurality of related data entities at a common level of abstraction, wherein said level of abstraction and scope is defined using metadata properties, the metadata properties at a higher level of abstraction being inherited by a lower level of abstraction to provide an implementation independent model for a storage media.

2. A method as claimed in claim 1, wherein the metadata inherited from said higher level of abstraction by said lower level of abstraction is replaced by defining particular metadata for said lower level of abstraction.

3. A computer program stored on a tangible medium and comprising executable code for execution on a computer, said code, when executed, causing said computer to carry out the method according to claim 1.

4. A computer program as claimed in claim 3, wherein said computer program is stored in a computer readable medium.

5. An archival system comprising persistent storage adapted to store a plurality of data entities each having a predetermined level of abstraction and scope, wherein a set of related data entities have a hierarchical plurality of levels of abstraction such that the scope identified for data entities at a higher level of abstraction encompasses the scope of those related data entities at a lower level of abstraction, said set of related data entities including a plurality of related data entities at a common level of abstraction, wherein said storage is distributed within an object oriented programming environment and the metadata properties at a higher level of abstraction are inherited by a lower level of abstraction to provide an implementation independent model for a storage media.

6. A system as claimed in claim 5, wherein said persistent storage is provided by at least one server.

7. A system as claimed in claim 6, wherein said at least one server is adapted to be connected to a network.

* * * * *